United States Patent
Jaremko et al.

[19]

[11] Patent Number: 6,133,925
[45] Date of Patent: Oct. 17, 2000

[54] AUTOMATED SYSTEM AND METHOD FOR ANNOTATION USING CALLOUTS

[75] Inventors: Mark Jaremko, Redmond; Peter L. Engrav, Seattle, both of Wash.

[73] Assignee: Microsoft Corporation, Redmond, Wash.

[21] Appl. No.: 08/785,819

[22] Filed: Jan. 8, 1997

Related U.S. Application Data

[63] Continuation of application No. 08/299,923, Aug. 31, 1994, Pat. No. 5,621,871.

[51] Int. Cl.[7] ................................................ G06F 15/00
[52] U.S. Cl. ................................................................ 345/441
[58] Field of Search ................................... 345/347, 349, 345/350, 141, 441, 116, 118, 333, 334, 335

[56] References Cited

U.S. PATENT DOCUMENTS 5,621,871  4/1997  Jaremko et al. .................. 345/441

OTHER PUBLICATIONS

Shapeware Corporation, "Visio 2.0 Introducing Visio Master Shapes," pp. 4–6, and 123–124, 1993.

Shapeware Corporation, "Visio 2.0 Using Visio," pp. 30–31, 1993.

*Primary Examiner*—Phu K. Nguyen
*Attorney, Agent, or Firm*—Jones & Askew, LLP

[57] ABSTRACT

An automated method of providing a callout in a display field of a visual display. The processor designates first and second display locations in the display field and, responsively to a set of formatting criteria, automatically brings a callout into existence. The callout has a stem region and an annotation region, with the stem region having a first vertex displayed proximally to the designated first display location and a second vertex displayed proximally to the annotation region, and the annotation region being displayed proximally to the designated second display location. The processor can designate the first or second locations responsively to input accepted from a pointing device. The annotation region can contain an annotation that pertains to an item displayed in a vicinity of the first designated display location. The callout can be manipulated, in particular by rotation, with the callout being accurately displayed throughout the manipulation (so-called WYSIWYG display).

23 Claims, 69 Drawing Sheets

Flowchart for LayoutPoly(), part 1

Flowchart for LayoutPoly(), part 2

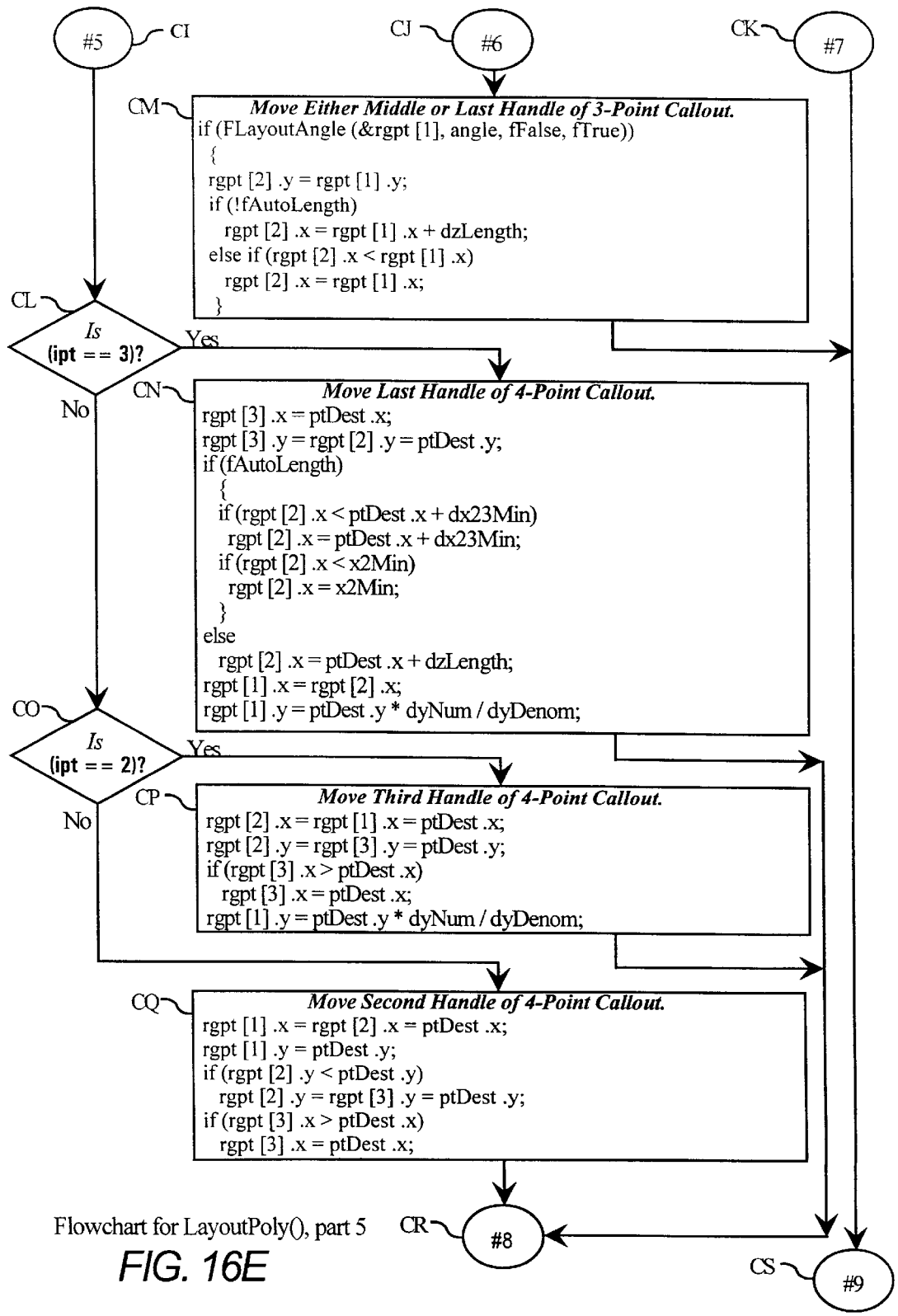
FIG. 16E Flowchart for LayoutPoly(), part 5

Flowchart for LayoutPoly(), part 6

Flowchart for FLayoutAngle()

Flowchart for DzDescent()

Flowchart for IptEnd()

AUTOMATED SYSTEM AND METHOD FOR ANNOTATION USING CALLOUTS

CROSS-REFERENCE TO RELATED APPLICATION

This application is a continuation of U.S. patent application Ser. No. 08/299,923, filed Aug. 31, 1994, now U.S. Pat. No. 5,621,871.

TECHNICAL FIELD

The invention relates to graphical user interfaces and more particularly to the graphical annotation by means of callouts of items represented in graphical user interfaces.

BACKGROUND OF THE INVENTION

A callout is a device for annotating an item in, or a portion of, a document. Examples of callouts in the prior art are shown in FIG. 1, which depicts an item 101 annotated by three callouts 102, 103, and 104. Here, item 101 is text that contains boldfaced portions 105, 106, 107. Item 1 could also be, for example, a graphic or a picture instead of text. Each of callouts 102, 103, 104 can be said to annotate item 101. More particularly, callout 102 annotates portion 105, callout 103 annotates portion 106, and callout 104 annotates portion 107.

Callouts can vary in format. For example, callout 102 has an oval-shaped annotation region and a single-segment stem region that descends vertically from the annotation region and has an arrowhead at the lower end of the stem region. Callout 103 has a rectangular annotation region that abuts one end of a two-segment, right-angled stem region. Callout 104 has an annotation region having a visible border primarily along one side, with the other sides being left open, and a diagonal single-segment stem region. A wide variety of formatting options is possible for callouts beyond the possibilities illustrated in FIG. 1.

FIG. 2 illustrates the component parts of a callout. Typically, a callout 205 has a stem region 210 and an annotation region 220. Stem region 210 connects annotation region 220 with an item 201 to be annotated. Stem region 210 has a first end 211 and a second end 213, and typically is made up of a line segment 212 or two or more contiguous line segments (not shown). Annotation region 220 contains an annotation 225 that pertains to an item 201. Annotation 225 can be, for example, text that clarifies a word or picture of item 201. The callout is sometimes said to originate at first end 211 or at item 201.

Callouts began in the realm of printed documents. With the advent of computerized documents, it has become useful to incorporate callouts into this new realm as well, for example, by providing automated tools for creating and editing callouts. A graphical user interface offers the potential of making such tools easy and intuitive to use.

At least one computerized drawing program in the prior art, VISIO 2.0 by Shapeware Corp. (Seattle, Wash.), attempts to provide automated callout tools. To place a callout in a VISIO drawing, a user selects a pre-made callout "stencil" from a menu of callouts, using a mouse, trackball, or other pointing device. Then, again using the pointing device, the user "drags" the callout "stencil" across the display and "drops" it at a desired location.

VISIO's "drag-and-drop" method of operation often proves to be quite cumbersome to apply. A user cannot simply point to a display location and create the callout at that location in any desired size. Also, a user cannot readily convert a callout from one format or style to another. For example, a user must choose one drawing tool to obtain a callout whose stem consists of a single line segment, and must choose a completely different tool to obtain a callout whose stem consists of two line segments at an angle to one another. There is no straightforward way for a user to apply any changes made to the size, screen position, rotation, type font or other formatting characteristics of a single-segment callout to a two-segment callout or vice versa.

The appeal of graphical user interface systems arises in part from their potential to provide users with WYSIWYG ("what you see is what you get") operation. In a WYSIWYG system, the user receives immediate and accurate visual feedback during any and all operations performed on displayed entities such as text and graphics. Unfortunately, the manipulation of callouts in VISIO is not fully WYSIWYG. For example, a rotation of the callout's stem region with respect to the annotation region does not provide the user at each step of the rotation with a true picture of what the callout will look like if the rotation is completed at that moment: In VISIO, to rotate a callout's stem, the user selects a special point on the callout and "drags" it with the mouse in the desired direction. During the "drag" operation, VISIO displays a single dashed line segment to schematically represent the current "dragged" position of the stem. The single dashed line is used even if the callout stem actually comprises two line segments. Moreover, VISIO does not show the annotation region's motion at all. The user can only guess where the annotation region will be positioned once the "drag" operation is complete. Typically, the annotation region is redisplayed at a position different from its original one, and the user can only guess where it will end up.

In short, VISIO provides only a limited capability to deal with callouts. Moreover, the incorporation of callout tools in a drawing program such as VISIO does not provide a straightforward way to put a callout into a computerized textual document, for the simple reason that a drawing program, unlike a word processing program, is not oriented toward the creation of textual documents. Yet common word processing programs do not provide callout tools of any kind. Thus there is a need for better automated callout tools and for better application of automated callout tools.

SUMMARY OF THE INVENTION

The present invention provides an automated system and method for callout annotation that takes full advantage of the flexibility, power, and ease of use of graphical user interfaces. The invention adapts readily to word processing and other text processing programs, yet is sufficiently general to be used in many other kinds of applications. The invention allows the user to create a callout at any desired point in the display, and provides WYSIWYG operation in editing a callout, in particular when rotating the stem region with respect to the annotation region.

According to one aspect of the invention, in a system comprising a processor and a visual display operatively coupled to the processor, an automated method of providing a callout in a display field of the visual display is provided. First and second display locations in the display field are designated. Responsively to a set of formatting criteria, a callout is automatically brought into existence with the processor. The callout has a stem region and an annotation region. The stem region has a first vertex displayed proximally to the indicated first display location and a second vertex displayed proximally to the annotation region, and the annotation region is displayed proximally to the indicated second display location. In some embodiments, the system further comprises a pointing device, and either the first or second display location (or both) can be designated responsively to an input (or inputs) accepted by the processor from the pointing device. In some embodiments, an annotation pertaining to an item displayed in the display field in a vicinity of the first indicated display location is displayed in a portion of the annotation region.

In another aspect of the invention, a method of modifying a callout displayed in a display field of the visual display is provided. The callout has a stem region and an annotation region, the stem region having a first vertex distal to the annotation region and a second vertex proximal to the annotation region. The processor designates either the stem region or the annotation region as the first region. The processor effects a rotation of a point in the designated first region of the callout about a point in a second region of the callout; contemporaneously, each one of a series of intermediate modified callouts is displayed. Each intermediate modified callout of the series is made up of an intermediate modification of the stem region responsive to the rotation and an intermediate modification of the annotation region also responsive to the rotation. Each intermediate modification of the stem region includes the first vertex and the second vertex, with the first vertex being distal to the intermediate modification of the annotation region and the second vertex being proximal to the intermediate modification of the annotation region. Upon completion of the rotation, the last intermediate modified callout of the series is displayed.

The invention will be better understood with reference to the drawings and detailed description below.

BRIEF DESCRIPTION OF THE DRAWINGS

FIGS. 16A–16F are a series of flowcharts for the function LayoutPoly( );

DETAILED DESCRIPTION

Figure 1:
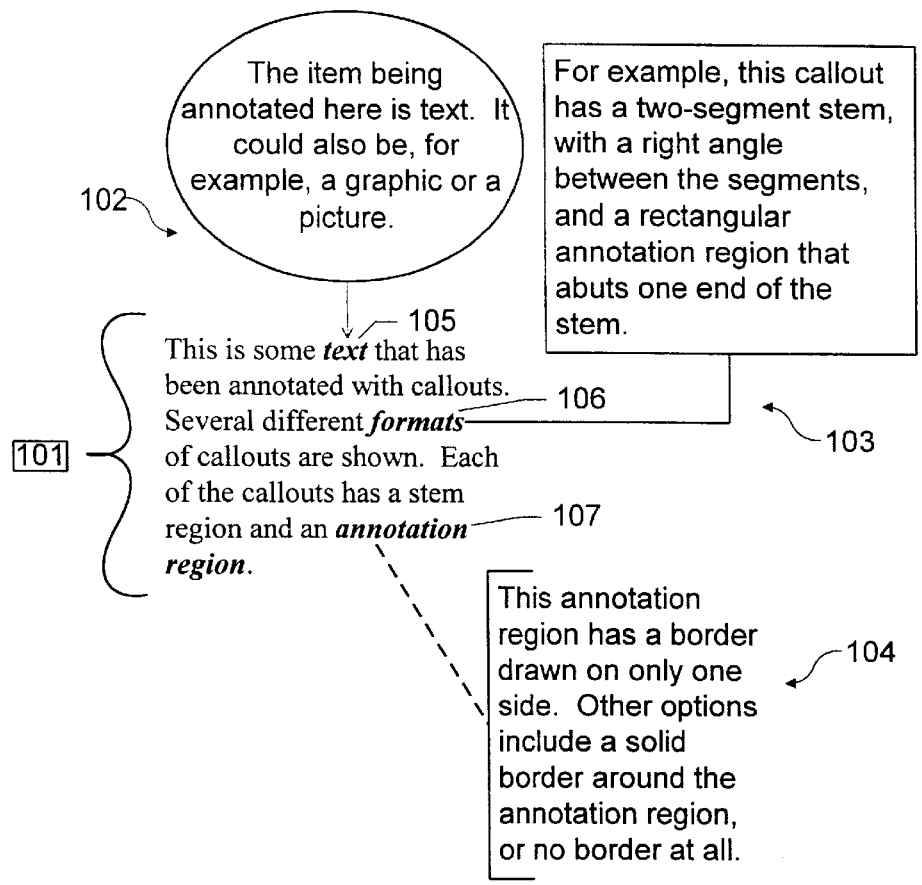
FIG. 1 (prior art) illustrates examples of callouts.
Figure 2:
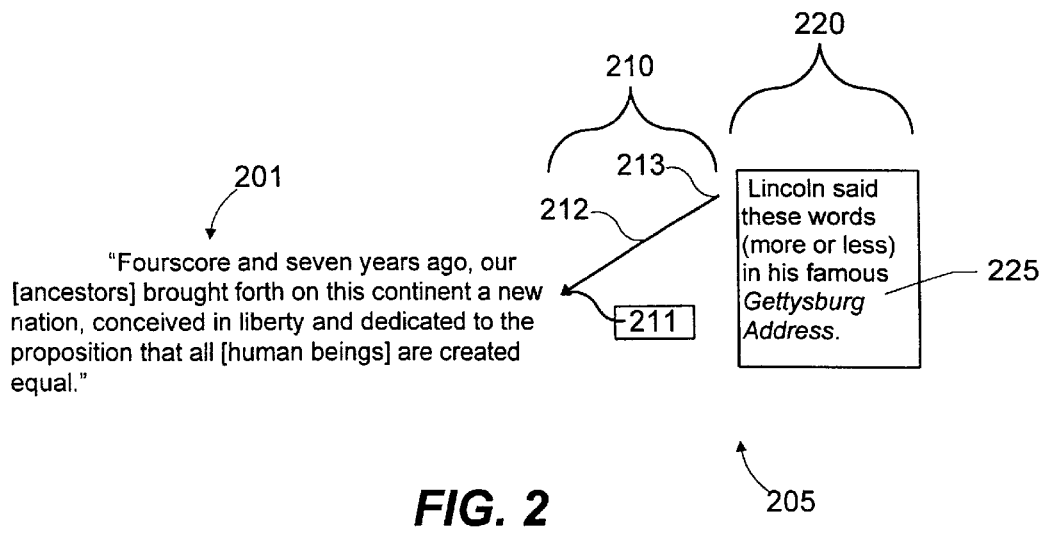
FIG. 2 (prior art) shows the component parts of a callout.

The present invention provides an automated system and method for creating and manipulating a callout. The callout can be used to annotate an item in a document or otherwise displayed, such as (for example) a text passage, a graphic or illustration, a photographic image, or a spreadsheet. The invention allows the user to create a callout at any desired point in the document or display, and provides WYSIWYG operation in editing the callout, in particular when rotating the stem region with respect to the annotation region. The process of creating and editing callouts according to the invention takes full advantage of the flexibility, power, and ease of use of graphical user interfaces. The invention adapts readily to word processing and other text processing programs, yet is sufficiently general to be used in many other kinds of applications.

A specific embodiment of the invention in the context of a word processing applications program (Microsoft Word 6.0 by Microsoft, Inc. of Redmond, Wash.) running in a multiwindowed operating system (Microsoft Windows, version 3.1 or later, also by Microsoft) is described. In this embodiment, a callout can be used to annotate a portion of a textual document, for example, to annotate a word, a paragraph, or an illustration. Persons of skill in the art will appreciate that the invention can be applied in numerous other contexts as well. For example, the invention can be incorporated in other kinds of applications programs or as part of an operating system. In the drawings below, like reference numbers indicate like components.

System Components

Figure 3:
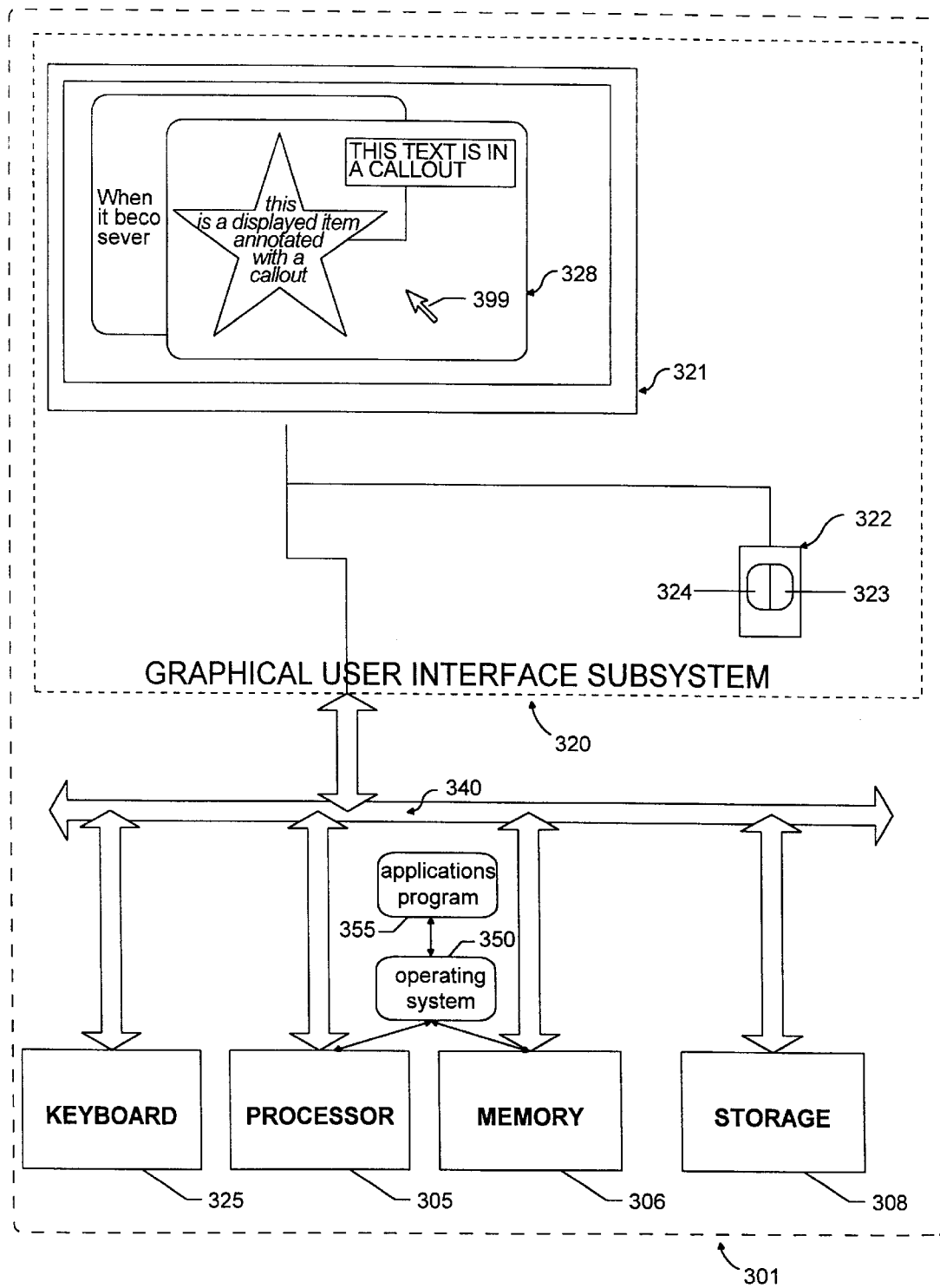
FIG. 3 schematically depicts a computer system suitable to support an embodiment of the present invention.

FIG. 3 schematically depicts a computer system 301 suitable for practicing the specific embodiment of the invention described herein. Computer system 301 is a computer, such as a personal computer or workstation, having a graphical user interface 320 and executing appropriate operating system software 350 and applications software 355. The hardware components of the system include a processor 305 that is operationally coupled to a memory 306 and a storage device 308. Processor 305 is also operationally coupled to graphical user interface subsystem 320, which has hardware components including a display 321 and a pointing device 322. A keyboard 325 provides an additional source of input to the processor. Keyboard inputs can complement or substitute for certain inputs that would otherwise be accepted from pointing device 322.

Processor 305 can be, for example, a microprocessor, such as an 80386, 80486, or Pentium™ microprocessor by Intel Corporation (Santa Clara, Calif.). Memory 306 can include both random-access memory (RAM) and read-only memory (ROM) components. Storage device 308 can be a hard disk, floppy disk, optical disk, or other mass storage medium. Display 321 can comprise a cathode-ray tube (CRT) or flat-panel display device capable of displaying graphical images (e.g., bit-mapped images). Display 321 can also be a virtual-reality device or any other device or system providing a visual image. Pointing device 322 is a mouse, trackball, joystick, stylus and tablet, or other device for designating two (or more) spatial coordinates in a visual field 328 of display 321. Keyboard 325 can be an alphanumeric keyboard, possibly with additional keys such as function keys and cursor-control keys.

The operational coupling of these various components is provided by appropriate hardware and software as is well understood in the art. The hardware can include, for example, a bus interface 340. The software can include, for example, operating system 350 and applications software 355, both of which can have executable code that is stored in memory 306 and executed by processor 305 and both of which can include software modules that implement various aspects of the invention.

Visual field 328 is a region of the display, e.g., a window in a multi-windowed operating system such as Microsoft Windows. The window is assumed to be visible in this embodiment, but can be hidden or partially or temporarily hidden from view in some embodiments. Visual field 328 can be the entire display in some embodiments.

Computer system 301 can have additional components (not shown), such as additional processors, memory, and storage devices; a printer to provide hardcopy output of visual images, including visual images displayed on display 321; a modem or network connection; and additional software applications programs or packages executing concurrently, any or all of which can provide callouts according to the invention.

Unless otherwise specified, the remainder of this description assumes that pointing device 322 is a mouse having one or more mouse buttons. 323, 324. The mouse can be used to select or manipulate a displayed item by depressing a mouse button, for example mouse button 324, while a mouse cursor 399 representing the mouse's spatial position in visual field 328 is displayed in the vicinity of the item to be selected or manipulated. Mouse button 324 is pressed and immediately released ("clicked") to select the item, and pressed and held while the mouse is moved to manipulate the item. The action of selecting the item is called "clicking on" the item, and the action of manipulating it by moving the mouse with the button pressed and held is called "dragging" the item. These and other related "click and drag" techniques for mouse-based graphical user interfaces (and equivalent techniques for graphical user interfaces employing other sorts of pointing devices besides mice) are familiar to those of skill in the art.

User Interface

The user interface of the specific embodiment will now be described. The embodiment to be described assumes that the callout is created and manipulated interactively by a human user of the invention, primarily by using a mouse (pointing device 322) and one of its mouse buttons (mouse button 324). In other embodiments, the "user" can be processor 305 or another processor. A processor can create and manipulate a callout according to the invention either by emulating the actions of a human user or by executing the appropriate software directly. For example, the processor can carry out a "macro," a programmed sequence of steps that emulates or substitutes for a sequence of actions that otherwise would be carried out by a human user of an applications program or other software.

Callout Tools

In the specific embodiment, a callout tool and a format callout tool are provided as part of the user interface of a word processing applications program. These tools give the user access to the invention and its features.

Figure 4A:
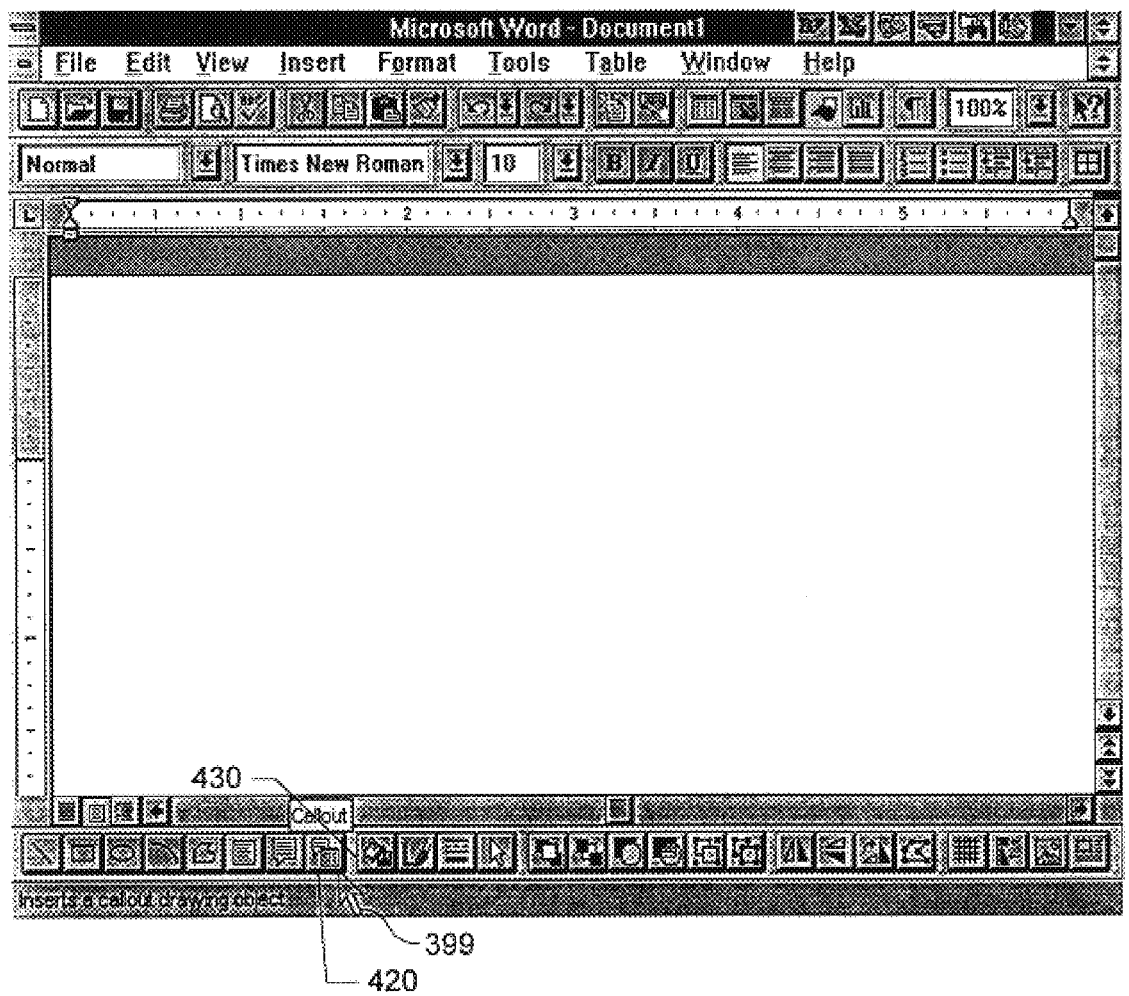
FIGS. 4A–4B illustrate callout tools provided in a word processing program.
Figure 4B:
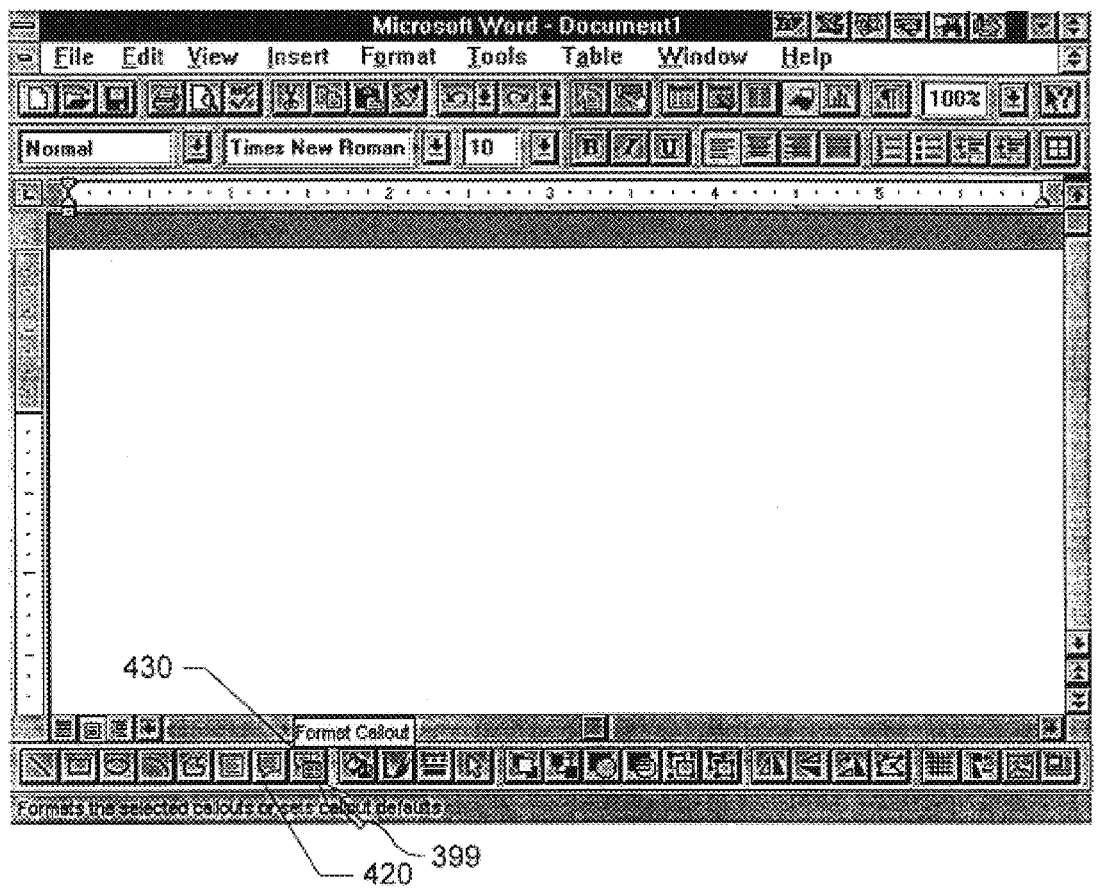

FIGS. 4A and 4B illustrate, respectively, how a callout tool and a format callout tool are provided in the specific embodiment. A tool is selected by using the mouse to choose an icon that represents the tool. In FIG. 4A, mouse cursor 399 is positioned in the vicinity of callout tool icon 420 and mouse button 324 is then pressed and released. Clicking on icon 420 in this fashion selects the callout tool. Similarly, in FIG. 4B, clicking on icon 430 selects the format callout tool.

Those of skill in the art will appreciate that the interface illustrated in FIGS. 4A–4B is but one of many possible interfaces that could be chosen within the scope of the invention. The callout tool can be combined with the format callout tool in some embodiments. In other embodiments, a multiplicity of tools related to callouts can be provided. A user can select a tools related to callouts by indicating an icon, choosing a menu selection, striking a specially defined key or key sequence ("accelerator") on a keyboard, or in any number of other ways.

Creating a Callout

Figure 5A:
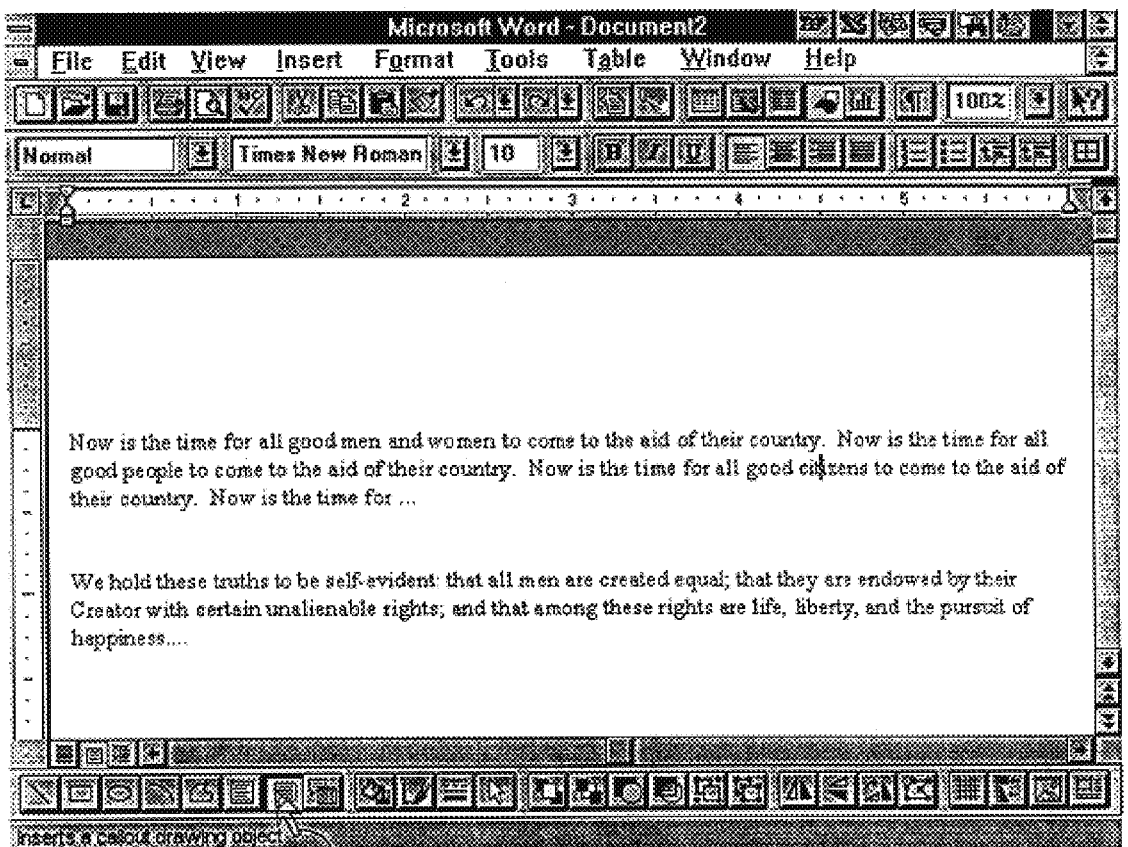
FIGS. 5A–5F are a series of views that illustrates the creation of a callout to annotate an item in a document.
Figure 5B:
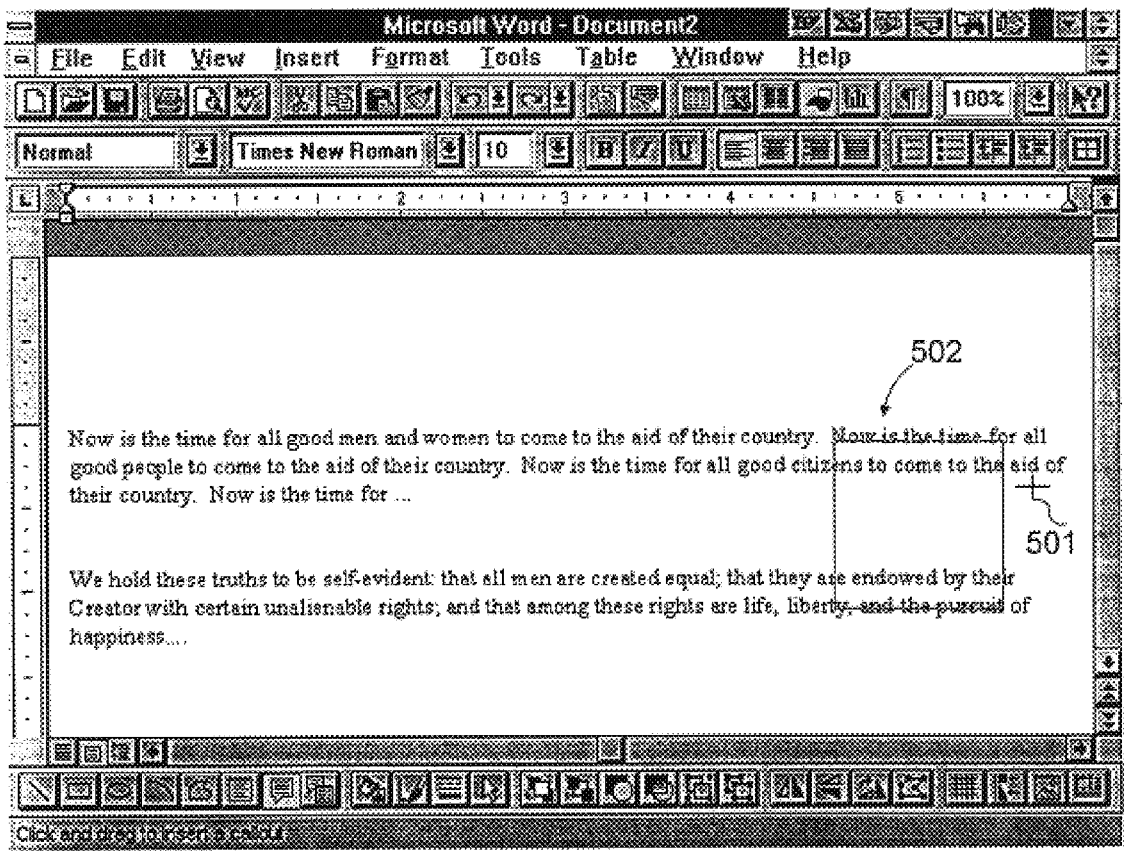
Figure 5C:
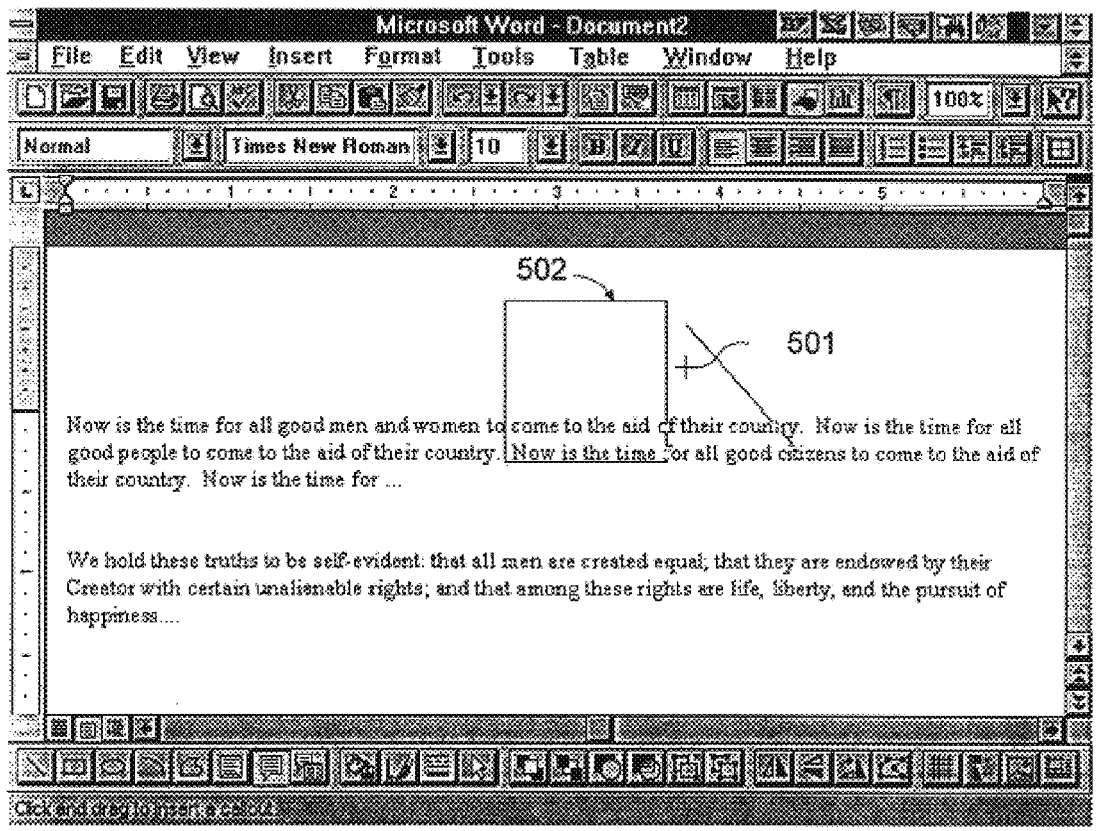

The series of views in FIGS. 5A–5F illustrates the creation of a callout to annotate an item in a word processing document. Initially, as shown in FIG. 5A, the document contains some text. The callout tool is selected as described with reference to FIG. 4A above. In a preferred implementation the mouse cursor changes from the usual arrow to a crosshairs 501 as shown in FIG. 5B. The mouse is moved, causing crosshairs 501 to move to a location at which it is desired that the callout will originate, that is, a location where the first end of the stem region is to appear. The mouse button is pressed and a schematic representation of the annotation region, such as outline representation 502, appears. The mouse button is kept held down while the mouse is moved through intermediate locations to a destination location, causing the stem region to appear and dragging the annotation region to the new location. An example of the display at one of the intermediate locations is seen in FIG. 5C.

Figure 5D:
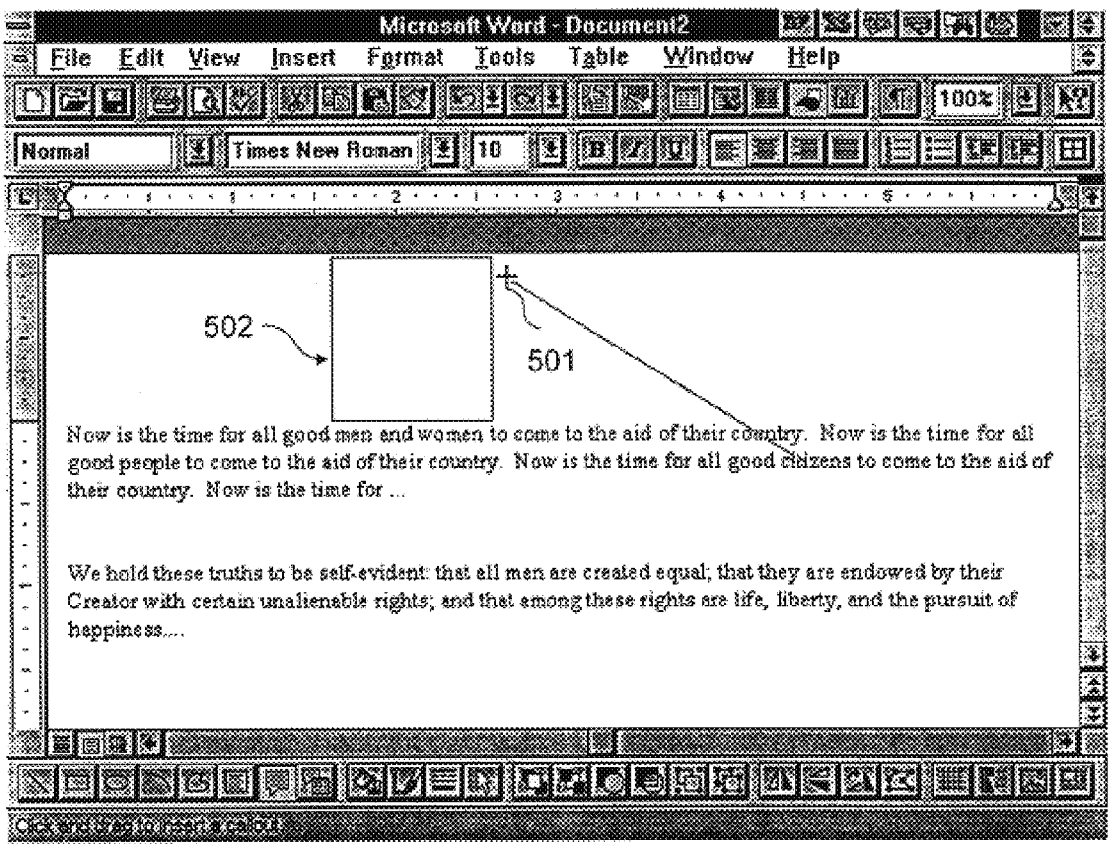
Figure 5E:
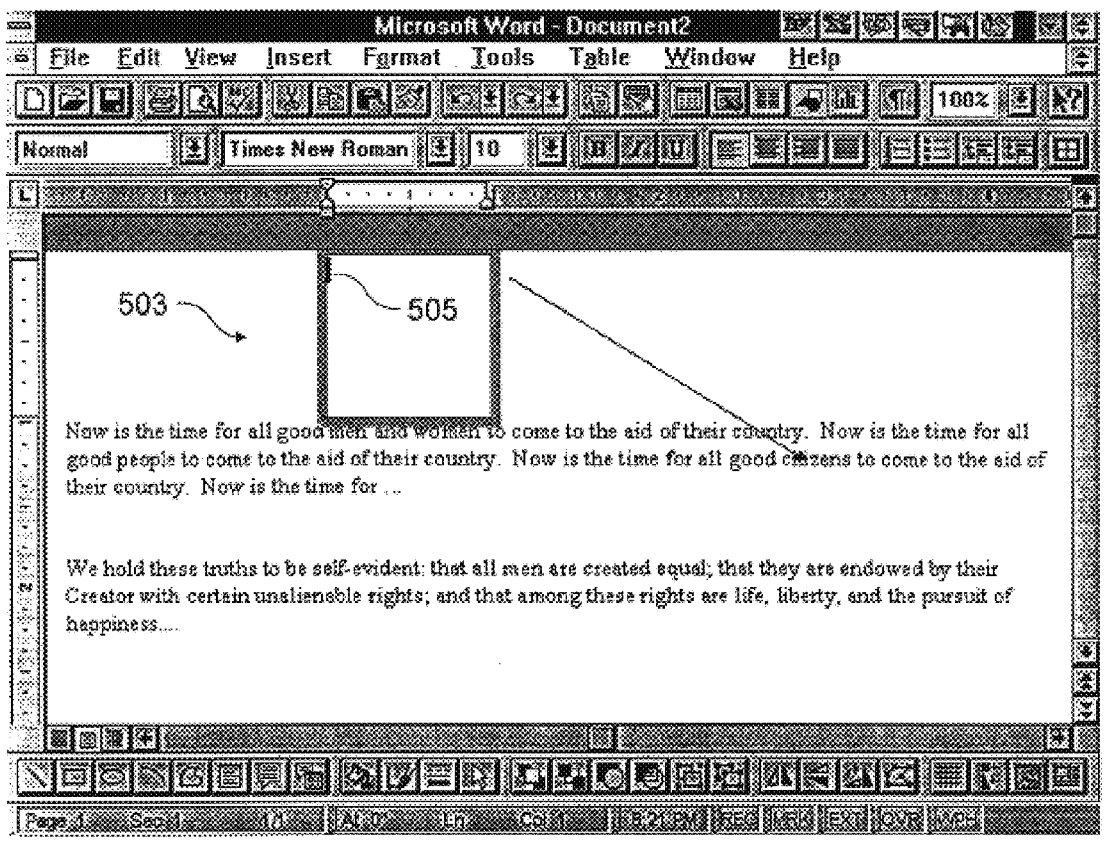

When the destination is reached, with the mouse button still held, the display is as seen in FIG. 5D. At the destination location the mouse button is released, causing the second end of the stem to be placed at or near the destination location. The outline view of the callout is replaced with a normal view 503 as shown in FIG. 5E. The thick borders of the annotation region indicate that the callout is still selected. A flashing cursor 505 appears in the annotation region.

Figure 5F:
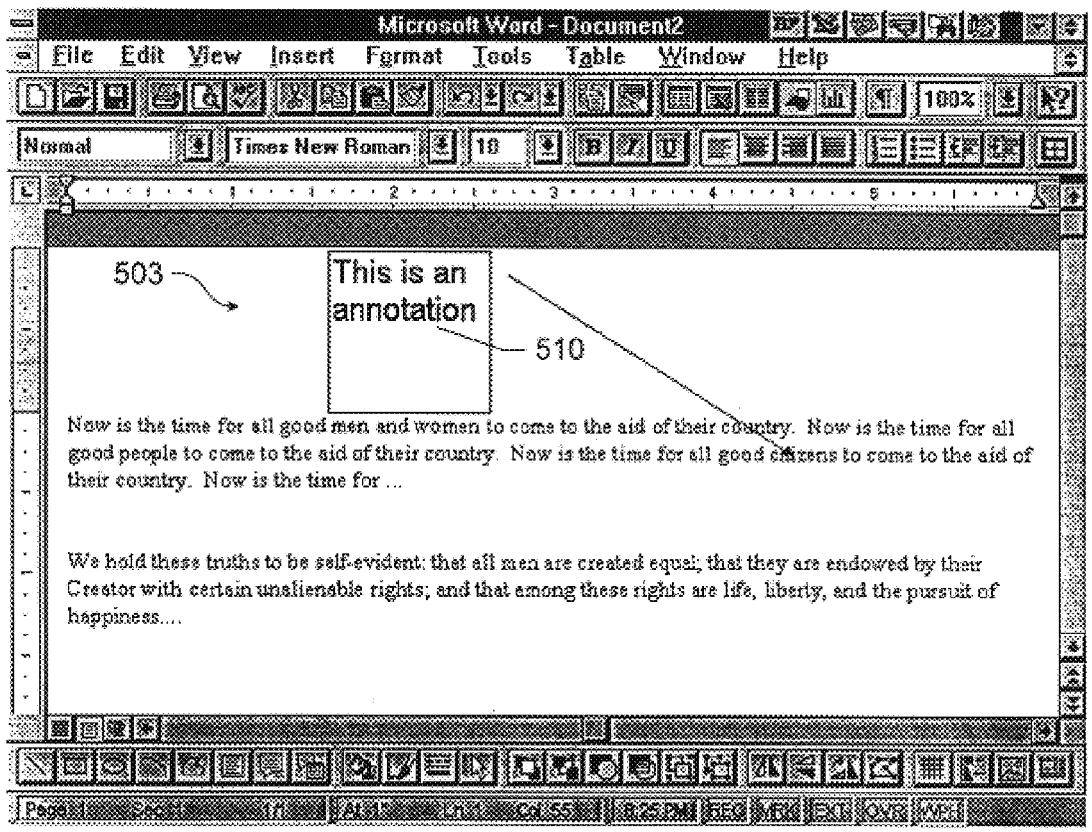

An annotation can now be added, for example by typing text from a keyboard or pasting in a text or graphic previously stored in memory. The annotation is then deselected (that is, caused to become no longer selected), for example by clicking the mouse elsewhere in the document. FIG. 5F shows a possible annotation 510 added by typing in text that reads, "This is an annotation." The annotation region is no longer selected.

More generally, the annotation of a callout can include combinations of text, graphics, bit-mapped or pictorial images, and active documents from other applications programs (e.g., spreadsheets). In some embodiments, the annotation of a callout can include other types of data or software entities, including but not limited to hypertext links and video presentations.

Rotating the Callout

Once created, the callout can be modified. In particular, the stem region and annotation region can be rotated with respect to one another by selecting and dragging either the stem region or the annotation region. Rotation by dragging the annotation region is shown in the series of views FIGS. 6A–6K. (Although the term "rotation" is used, another way to describe the change in configuration of the callout depicted in FIGS. 6A–6K is to say that the stem region is rotated and the annotation region is translated.)

Figure 6A:
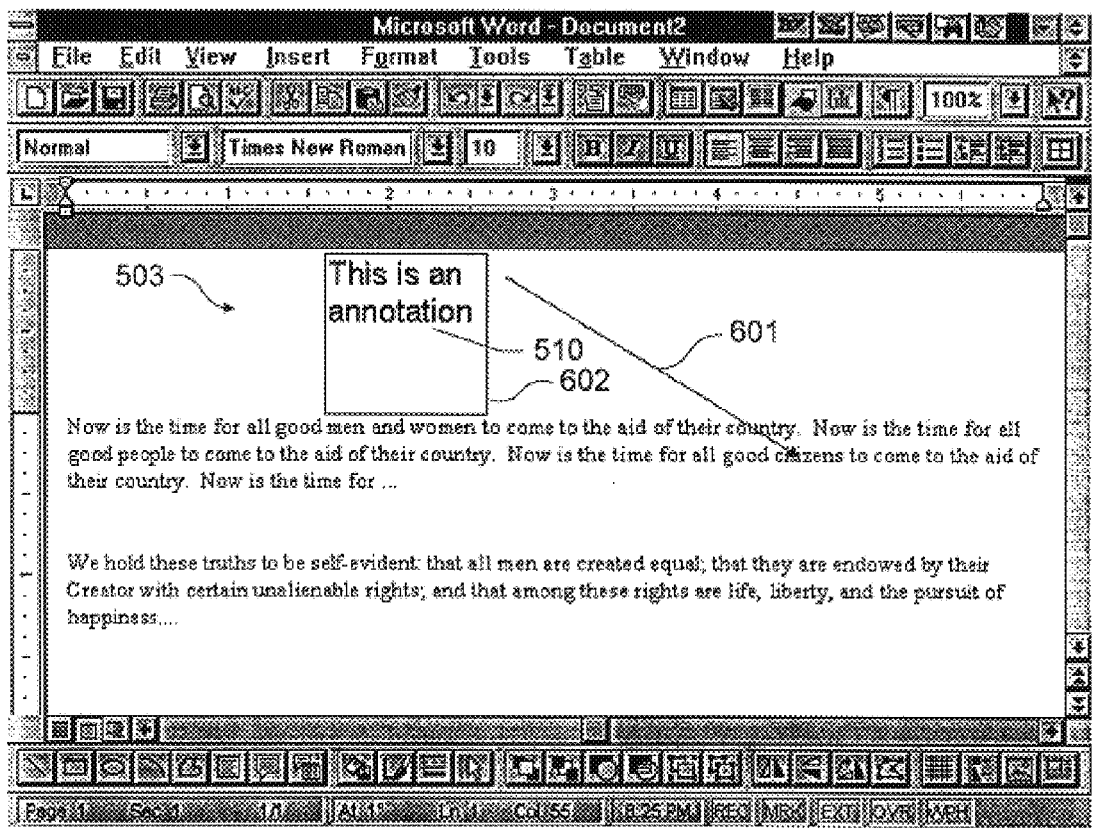
FIGS. 6A–6K are a series of views that illustrates modification (including rotation) of a callout through on-screen manipulation.
Figure 6B:
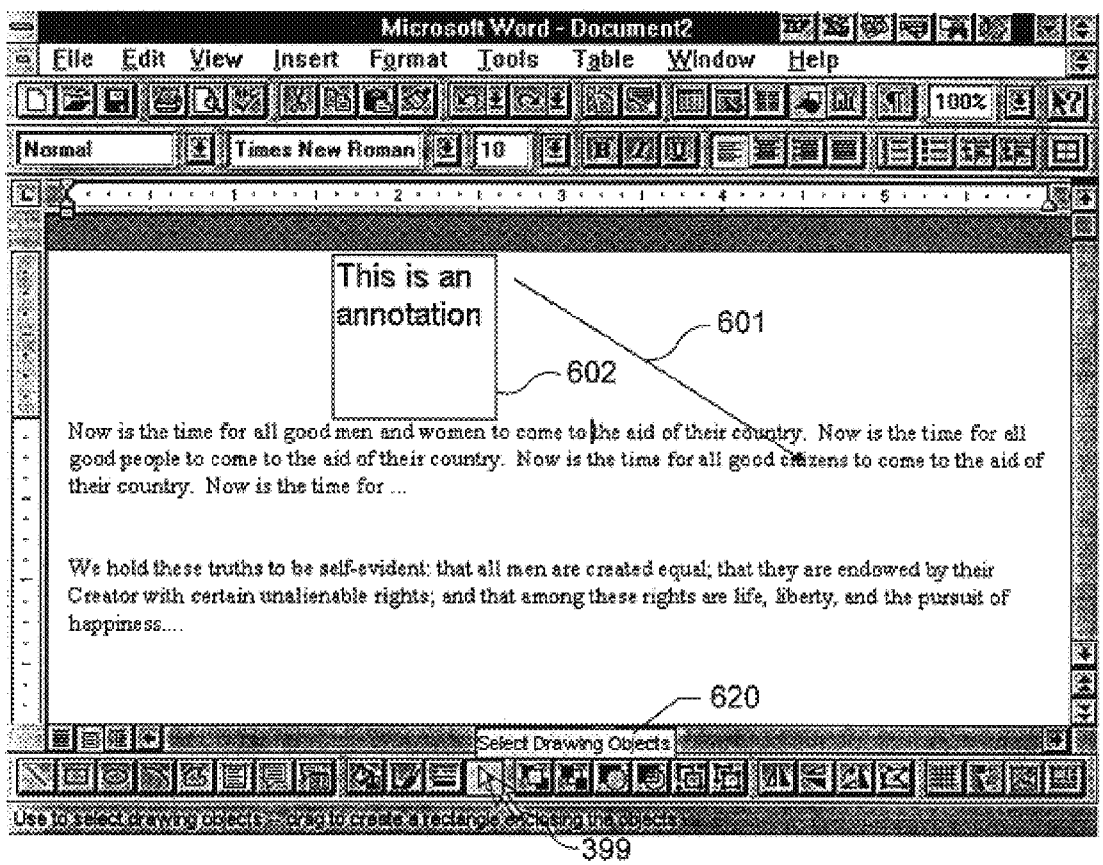
Figure 6C:
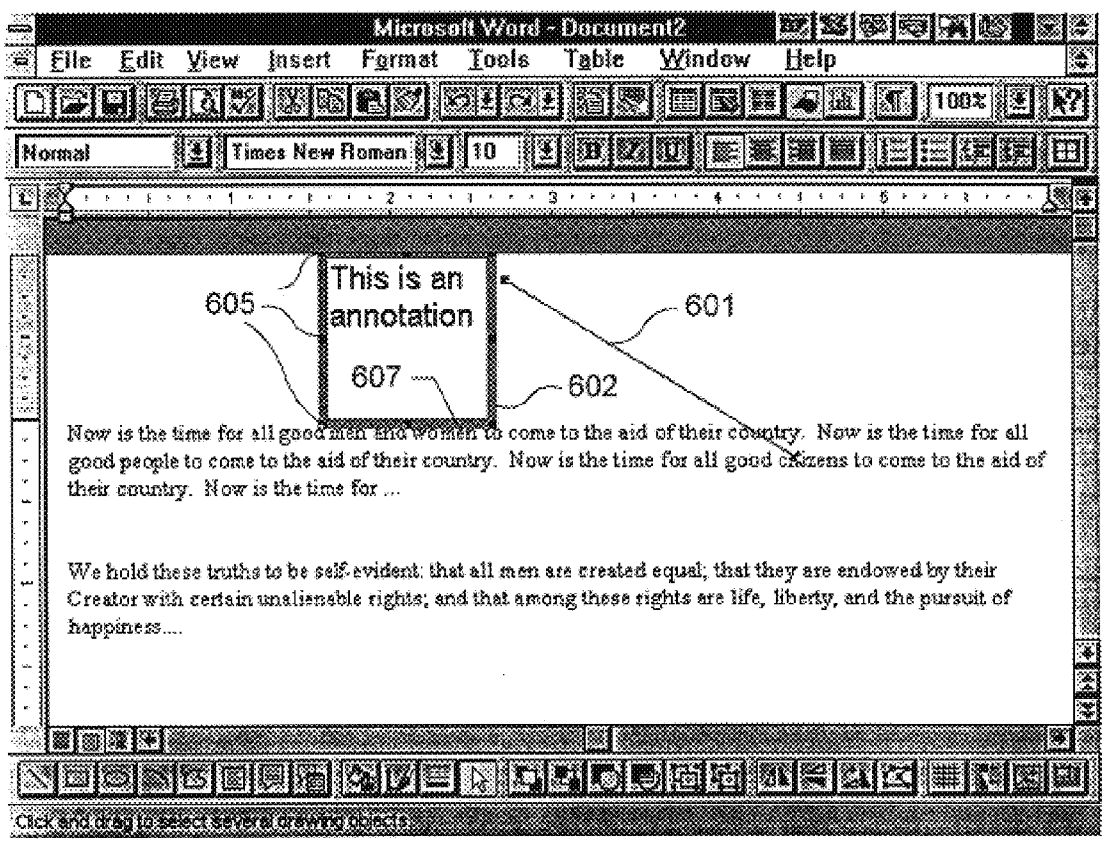

FIG. 6A shows the callout of FIG. 5F, and in particular shows stem region 601 and annotation region 602. The callout is selected, for example as shown in FIG. 6B by choosing a tool 620 for selecting drawing objects with mouse cursor 399, and thereafter placing mouse cursor 399 in the vicinity of the callout and clicking on the callout (pressing and releasing the mouse button). As seen in FIG. 6C, the callout is highlighted to show its selection. Certain special points on stem region 601 and annotation region 602 are indicated by darkened spots or squares 605. These squares (so-called "handles") denote locations that can be dragged with the mouse in order to perform certain geometric operations on the callout.

The mouse cursor is then placed at a location on the annotation region's highlighted, thickened border 607, and more specifically, at a location which is not one of the handles and which is not in the interior of the annotation. The mouse cursor 399 preferably is redisplayed to indicate that clicking and dragging will cause a rotation to be performed; for example, the mouse cursor can be shown as a combination of an arrow plus an arrowheaded crosshairs. Dragging annotation region 602 downwards in the display causes the callout to rotate about its origin, that is, about the end of stem region 601 farthest from annotation region 602.

Figure 6D:
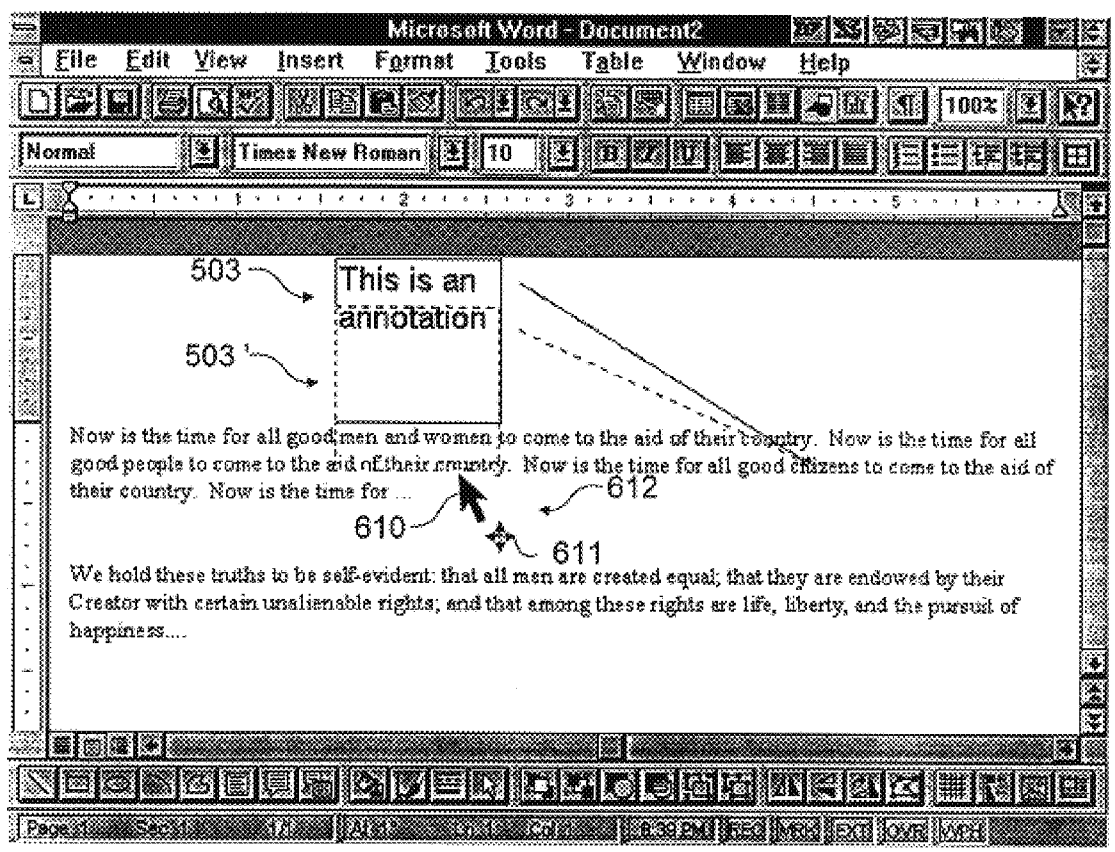

FIG. 6D depicts an intermediate view during the rotation. The mouse cursor is shown as a combination 612 of an arrow 610 plus an arrowheaded crosshairs 611. The unrotated callout 503 and a rotated callout 5031 are both displayed, with rotated callout 5031 being shown in outline representation (or other schematic representation) to distinguish it. This WYSIWYG mode of operation provides an intuitive, easy-to-use interface that facilitates accurate control of the rotation. So long as the mouse button is kept held down, the display shows both the unrotated and the rotated callout, providing considerable freedom to try out different rotations without losing sight of the original image. The rotation is responsive to the mouse motion, and need not be uniform in direction or rate. At each instant of the rotation, the outline view of the rotated callout shows what the rotated callout will look like if the mouse button is released at that instant.

Figure 6E:
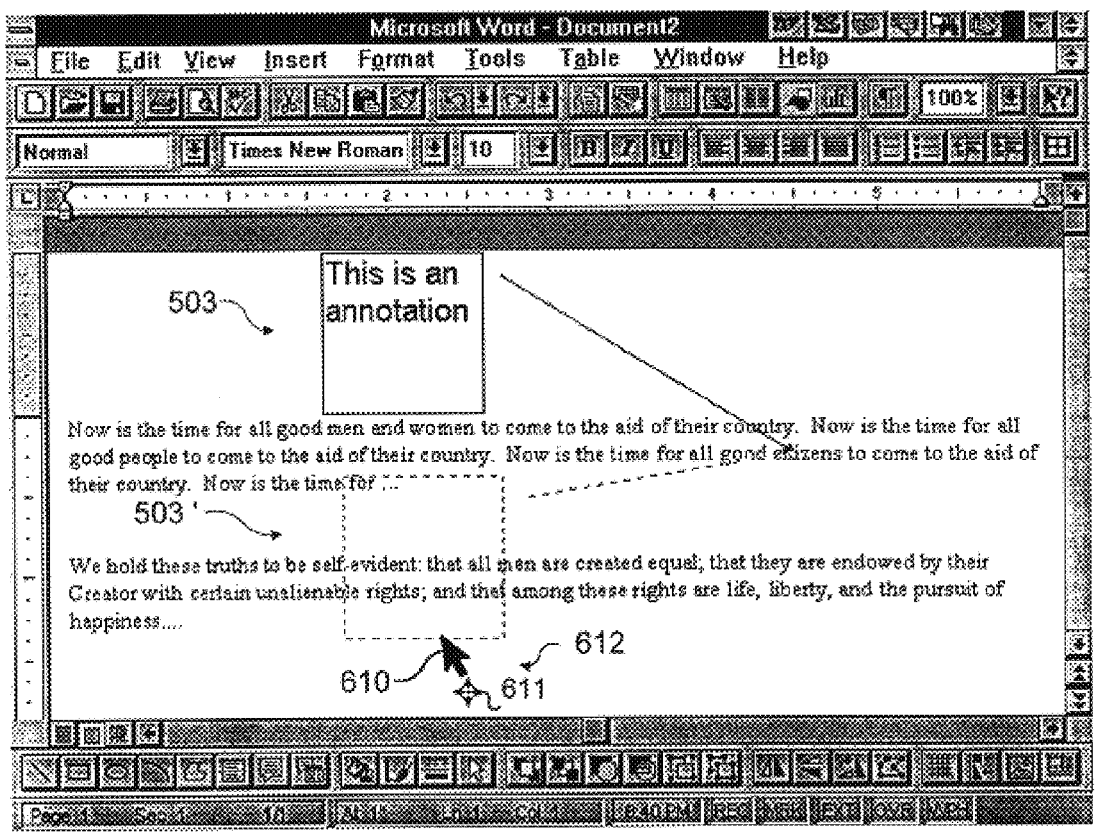
Figure 6F:
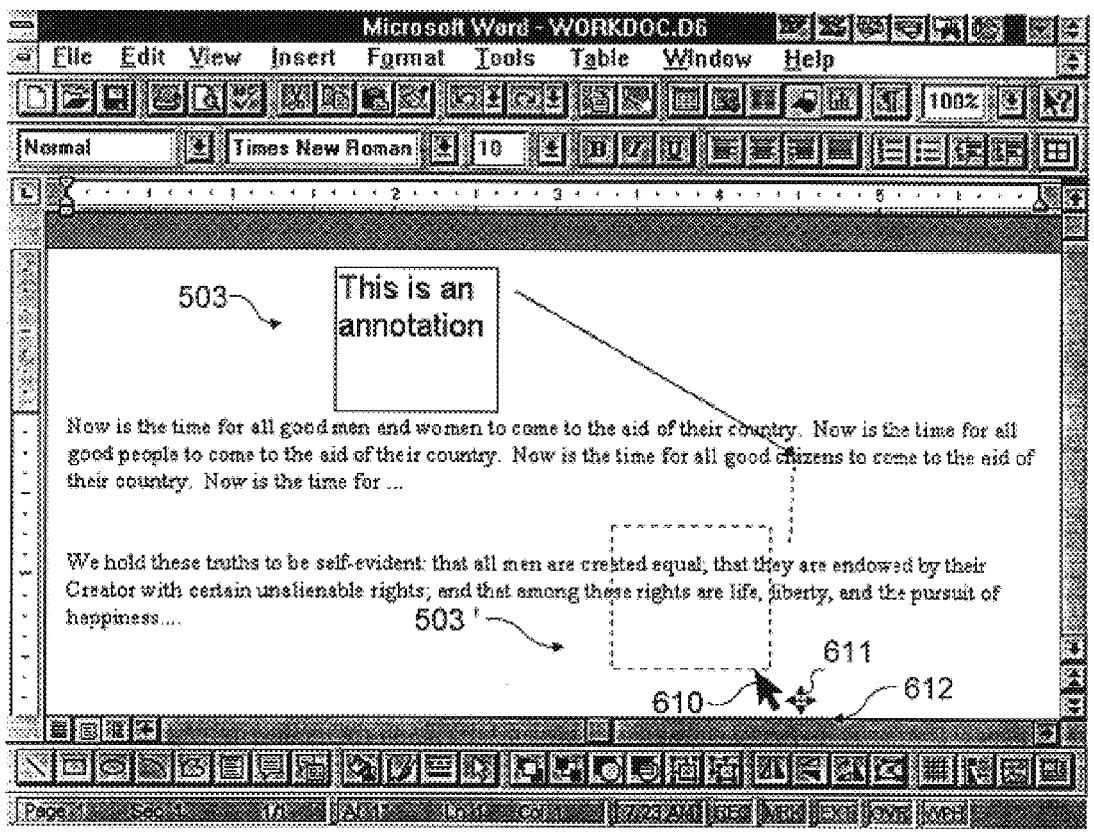
Figure 6G:
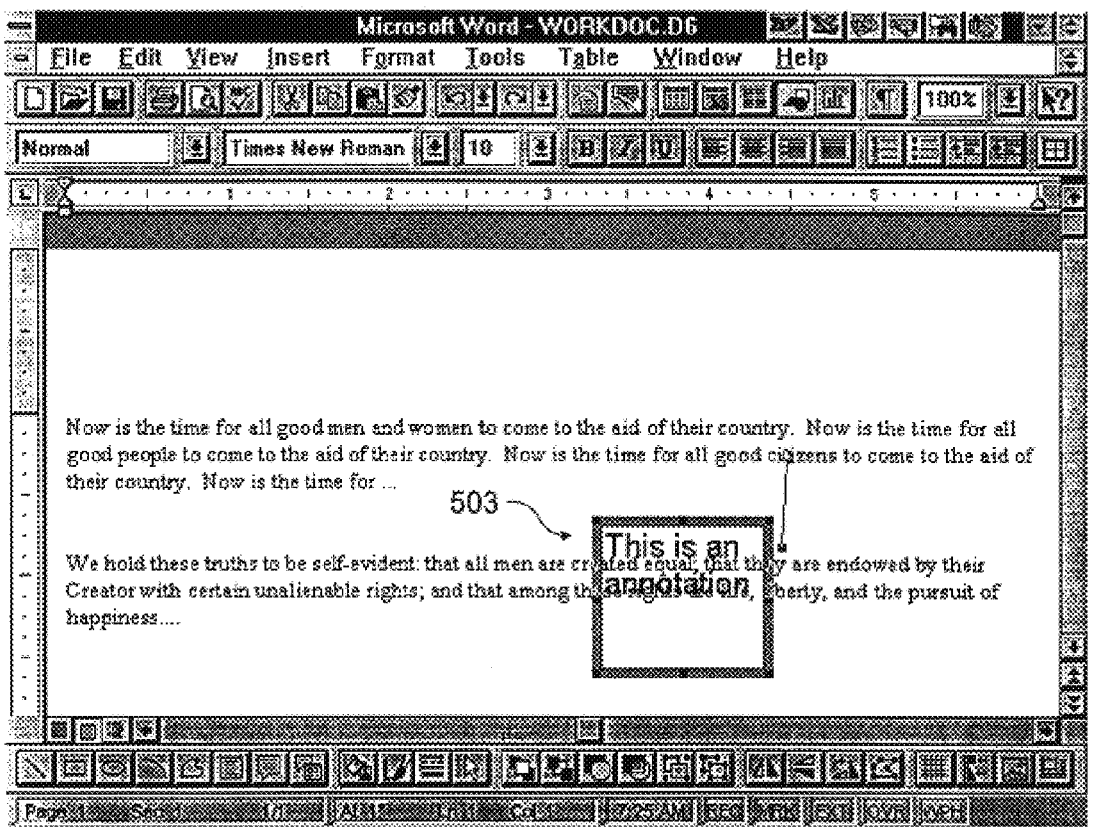

Further possible intermediate rotations are shown in FIG. 6E and FIG. 6F. FIG. 6G shows what the display would look like if the mouse button were to be released at the intermediate rotation of FIG. 6F. The intermediate rotation would becomes the final rotation, and the normal representation of the rotated callout replaces the outline representation. The original, unrotated callout 503 disappears.

Figure 6H:
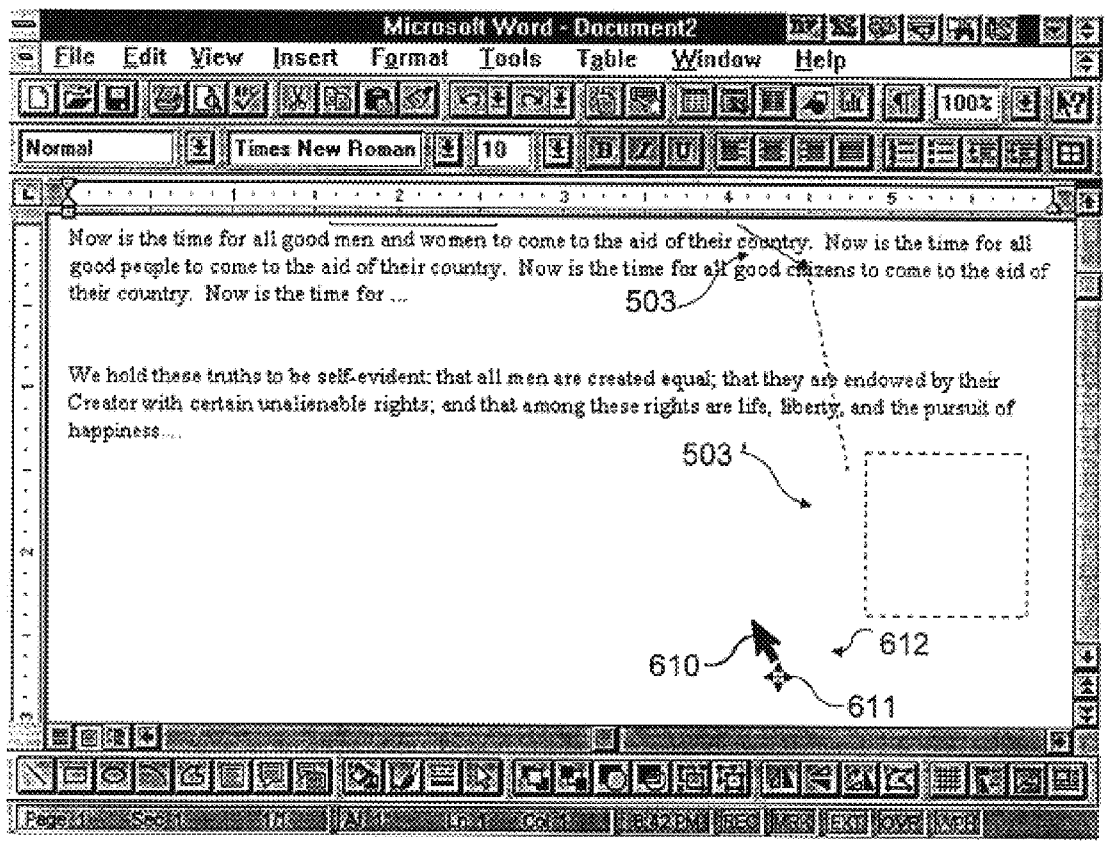

Proceeding once again from the intermediate rotation of FIG. 6F (without releasing the mouse button as was done for FIG. 6G), a still further intermediate rotation is shown in FIG. 6H. Here, the annotation region has changed automatically from its original orientation with respect to the stem to an opposite orientation. The point at which the "flip" in orientation occurs is determined automatically according to the method of the invention. For example, the "flip" can be set to occure whenever an attempt is made to rotate the stem region of the callout beyond the vertical. Also, the display window has scrolled upward to provide screen space for the rotated annotation.

Figure 6I:
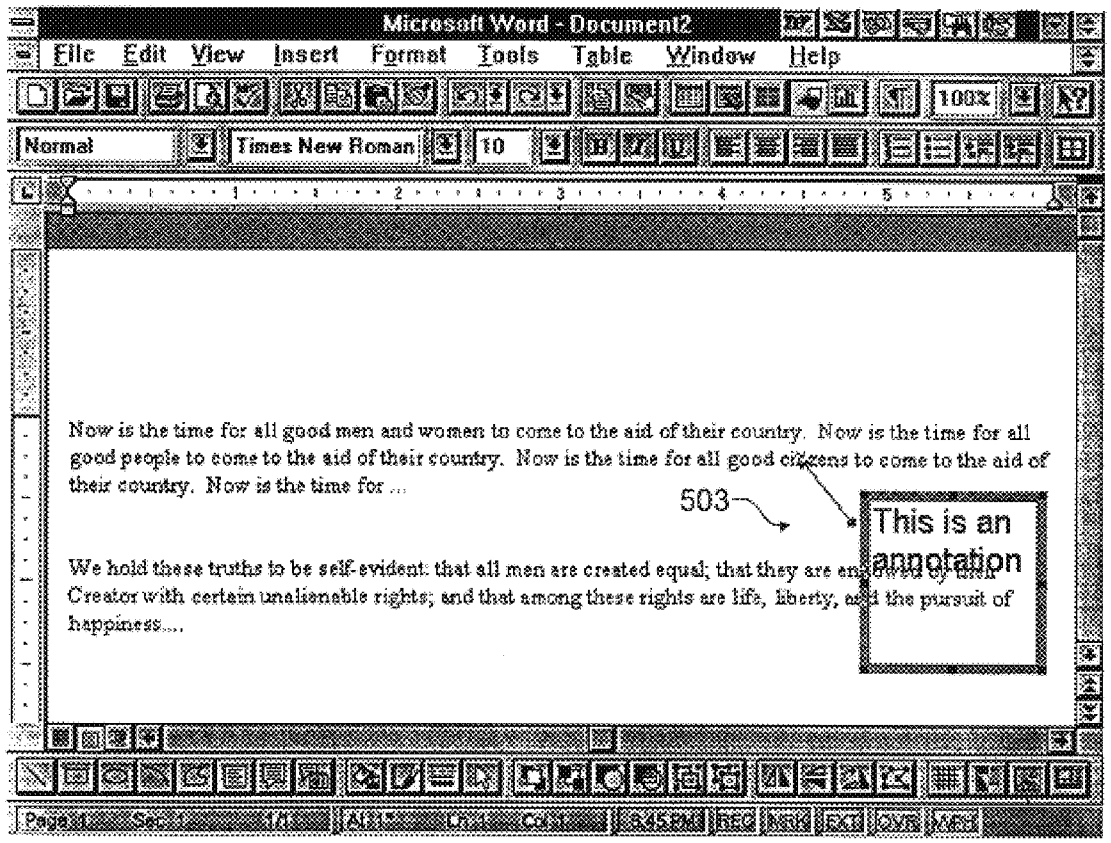

Rotation continues responsively to the motion of the mouse for so long as the mouse button is held down. When the mouse button is released, the rotation is complete and the outline view of the rotated callout is replaced by a normal view. As an example, FIG. 6I shows a possible configuration of the callout after rotation is complete. The callout in FIG. 6I is rotated beyond the rotation of FIG. 6H to a position higher in the visual field. Responsively to this further rotation, the window is automatically scrolled back downward, so that the callout can readily be seen in its new configuration. The callout is highlighted to indicate that it is still selected.

Figure 6J:
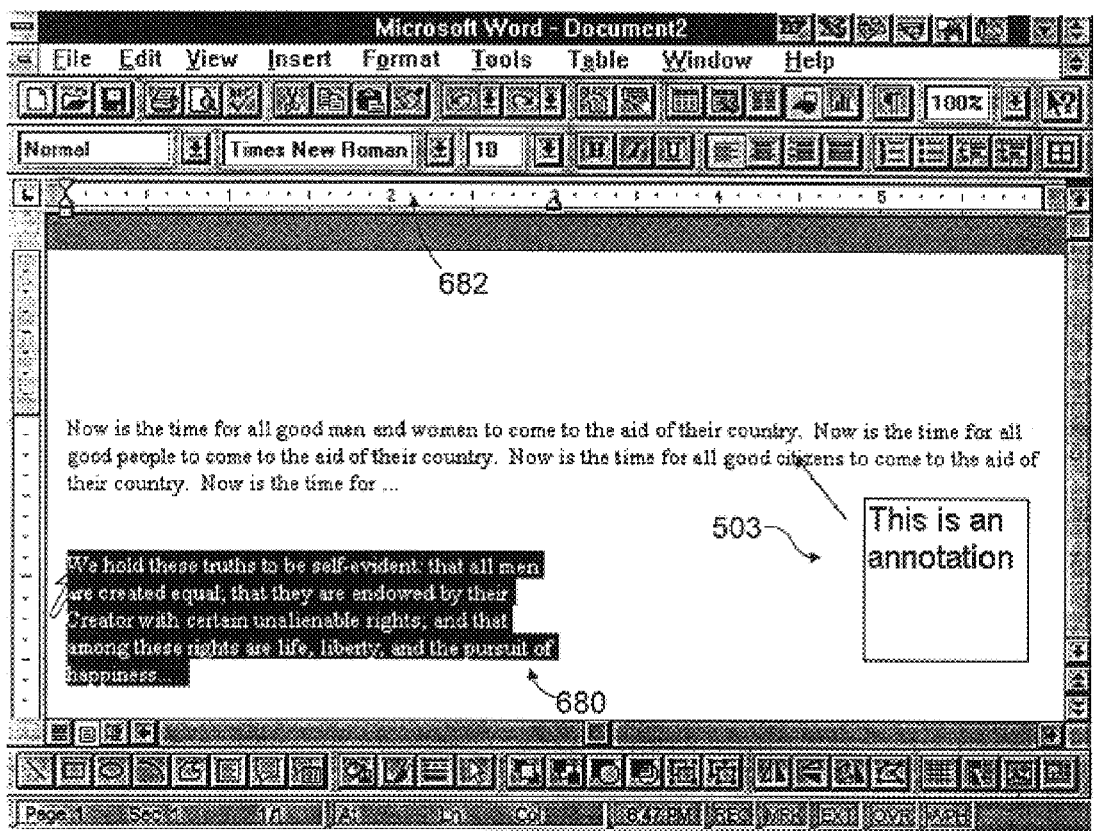
Figure 6K:
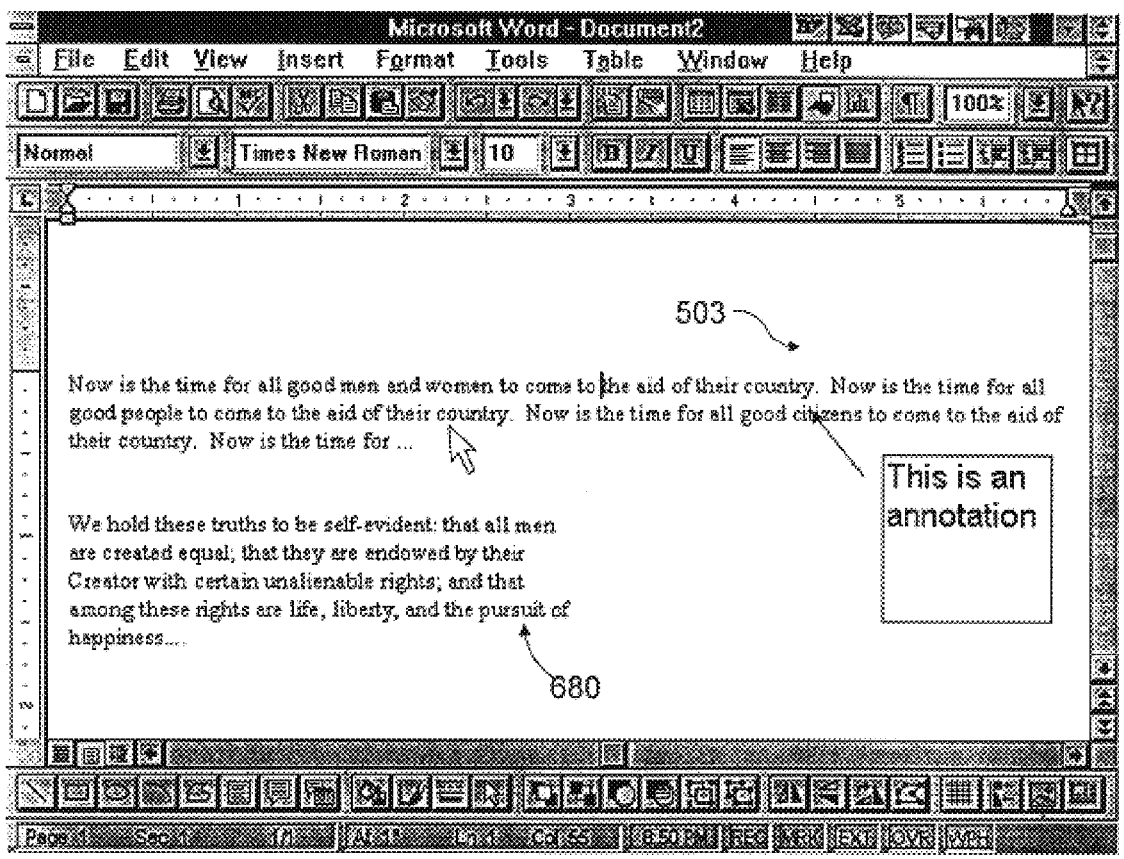

The rotation of the callout does not affect the text in the vicinity of the callout. Conversely, the text within a paragraph can be modified without affecting the callout. An example is shown in FIG. 6J, in which the margin of the second paragraph of text (paragraph 680) has been altered to make the callout more clearly visible. The alteration was achieved by selecting the paragraph (e.g., by clicking on it twice in rapid succession with the mouse) and then applying margin-setting commands from the word processing program (e.g., by using ruler 682, which appears near the top of the display, to set the margins). The final result after deselecting the modified paragraph 680 is shown in FIG. 6K.

Formatting Criteria and Types

Operations associated with the format callout tool of FIG. 4B will now be described with reference to the series of views in FIGS. 7A–7G. In particular, the notion of a callout type will be introduced, as well as other formatting criteria. (In some embodiments, the formatting criteria to be described are controlled by means other than a format callout tool, for example, by other tools or menu commands provided with the applications program.)

Figure 7A:
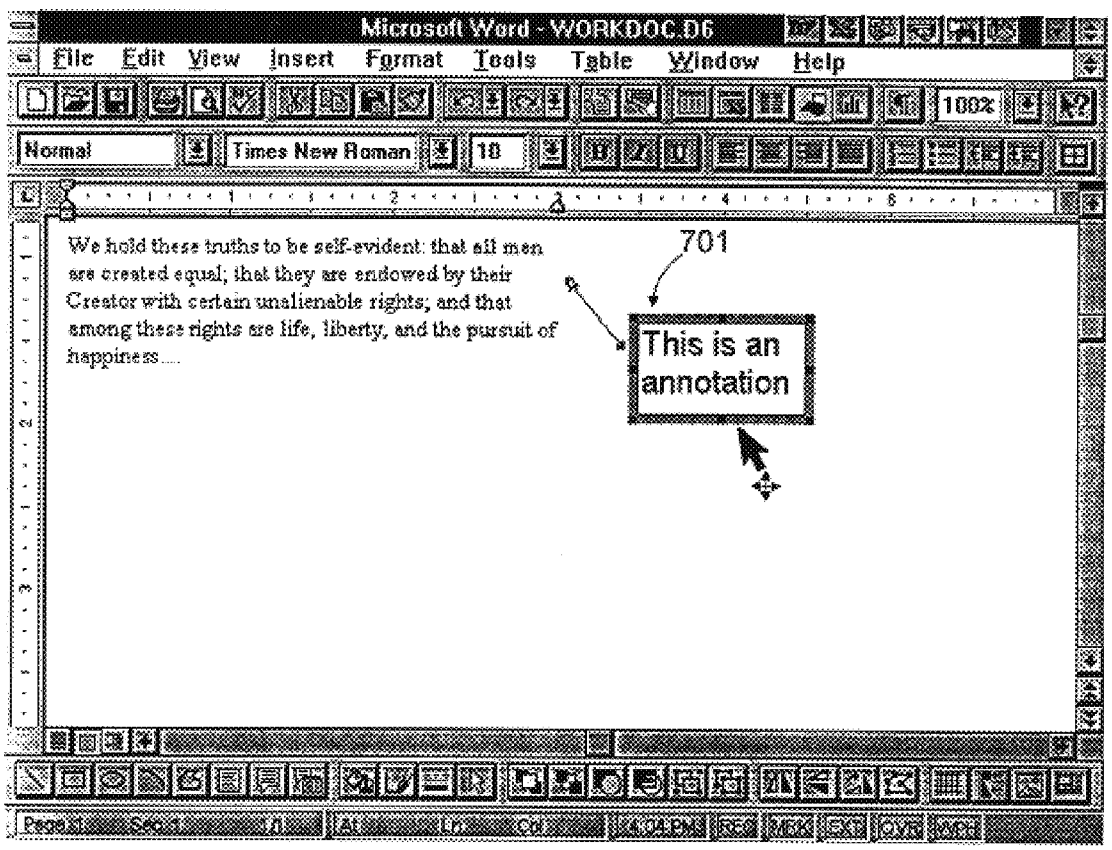
FIGS. 7A–7G are a series of views that illustrates changing the formatting criteria of a callout by changing its type.
Figure 7B:
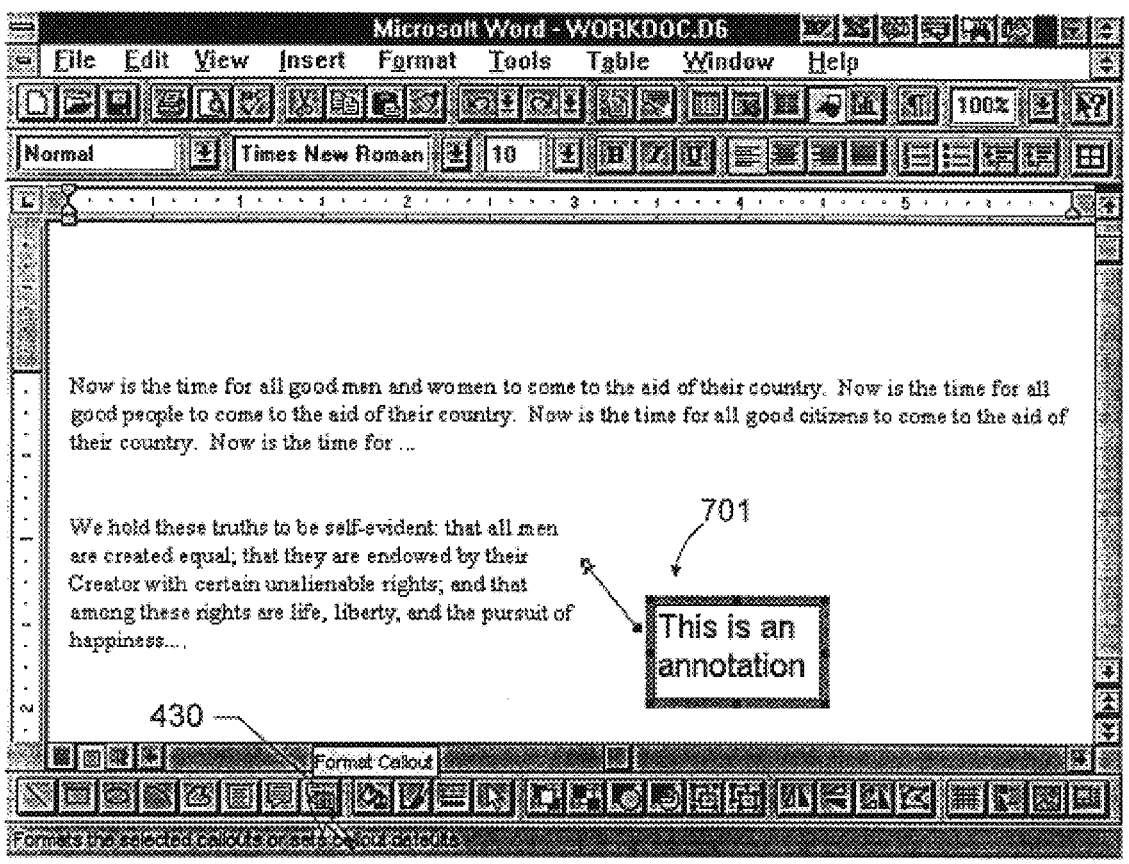
Figure 7C:
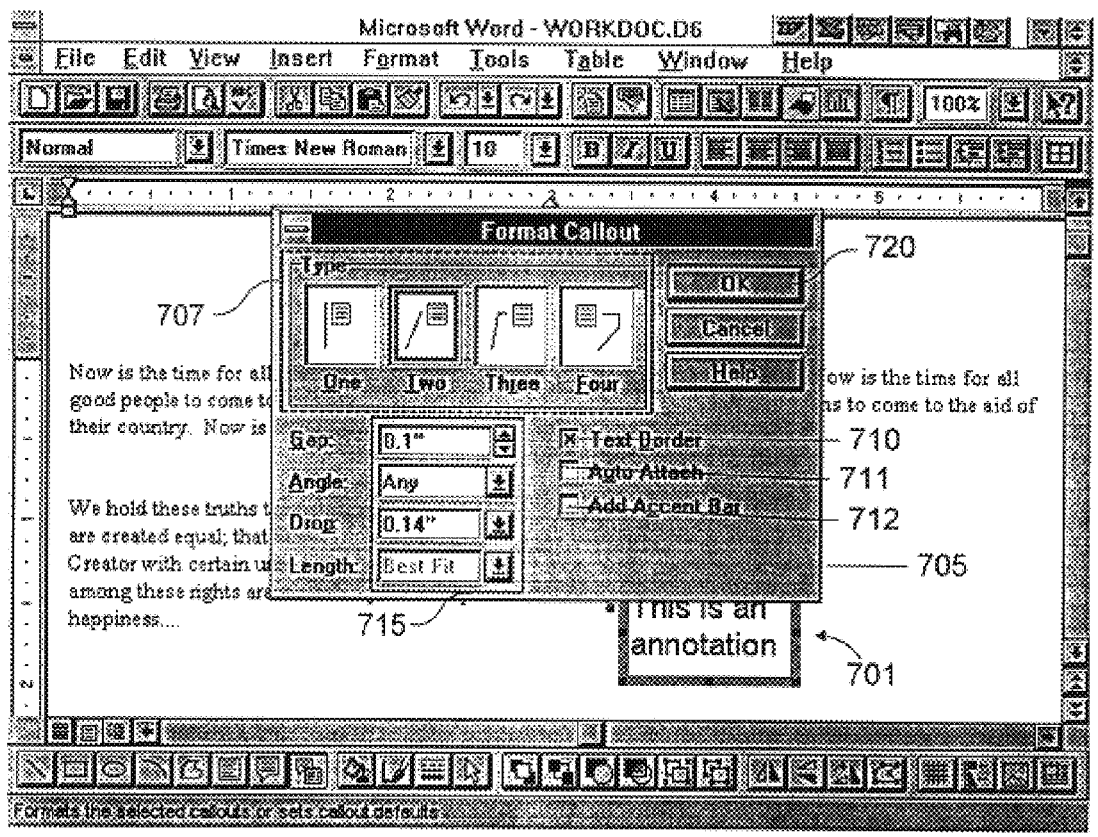

FIG. 7A shows a callout 701 that is selected and highlighted. In FIG. 7B, mouse cursor 399 is positioned over the icon 430 associated with the format callout tool. Selecting the tool by clicking on the icon causes a dialog box 705 to appear as shown in FIG. 7C.

Dialog box 705 provides for the selection or adjustment of several formatting criteria. The criteria include four types of callout, which are shown in the Type selection area 707 that appears in the upper left-hand portion of dialog box 705. Type 1 has a single-segment stem in which the segment is constrained to be either horizontal or vertical. Type 2 has a single-segment stem in which the segment can appear at any angle. Type 3 has a two-segment stem in which the segment closest to the annotation region is constrained to be horizontal. Type 4 has a three-segment stem in which the two segments closest to the annotation region form a right angle. The four types of callouts are discussed further with reference to FIGS. 8A–8O and FIG. 9 below.

Generally, for callouts of all four types the annotation region is displayed to the left or the right of the stem region. That is, the stem region connects with the annotation region at the right or left side of the annotation region, not at the top or bottom of the annotation region. One exception to this general rule is seen in the case of a Type 1 callout with its stem in a horizontal orientation, as shown, for example, in FIG. 8O.

Certain other formatting criteria are also provided via dialog box 705. Text border check box 710 controls whether the annotation region is displayed with a visible borderline or with no borderline. Accent bar check box 712 controls whether the annotation region is displayed with or without an "accent bar," that is, a vertical line segment along the side of the annotation region located closest to the stem. Drop, gap, angle, and length parameters, which will be described below with reference to FIG. 10, can be adjusted by use of controls 715, and an automatic attachment parameter, which will be described below with reference to FIGS. 12A–12B, can be selected via auto attach check box 711.

Figure 7D:
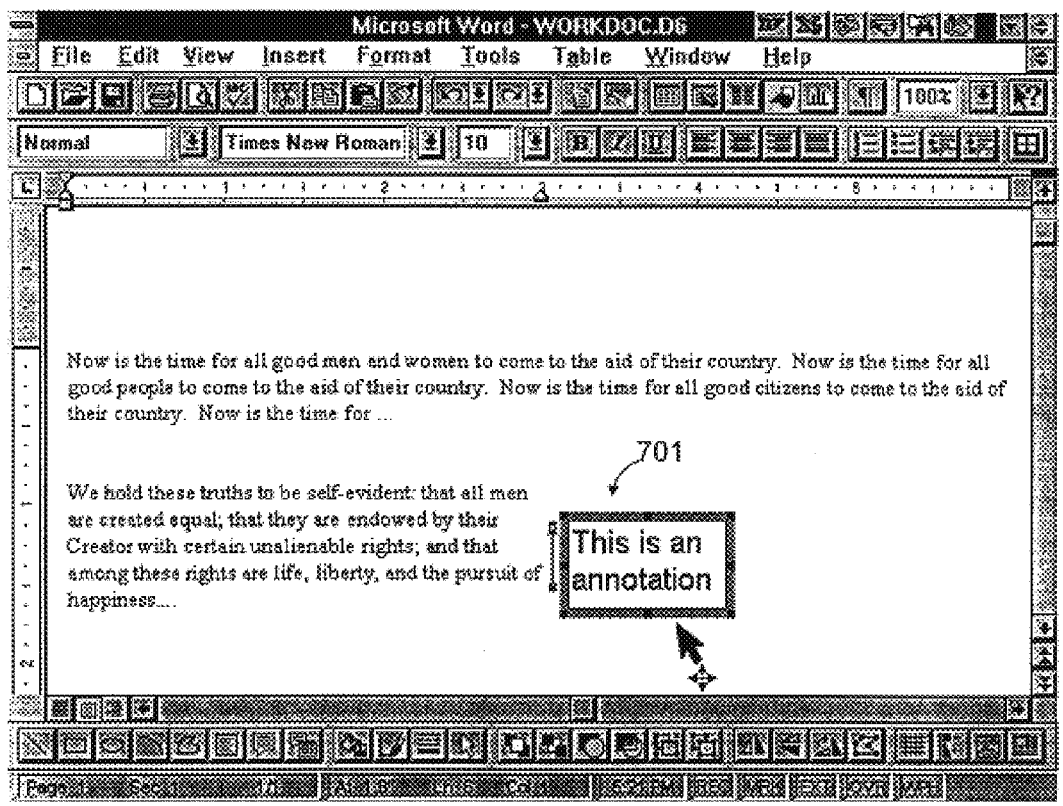
Figure 7E:
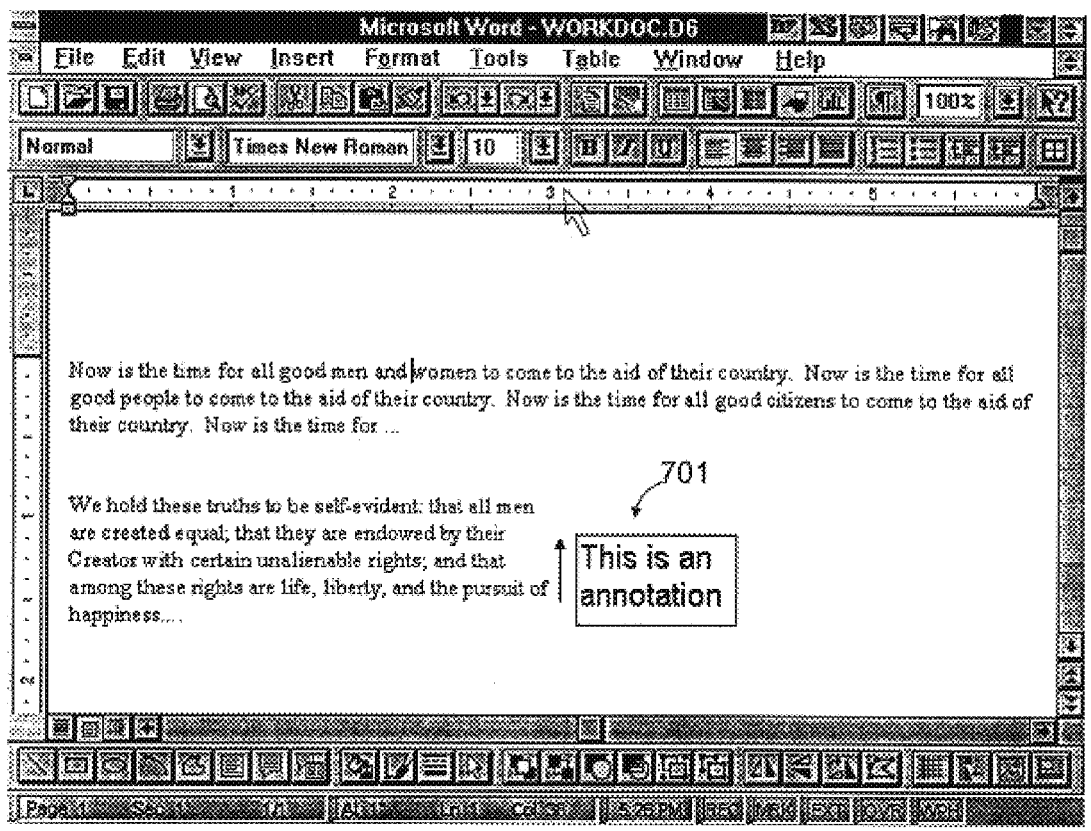
Figure 7F:
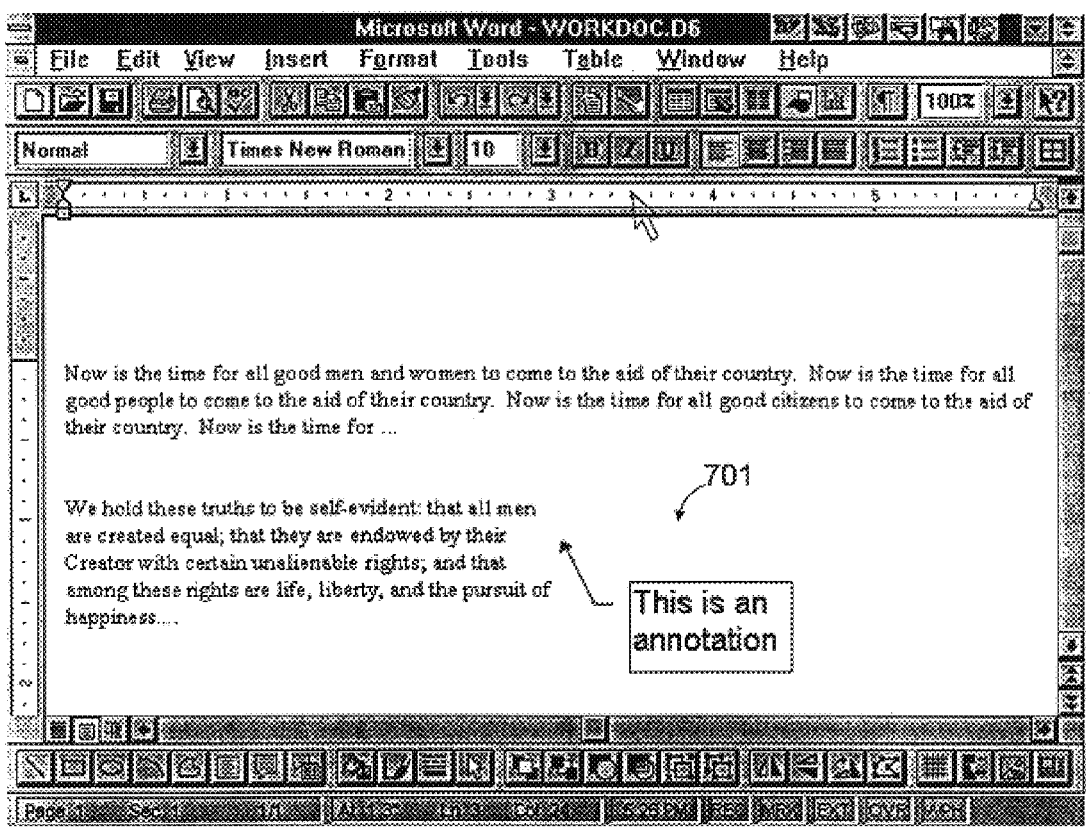
Figure 7G:
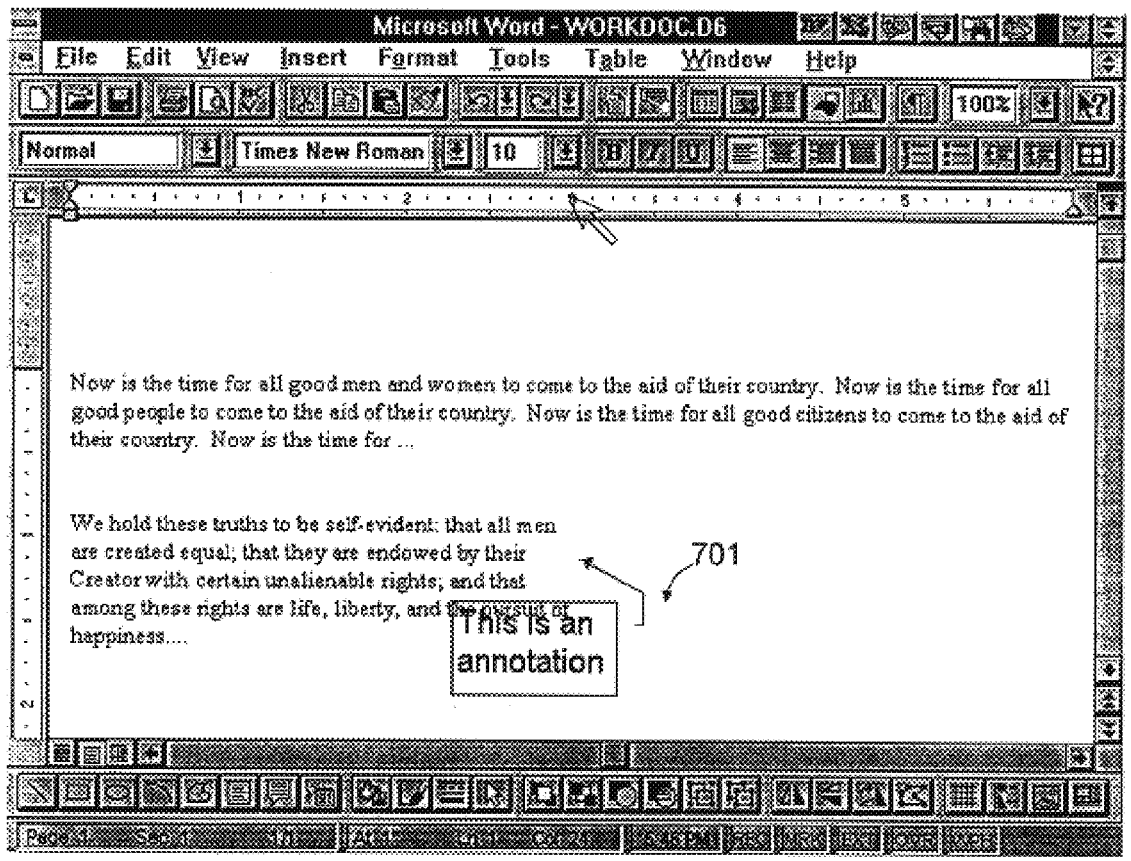

Callout 701 of FIG. 7A is a Type 2 callout. The type can be changed to any of the other three types by clicking on the icon corresponding to the desired type in area 707 of dialog box 705, and then clicking an OK button 720. Callout 701 is reconfigured to reflect the new type. It remains selected and highlighted after the type conversion. FIGS. 7D–7E show the result of converting callout 701 to Type 1. In FIG. 7D, callout 701 is still selected and highlighted.. In FIG. 7E, callout 701 has been deselected. FIG. 7F shows the result of converting callout 701 to Type 3. FIG. 7G shows the result of converting callout 701 to Type 4.

Figure 8A:
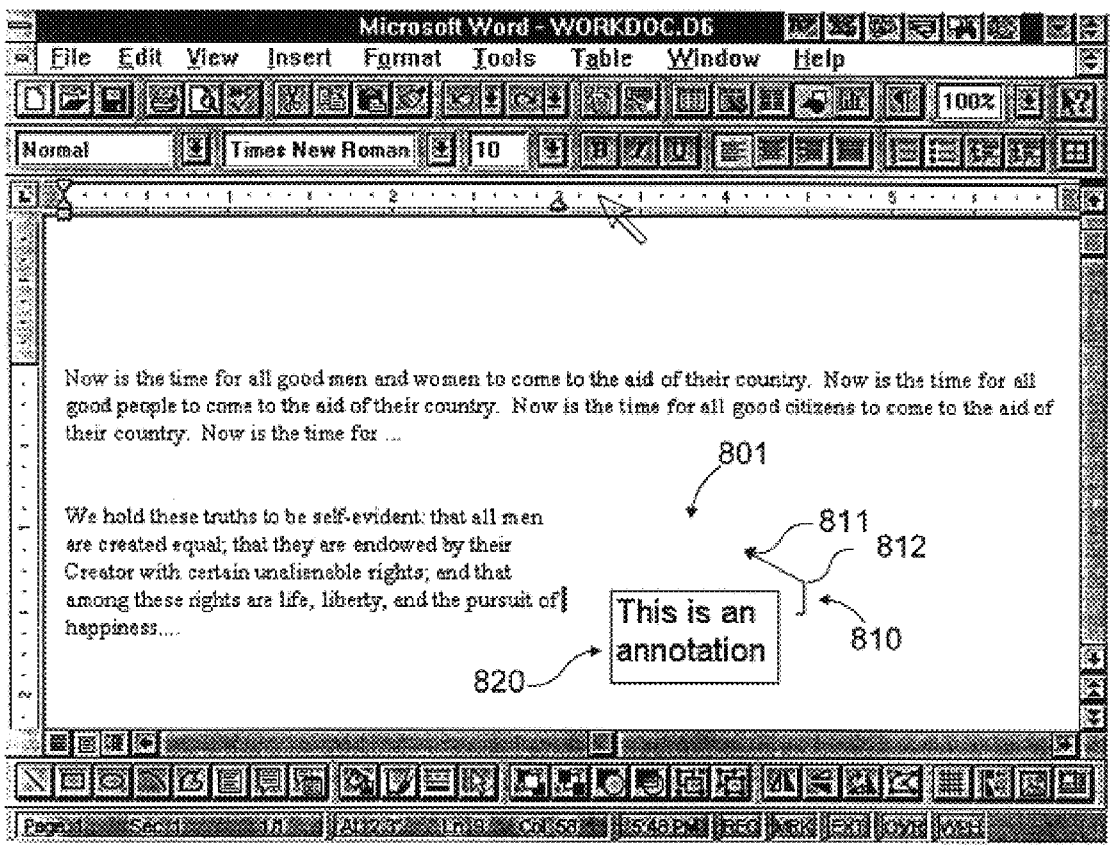
FIGS. 8A–8O are a series of views that illustrates the behavior of various callouts of different types when subjected to on-screen manipulation.
Figure 8B:
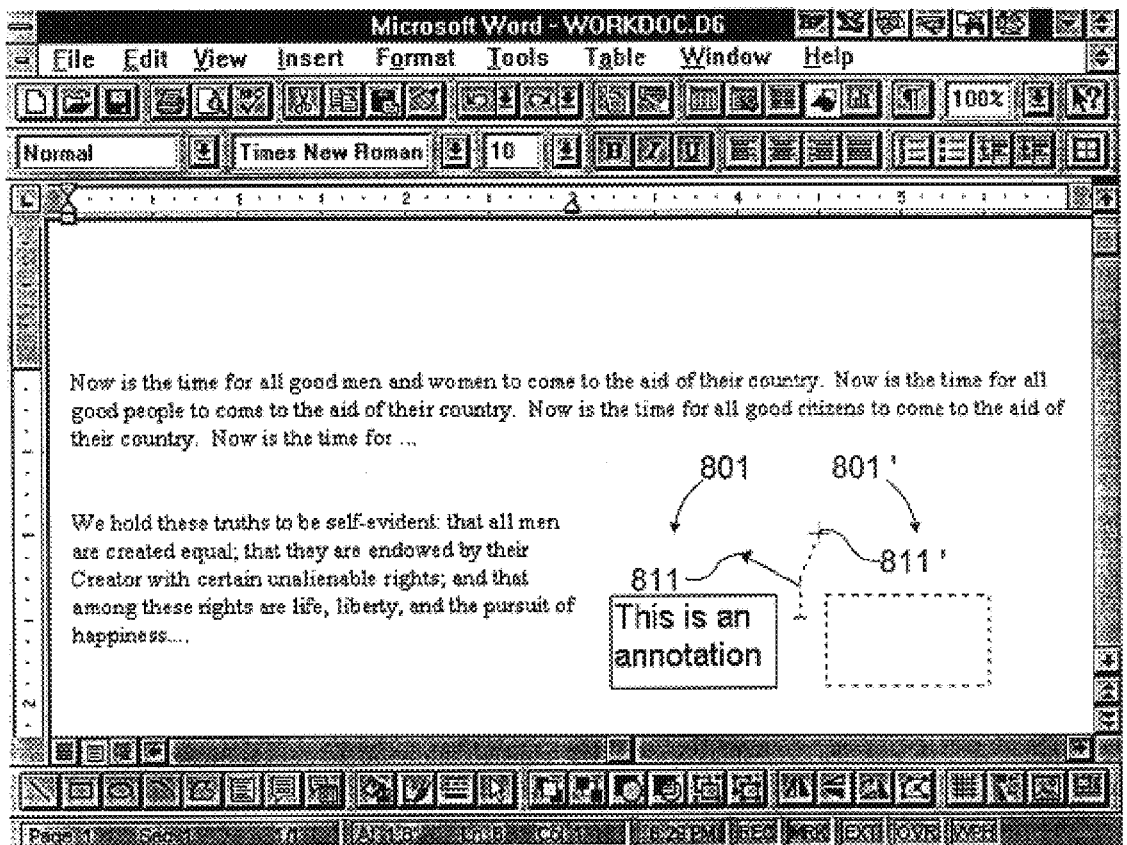
Figure 8C:
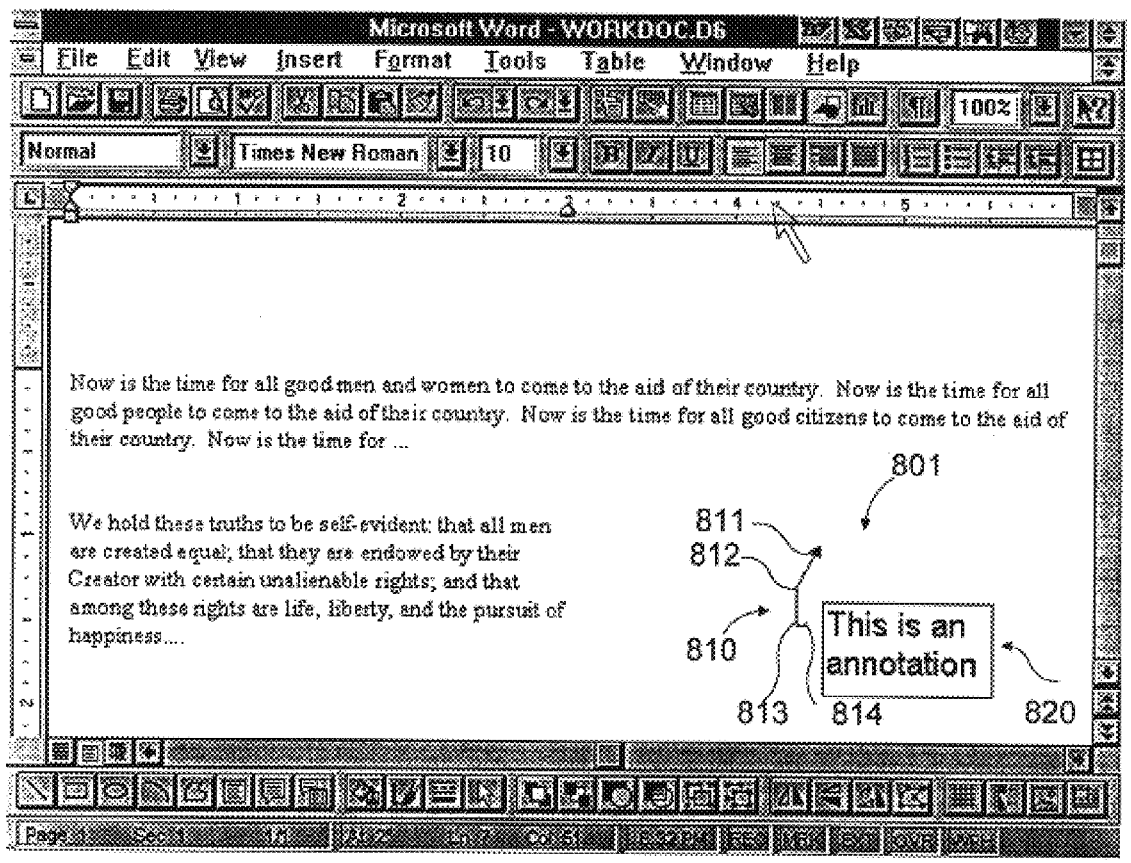
Figure 8D:
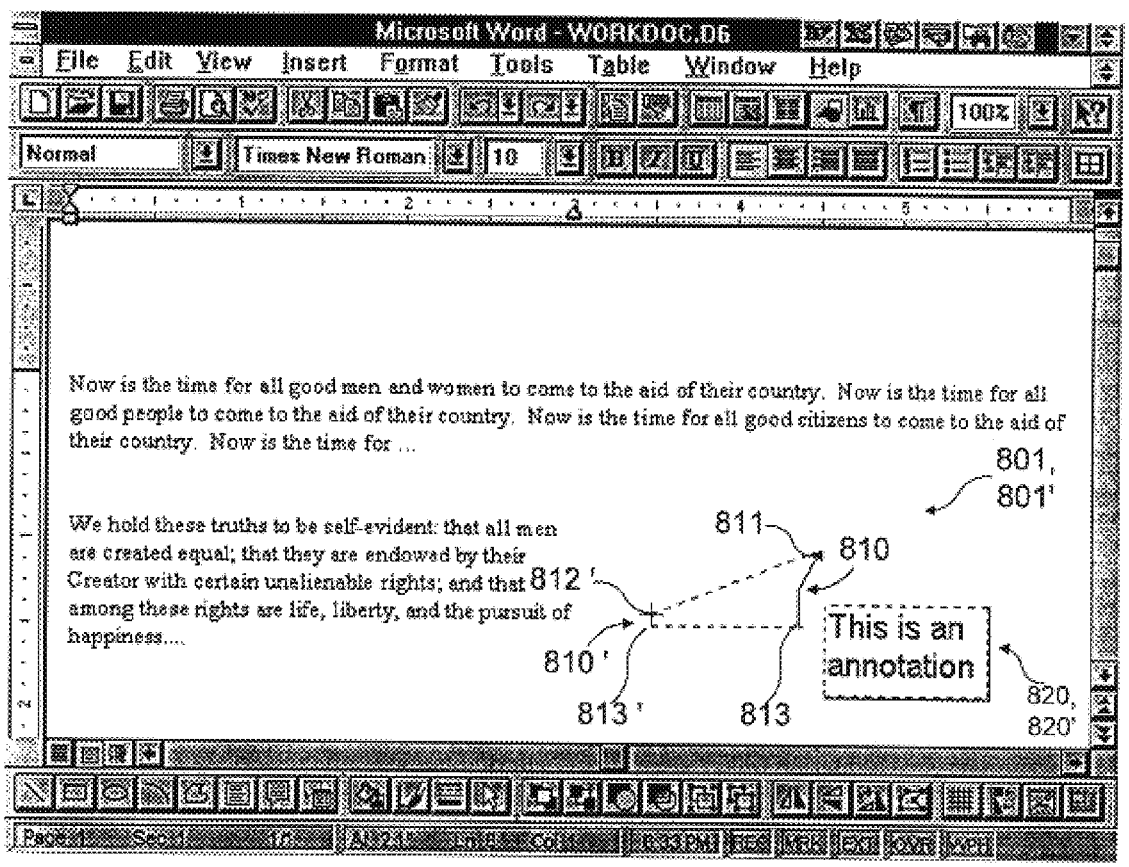
Figure 8E:
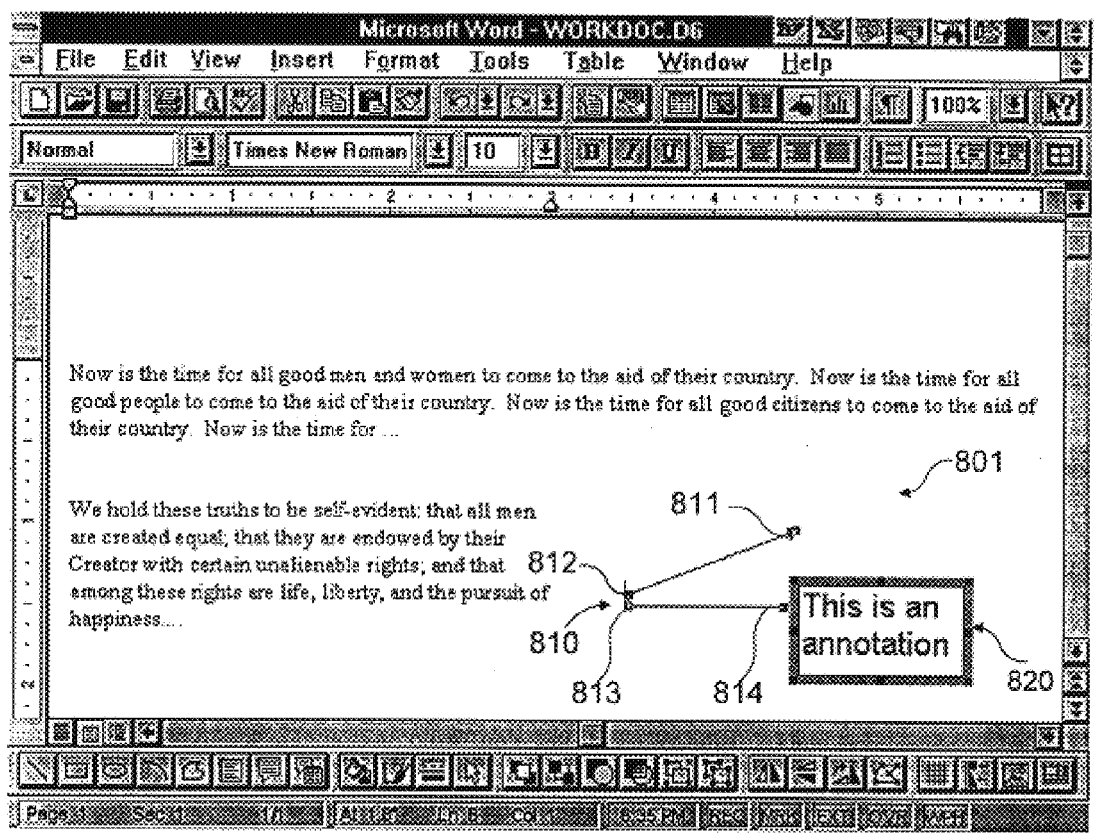
Figure 8F:
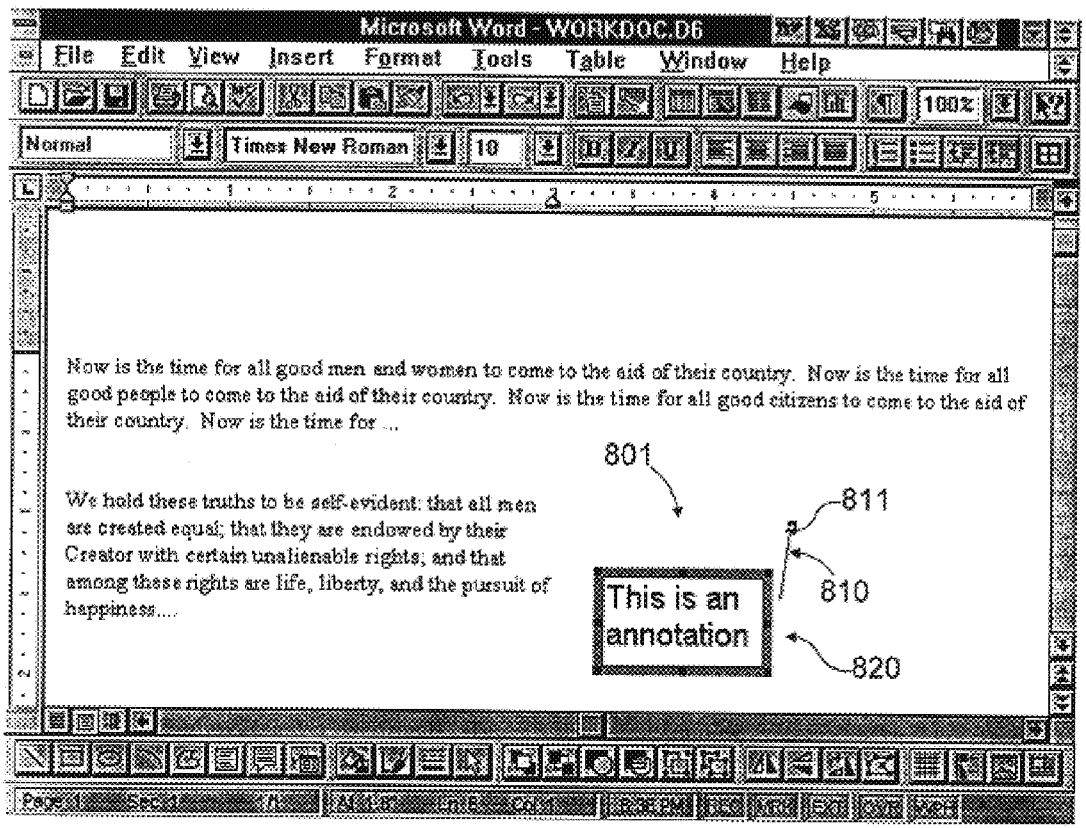
Figure 8G:
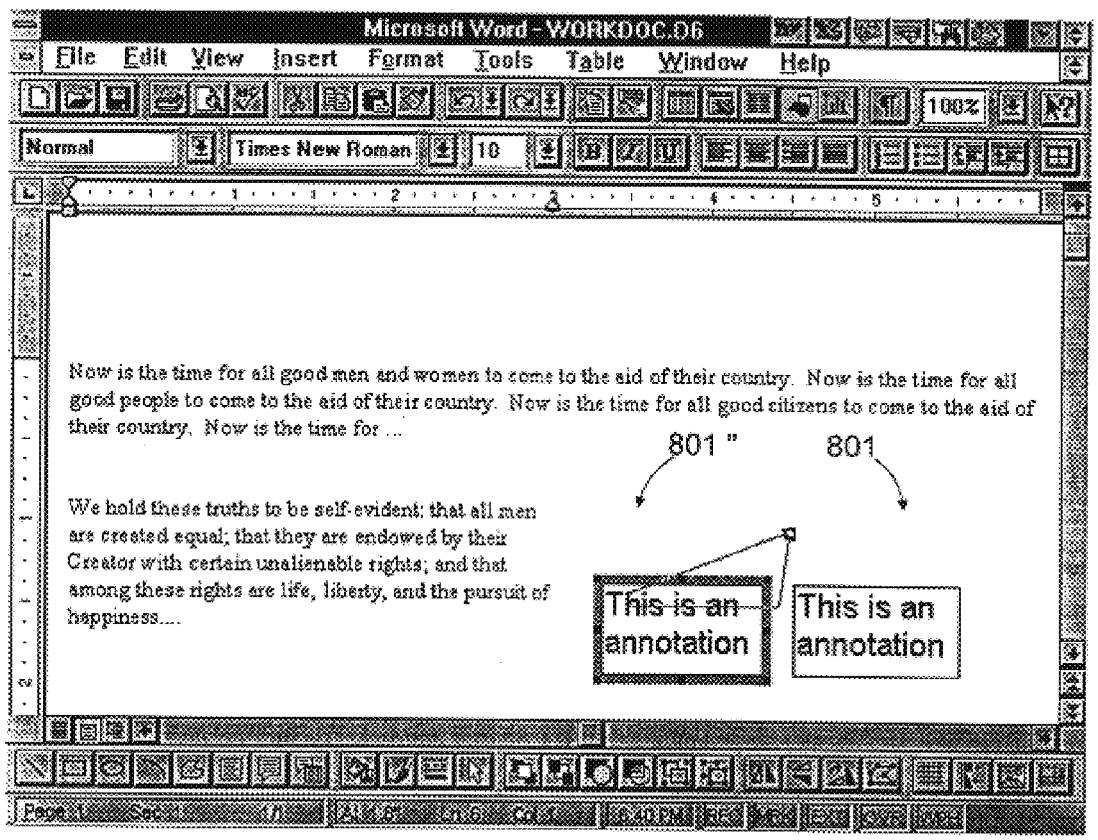

Each of the four types of callouts preserves its own characteristic behavior in response to manipulations with the mouse, in particular to rotation and resizing manipulations. This is illustrated in FIGS. 8A–8O. FIG. 8A shows a Type 4 callout 801.

The stem region 810 is rotated with respect to the annotation region 820 by dragging the stem origin 811. FIG. 8B shows an intermediate view during this rotation. The stem origin appears both in its original location (stem origin 811) as part of a normal view of callout 801, and in its rotated location (stem origin 811') as part of an outline view of rotated callout 801'. FIG. 8C shows the result upon completion of the rotation. The outline view disappears and callout 801 is shown in its new configuration.

The callout stem can be reshaped or resized by dragging any one of its handles, which are located at the inflection points between the component segments (points 812, 813) and at either end (stem origin 811 and point 814). For example, if the second handle 812 below stem origin 811 in FIG. 8C is moved to the left, stem region 810 stretches in response, as shown in the intermediate view of FIG. 8D. The modified callout is shown in an outline view 801', in which inflection points 812, 813 appear at their new positions 812', 813' and stem region 810 is moved to its new configuration 810'. Annotation region 820 occupies the same location as its modified counterpart 820'. Releasing the mouse button produces the result shown in FIG. 8E. The outline view disappears and the callout 801 is shown in its new configuration.

If the callout is now converted to a new type, the previous rotation and reshaping operations preferably are preserved to the extent possible. For example, if the format callout tool is reselected and the callout of FIG. 8E is changed to Type 3, the result is as shown in FIG. 8F. The location of stem origin 811 is preserved. Also, the overall size and direction of stem region 810 is approximately preserved. The annotation region 820 is translated so as to be oriented away from the stem's horizontal segment. A visual comparison between the Type 4 and Type 3 callouts is readily made by reference to FIG. 8G, an artificially constructed image in which superposes callout 801 as it appears prior to type conversion (deselected) with callout 801" as it appears after conversion to Type 3 (selected and highlighted).

Figure 8H:
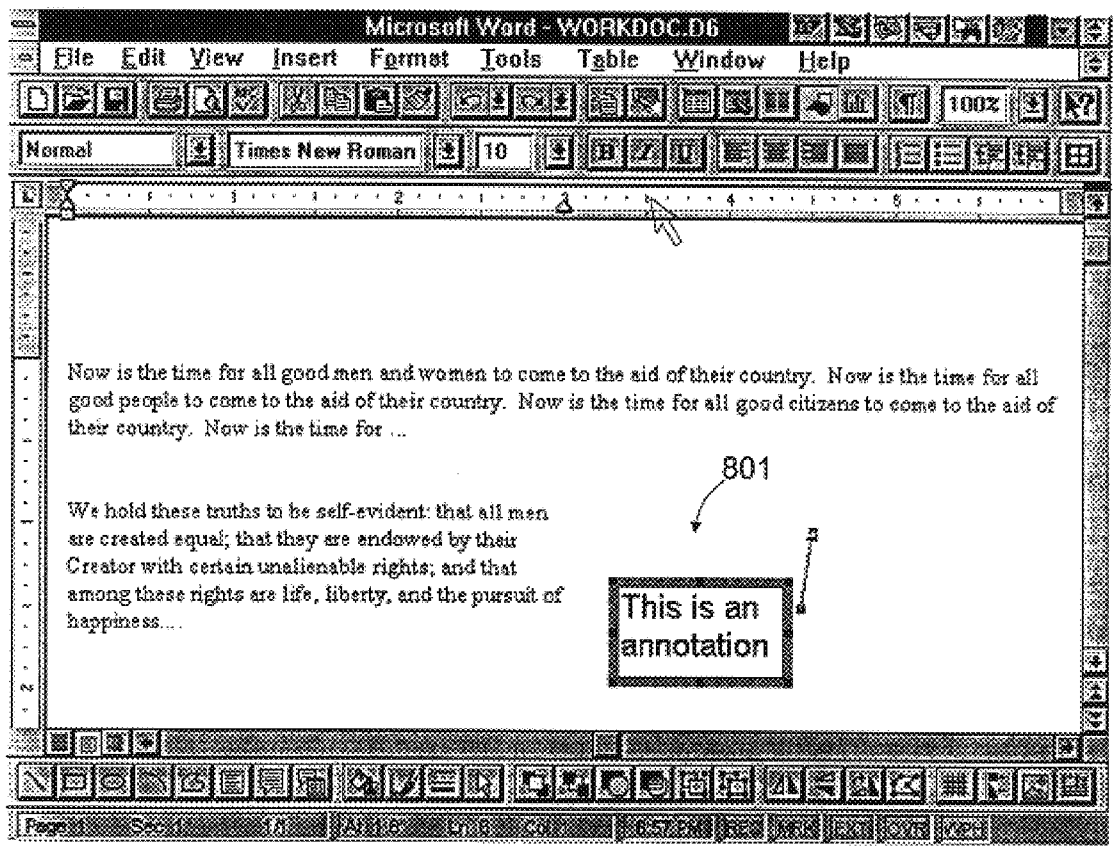
Figure 8I:
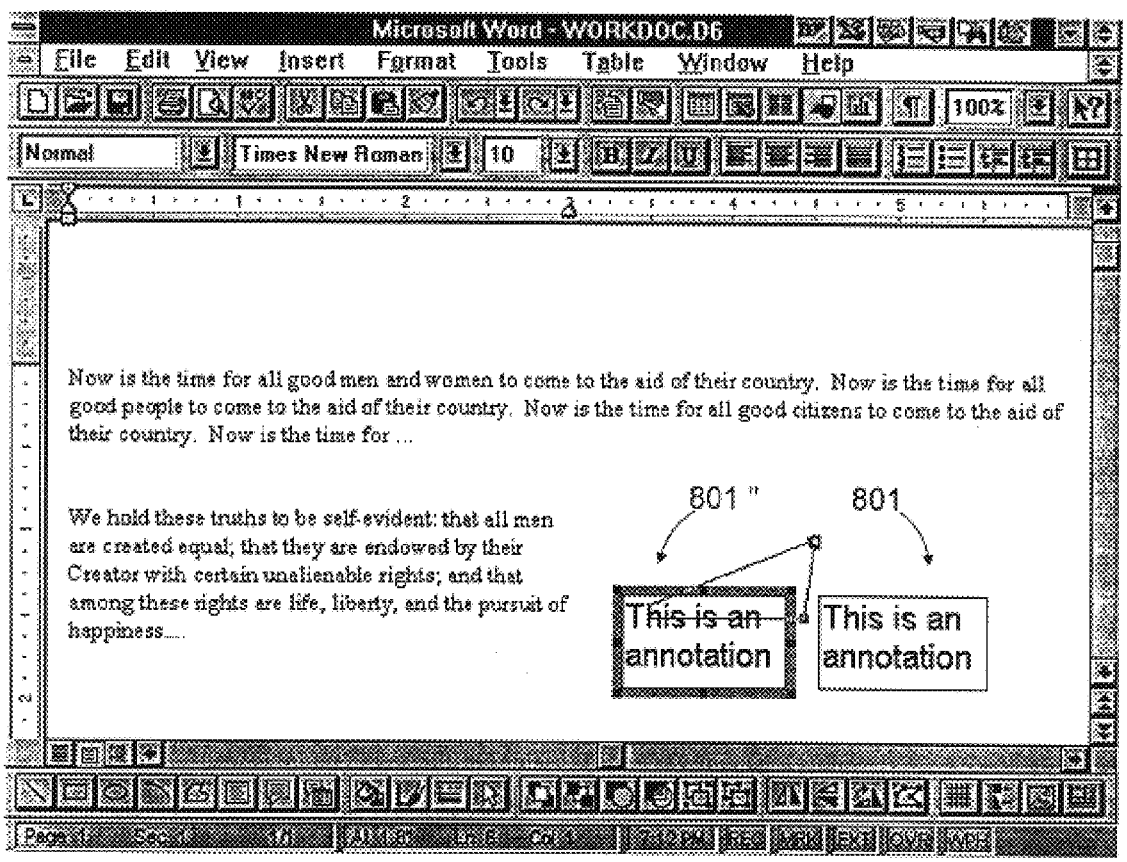

Changing callout 801 from Type 4 to Type 2 results in the display of FIG. 8H. Artificially superposing the Type 4 ("before") and Type 2 ("after") images 801, 801" in the manner of FIG. 8G produces the comparison image of FIG. 8I. Converting callout 801 to Type 1 yields the display of FIG. 8J.

Figure 8J:
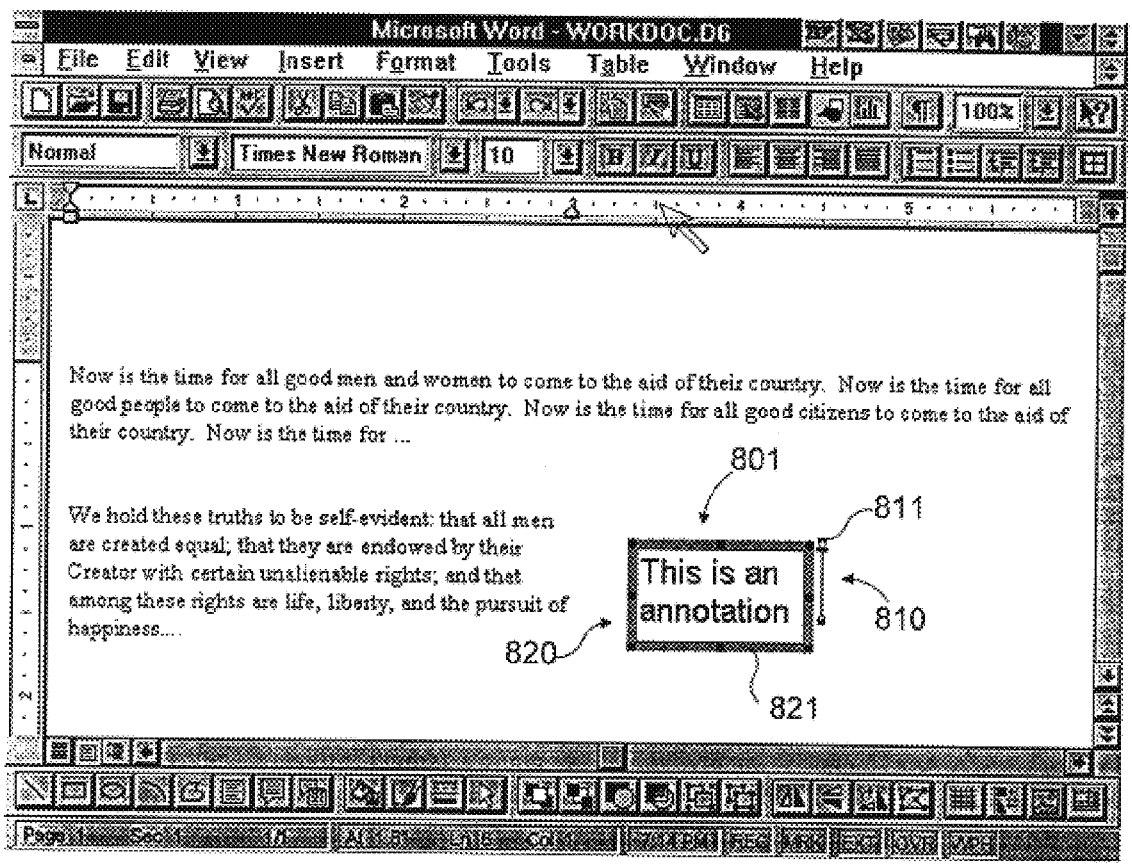
Figure 8K:
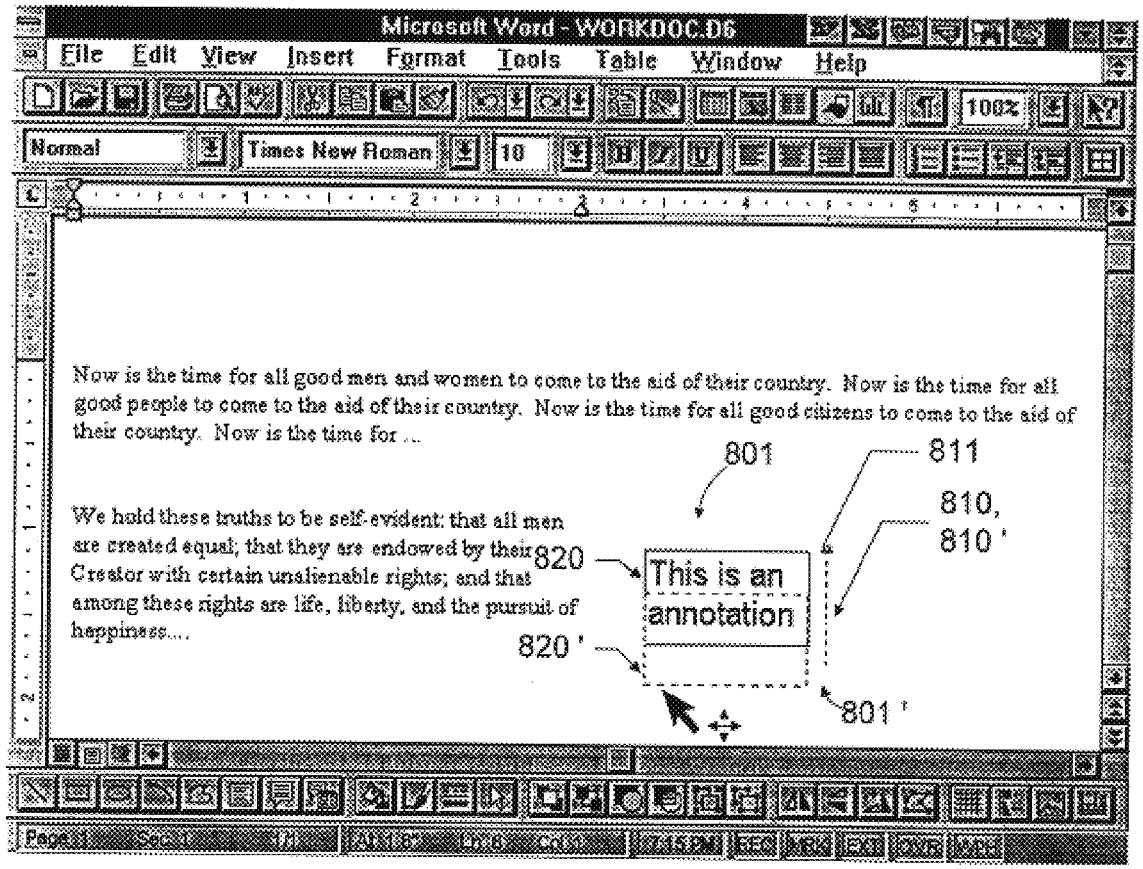
Figure 8L:
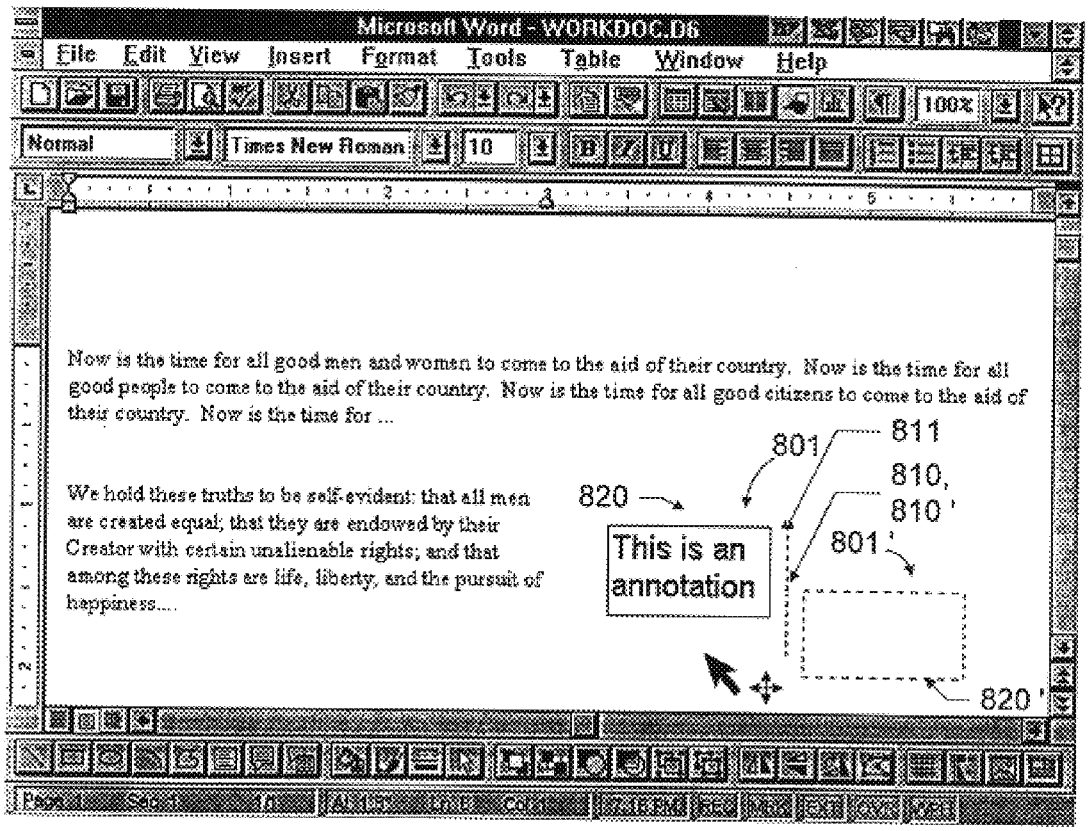
Figure 8M:
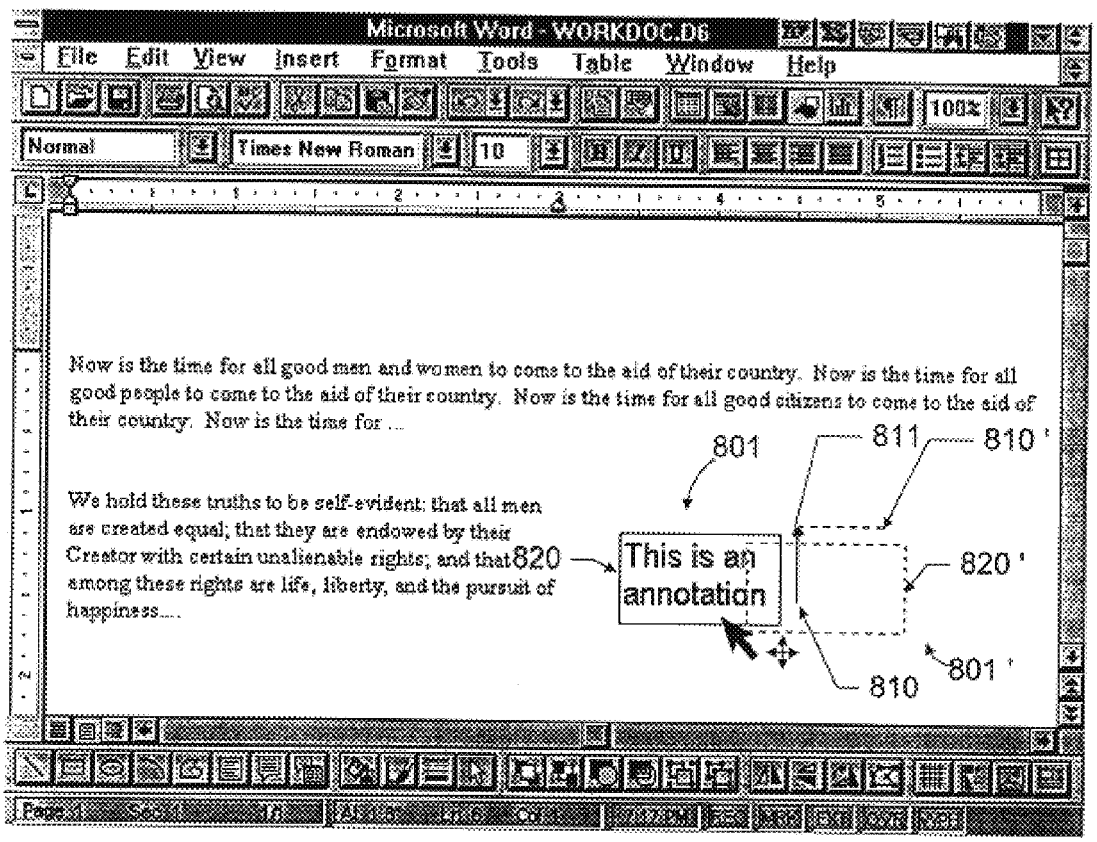
Figure 8N:
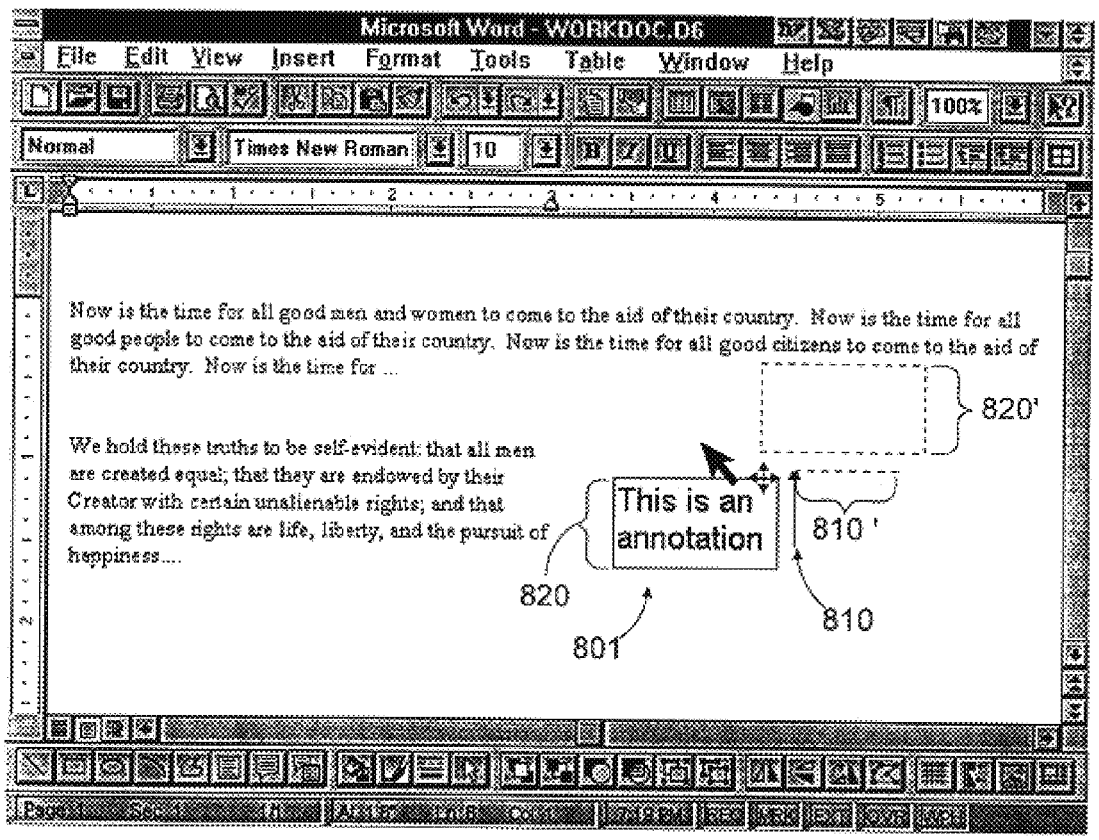
Figure 8O:
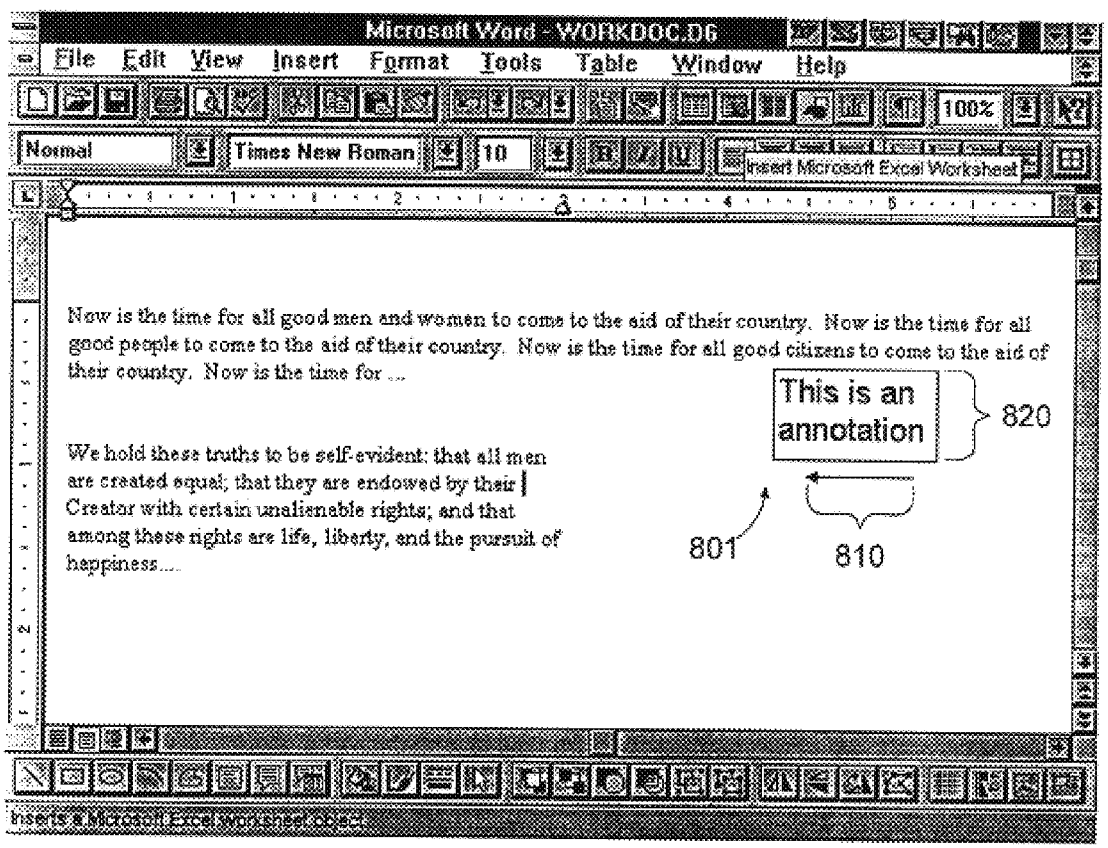

Type 1 callouts exhibit certain characteristic behavior when subjected to rotations. If the thick portion of the highlighted annotation region border 821 of the callout of FIG. 8J is dragged downward, using a location on the border other than a handle, an attempt is made to rotate annotation region 820 counterclockwise about stem origin 811. Because stem region 810 is constrained to be either horizontal or vertical, however, the result is that annotation region 820 moves straight downward to a new location 820', as shown in the intermediate view of FIG. 8K, and then at some point snaps to the opposite orientation with respect to the stem, as shown in the intermediate view of FIG. 8L. Continued attempted rotation causes rotated stem region 810' to snap from vertical to horizontal, as shown in the intermediate view of FIG. 8M, and then later causes rotated annotation region 820' to snap to a position above rotated stem region 810', as shown in the intermediate view of FIG. 8N. If at this point the mouse button is released, the last intermediate rotation as depicted in FIG. 8N becomes the final rotation, resulting in the display of FIG. 8O.

Figure 9:
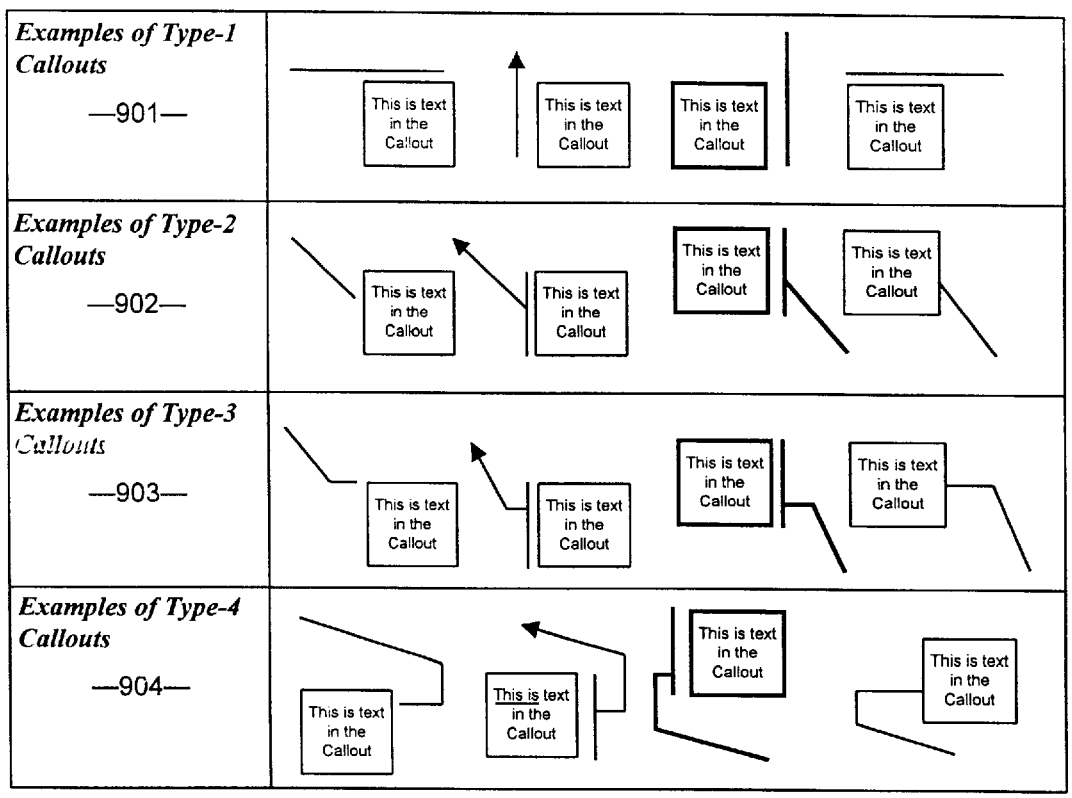
FIG. 9 summarizes examples of four types of callouts.

FIG. 9 presents a summary of the four types of callouts by way of further examples. In the Type 1 callouts (row 901), the stem region is always a single vertical or horizontal line segment. In the Type 2 callouts (row 902), the stem region is a single segment of any angle. In the Type 3 callouts (row 903), the stem includes a horizontal line segment and a line segment of any angle, with the horizontal line segment being located closest to the annotation region. In the Type 4 callouts (row 904), the stem includes a horizontal line segment located closest to the annotation region, a vertical line segment at right angles to the horizontal segment, and a last segment of any angle located closest to the stem origin. The callouts are displayed variously with and without accent bars, arrowheads, and thick or thin line widths.

In some embodiments, other callout types can be provided in addition to or instead of the four described above. For example, callouts can be provided with different numbers and angles of segments in the stem region (e.g., a four-segment stem can be provided, or a two-segment stem in which both segments can be at any angle); with alternate shapes and appearances for the stem region (e.g., curved, hollow, textured); with nonrectangular shapes and appearances for the annotation region (e.g., oval, curved textured); or with different relationships between the annotation region and stem region (e.g., the stem joins the annotation region at the center of the top or bottom border of the annotation region, the annotation region appears in the middle of the stem instead of at one end). Other possibilities will be apparent to those skilled in the art.

Drop, Gap, Length, and Angle

Figure 10:
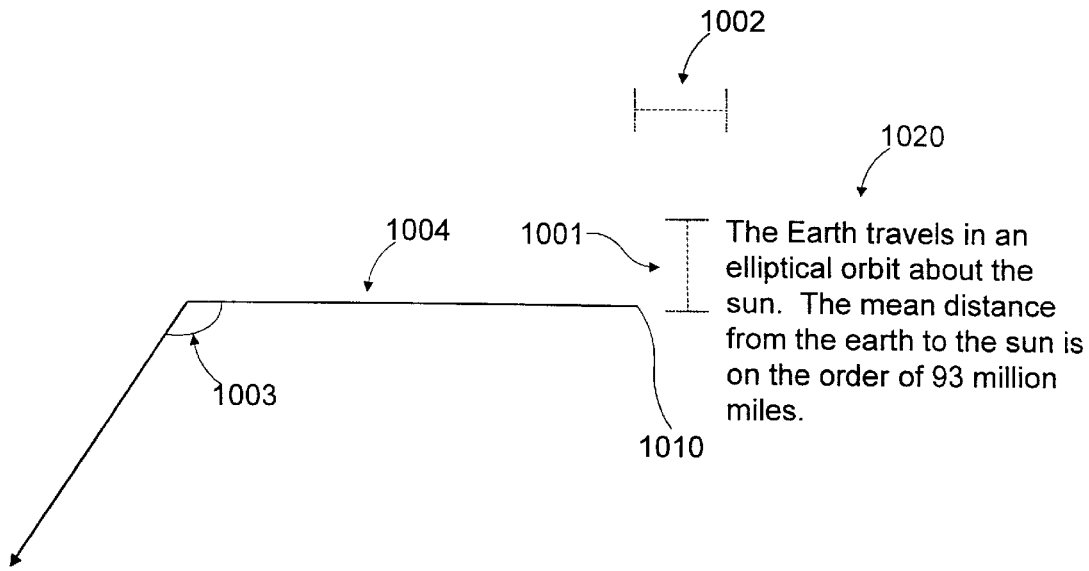
FIG. 10 illustrates length, drop, gap, and angle parameters.

FIG. 10 illustrates the drop, gap, length, and angle formatting parameters. The drop parameter controls the vertical distance 1001 between the stem endpoint 1010 nearest to the annotation region 1020 and the upper border of the annotation region 1020. It can be set to a numerical value indicating a distance from the top border, or to a value of Top, Center, or Bottom, in which case stem endpoint 1020 is positioned respectively at the top, center, or bottom of the border of the annotation region to which the stem connects (that is, to which the stem attaches or most closely approaches).

The gap parameter controls the horizontal distance 1002 between the stem endpoint 1010 nearest to the annotation region 1020 and the border of the annotation region to which the stem connects. It is set to a numerical value indicating a distance from the side border.

The angle parameter applies to callouts of Type 2, Type 3, or Type 4. It controls the angle 1003 with respect to the horizontal of the segment of the stem closest to the callout origin. The angle parameter can be set to a fixed numerical value or to a value of Any. Setting it to a numerical value fixes the stem angle at the chosen value and constrains the motion of the callout when rotation is attempted so that the angle is preserved and, instead of rotating, the stem is reshaped consistently with the angle constraint and the annotation region is translated. Setting the angle parameter to a value of Any frees the stem to rotate responsively to mouse manipulations as described previously with reference to FIGS. 6A–6K and elsewhere. The angle parameter is not used with callouts of Type 1.

The length parameter applies to callouts of Type 3 and Type 4. It controls the length of the segment of the stem region closest to the annotation region (segment 1004), that is, the segment that is always horizontal. Setting the length parameter to a numerical value constrains the length of the segment to the chosen value. Setting the length parameter to a value of Best Fit causes the length of the segment to be adjusted automatically, for example as seen in the type conversion examples previously described with reference to FIGS. 8A–8O. The length parameter is not used with callouts of Type 1 or Type 2.

When a Type-3 callout is initially created, if its length parameter is set to Best Fit and its angle is set to Any, the callout can be constructed with a default aspect ratio, such as one-half. The aspect ratio is the ratio of the length of the always-horizontal stem segment to the length of the horizontal projection of the entire stem. Put another way, an aspect ratio of one-half implies that the segment extending from the end of the stem nearest the annotation region to the inflection point of the Type-3 callout is equal in length to the horizontal projection of the segment between the inflection point and the end of the stem farthest from the annotation region. The aspect ratio can be changed to a new value when the callout is subsequently edited. For example, it can be changed by dragging the handle located at the inflection point.

Figure 11A:
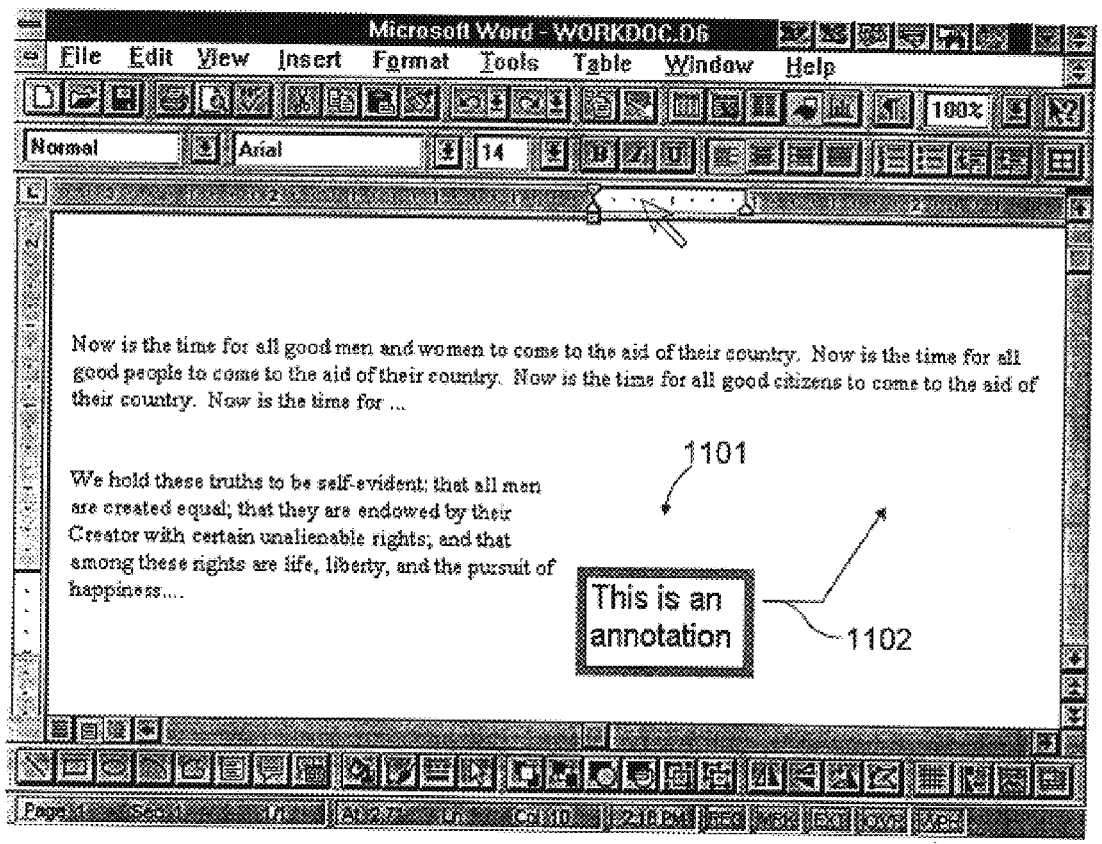
FIGS. 11A–11C are a series of views that illustrate a type conversion with nonzero length parameter.
Figure 11B:
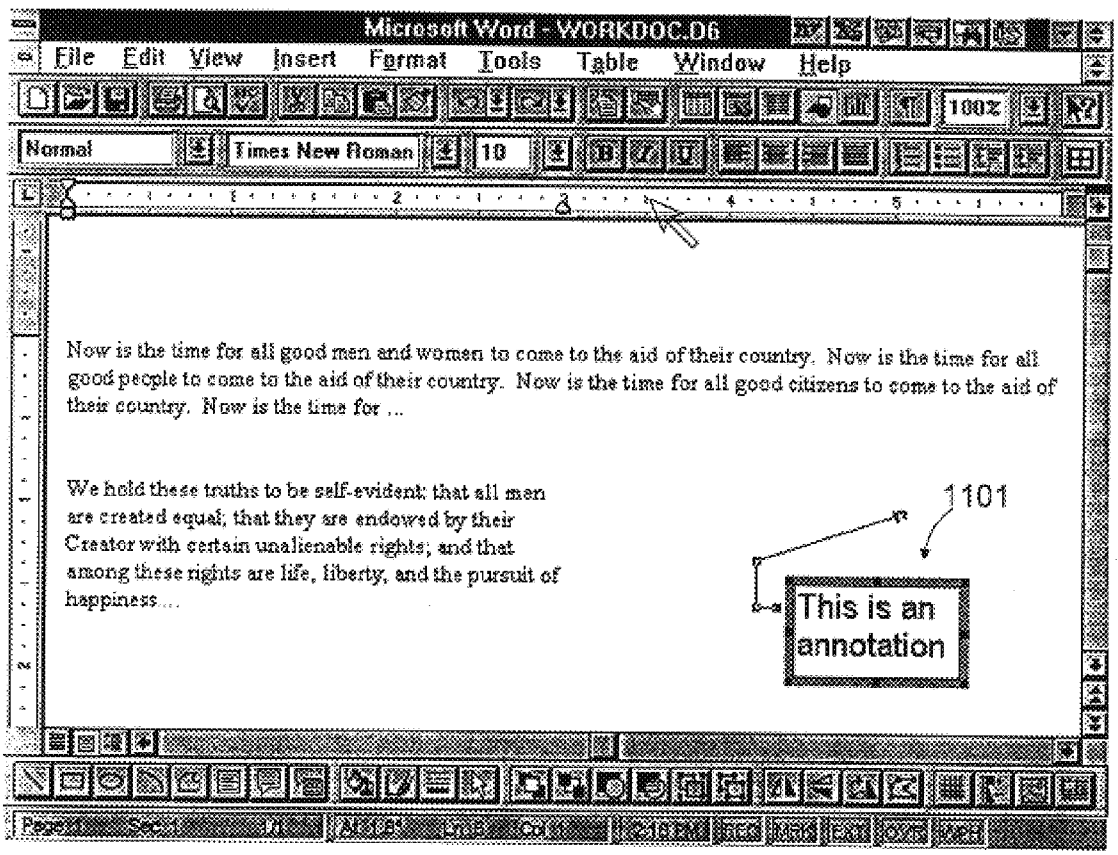
Figure 11C:
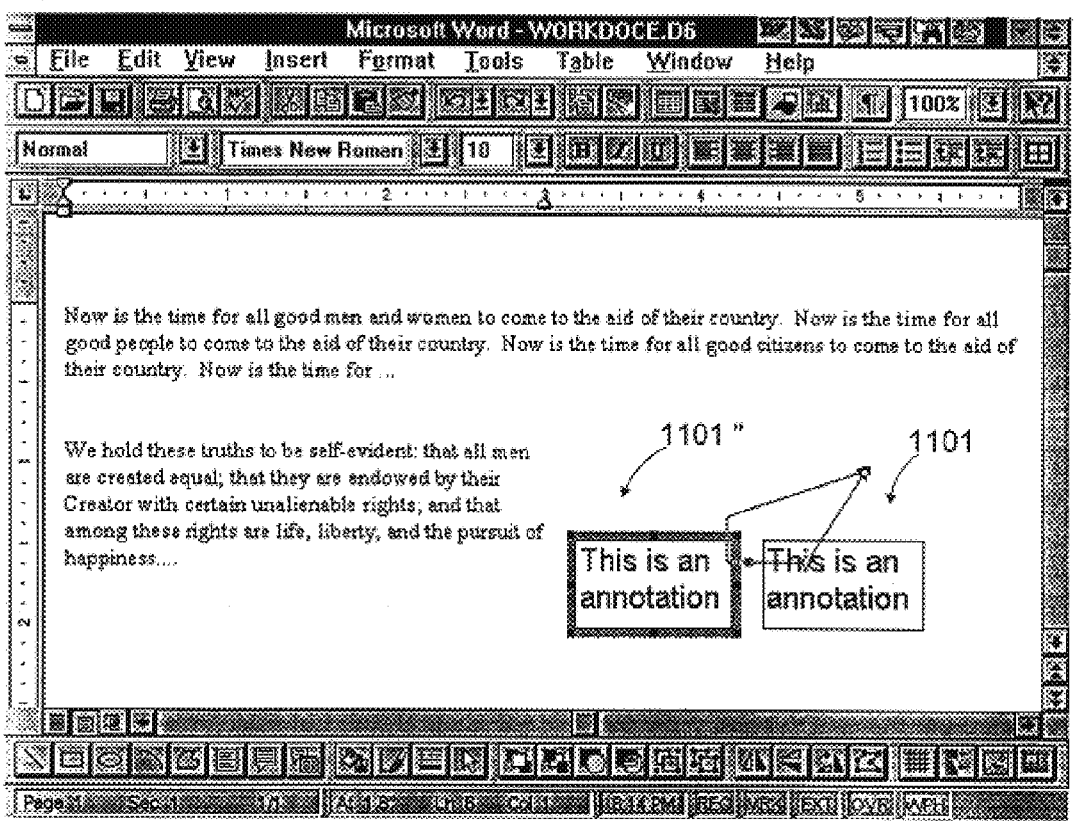

A further example of the effect of the length parameter is given in the series of views in FIGS. 11A–11C. FIG. 11A shows a Type 3 callout 1101 that was produced by beginning with callout 801 of FIG. 8E, converting to Type 3, and extending the length of the horizontal segment 1102 through mouse manipulation. FIG. 11B shows callout 1101 of FIG. 11A after a subsequent reconversion to Type 4. FIG. 11C shows an artificial superposition of the Type 4 (deselected) and Type 3 (selected and highlighted) callouts 1101, 1101". Comparison of FIG. 11A with FIG. 8F and FIG. 11C with FIG. 8G reveals that the length of the horizontal segment 1102 of the Type 3 callout is nonzero in FIGS. 11A and 11C, but the length of the corresponding horizontal segment in the Type 3 callouts of FIGS. 8F and 8G is essentially zero. This is so notwithstanding the fact that the length parameter in both sets of figures is set to a value of Best Fit. Thus when Best Fit is selected as the value for the length parameter, different segment lengths can result even in similar-seeming cases, according to the history of the callout or, more generally, according to the techniques or heuristics used to determine segment length automatically.

Auto Attach

Figure 12A:
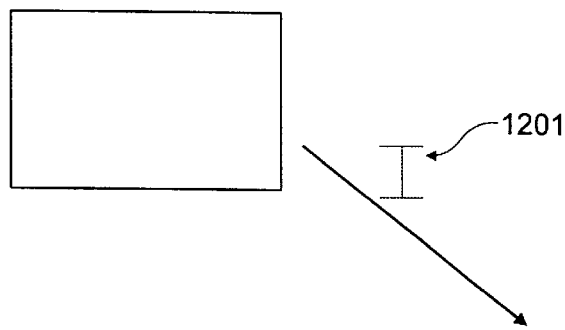
FIGS. 12A–12B illustrate the effect of the automatic attachment parameter.
Figure 12B:
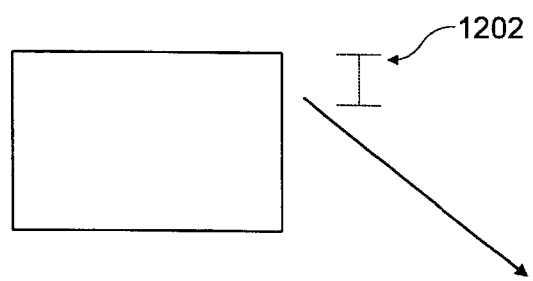

FIGS. 12A–12B illustrates the effect of the automatic attachment parameter. With auto attach selected as in FIG. 12A, when the annotation region is displayed to the left of the stem, the stem connects to the annotation region near the lower border of the annotation region, at a distance 1201 from the lower border determined by the drop parameter. When the annotation region is displayed to the right of the stem, auto attach has no effect. With auto attach cleared as in FIG. 12B, the drop parameter works as described previously with reference to FIG. 10, and the stem connects to the annotation region near the upper border of the annotation region, at a distance 1202 from the upper border determined by the drop parameter.

Anchoring

A callout can be logically coupled, or "anchored," to the text or other item that the callout annotates, so that editing or changing the item in certain ways causes changes to the callout as well. In the specific embodiment, anchoring is done on a per-paragraph basis. If a callout is placed so that the top-left corner of its annotation region is displayed at the same vertical display position as a word within a paragraph, the callout is anchored to that paragraph. If the callout is subsequently moved so that its annotation region's top-left corner is no longer within the vertical range of display positions spanned by the paragraph, it reanchors itself to a new paragraph (that is, logically uncouples itself from the original paragraph and logically couples itself to the new paragraph). If a word within the anchor paragraph is moved to another location, the callout does not follow the word, but remains with the paragraph. However, if the entire anchor paragraph is moved with respect to the rest of the document, the callout moves with the paragraph, so that both the paragraph's text and the callout appear in the new location in the document. If the entire anchor paragraph is deleted, the callout is deleted as well.

Figure 13A:
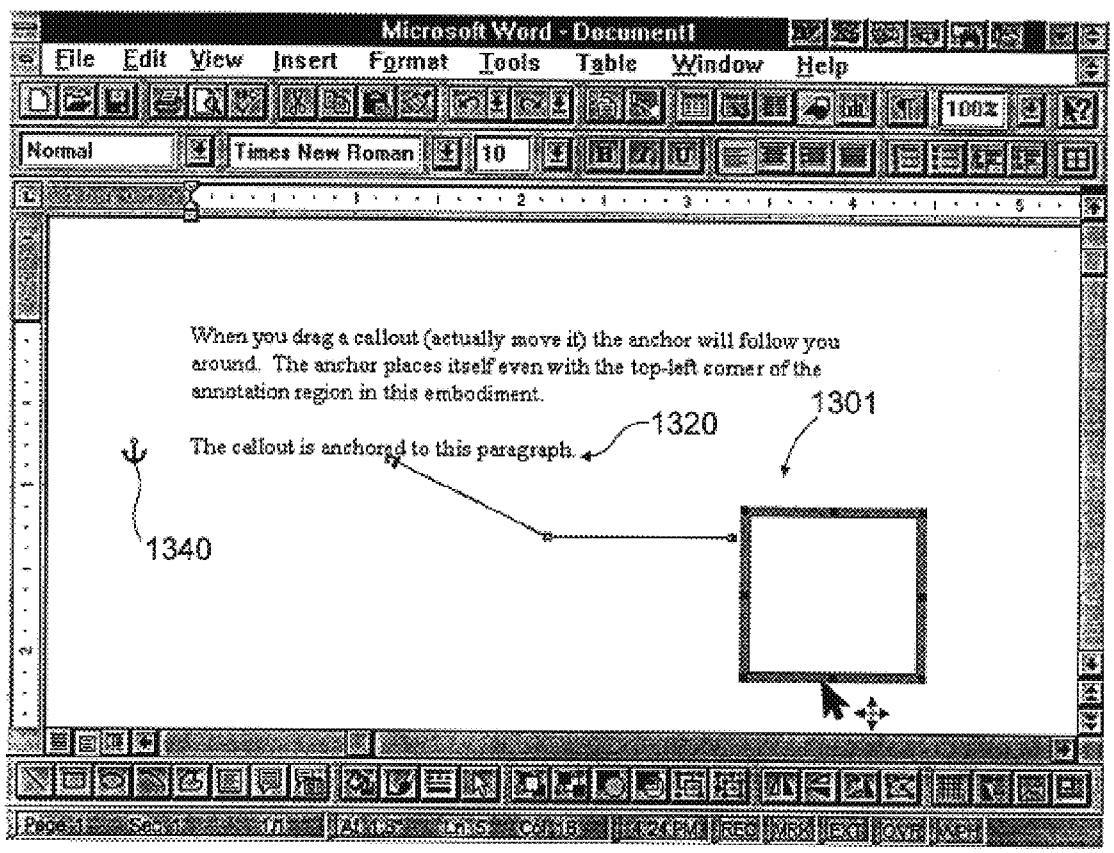
FIGS. 13A–13I illustrate the anchoring of a callout to a paragraph.
Figure 13B:
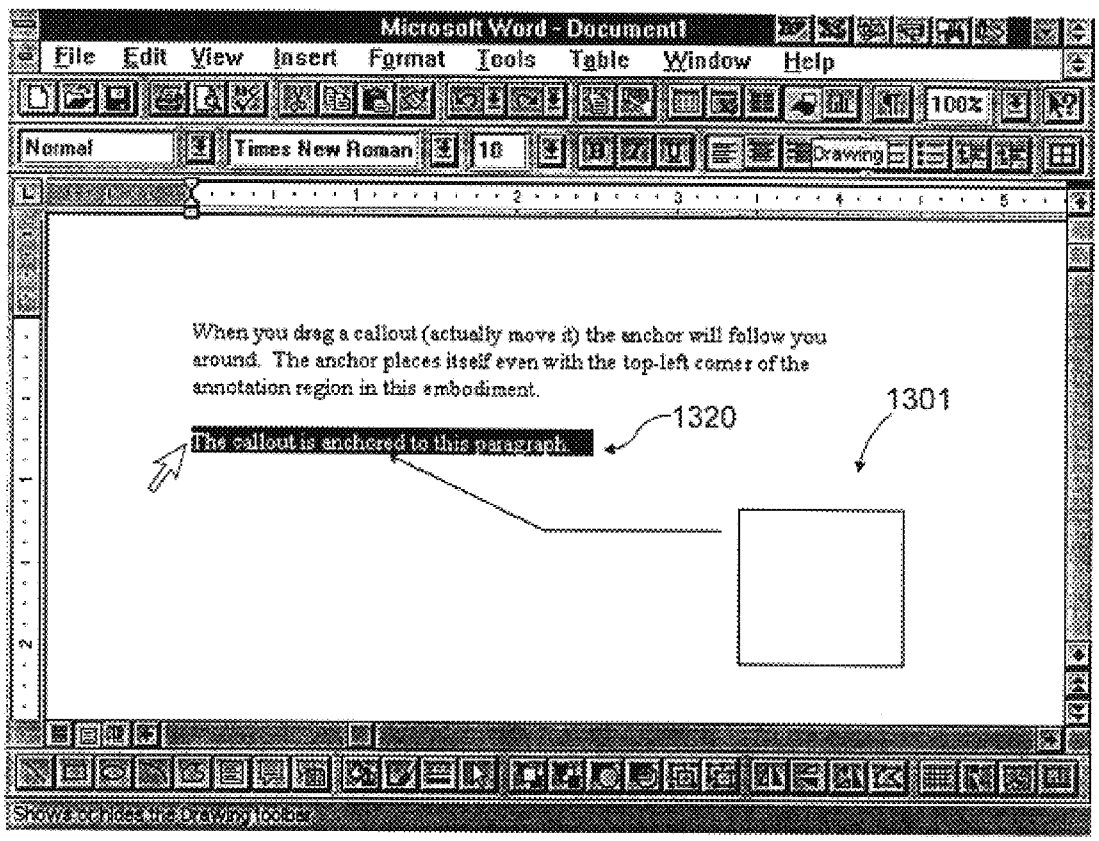
Figure 13C:
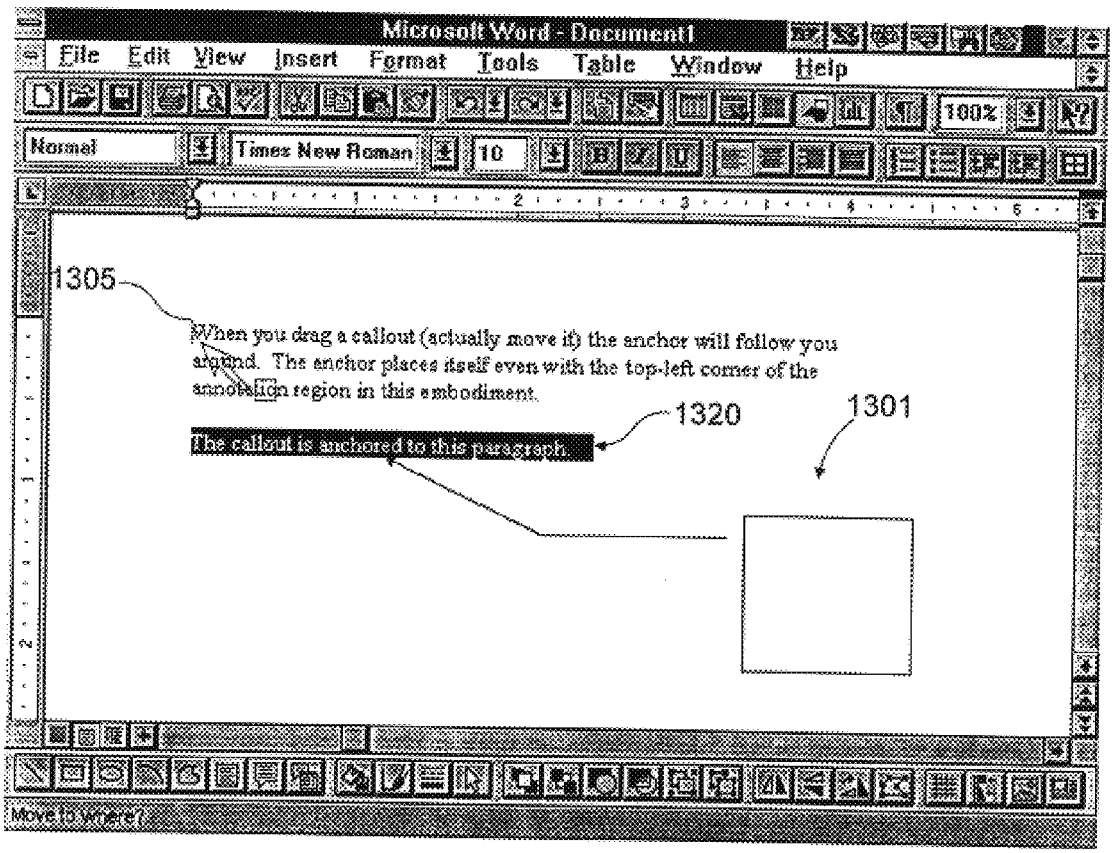
Figure 13D:
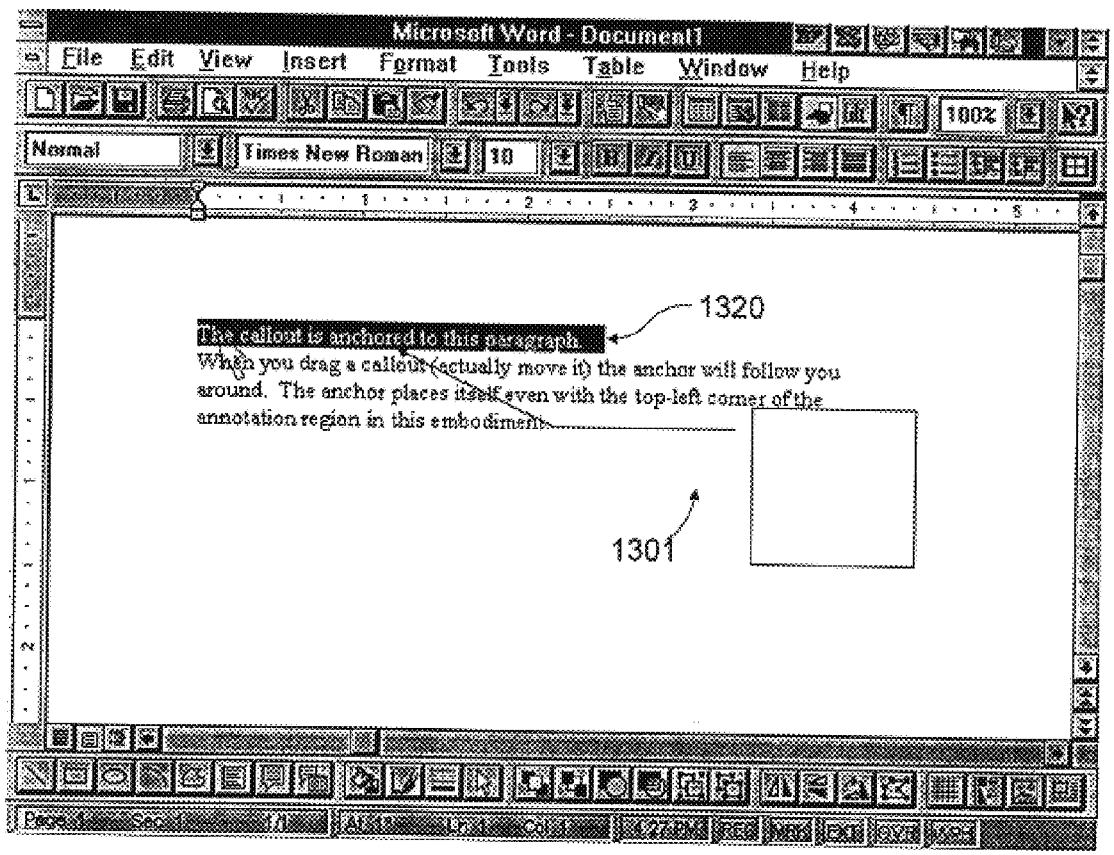
Figure 13E:
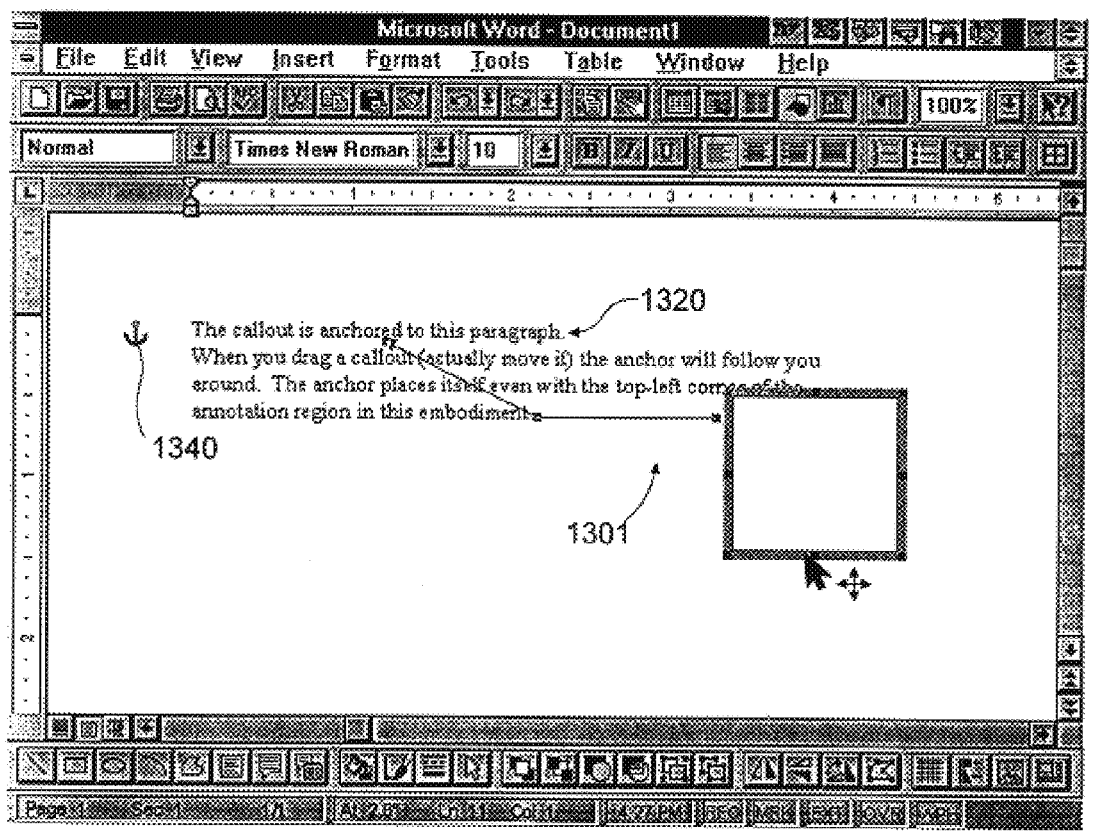

FIGS. 13A–13I illustrate anchoring of a callout. In these figures, a special display has been activated to indicate the paragraph to which the callout is currently anchored. FIG. 13A shows that a callout 1301 is anchored to the second paragraph (paragraph 1320). Anchor symbol 1340 appears near the left margin. Selecting paragraph 1320 as in FIG. 13B and moving it elsewhere in the document causes callout 1301 to move with the paragraph. FIG. 13C shows part of the process of such a move. The dashed cursor 1305 shows the destination location to which the selected paragraph 1320 is to be moved. FIG. 13D shows the result of the move prior to deselection of paragraph 1320. In FIG. 13E, paragraph 1320 is deselected and anchor symbol 1340 reappears nearby the new location of paragraph 1320.

Figure 13F:
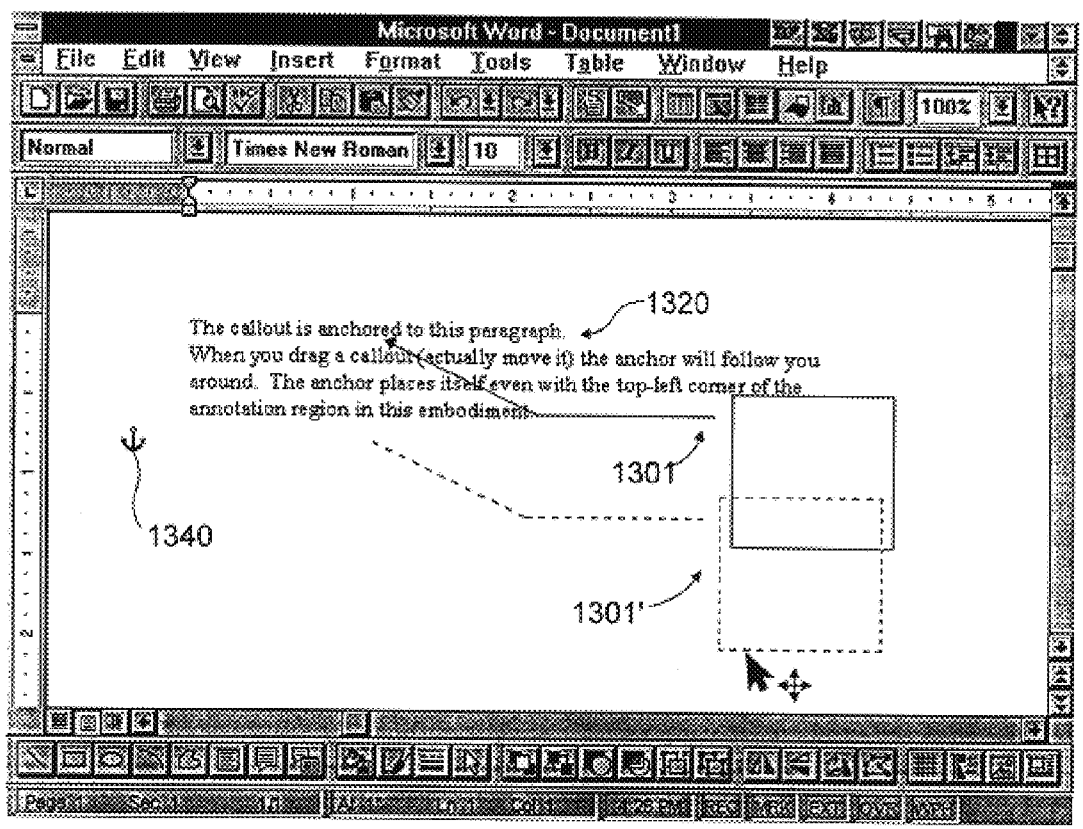

Also in FIG. 13E, callout 1301 is selected prior to being moved back down on the page. Because the callout is selected rather than the paragraph, the paragraph will not be moved. FIG. 13F is an intermediate view during the move. Paragraph 1320 remains in its new location near the top of the page. Callout 1301 anchors itself to a new paragraph (in this case, an empty paragraph) according to its new location. The new location of callout 1301 is represented by outline view 1301' during the move. Anchor symbol 1340 appears at the location of the empty paragraph where the callout will be reanchored.

Figure 13G:
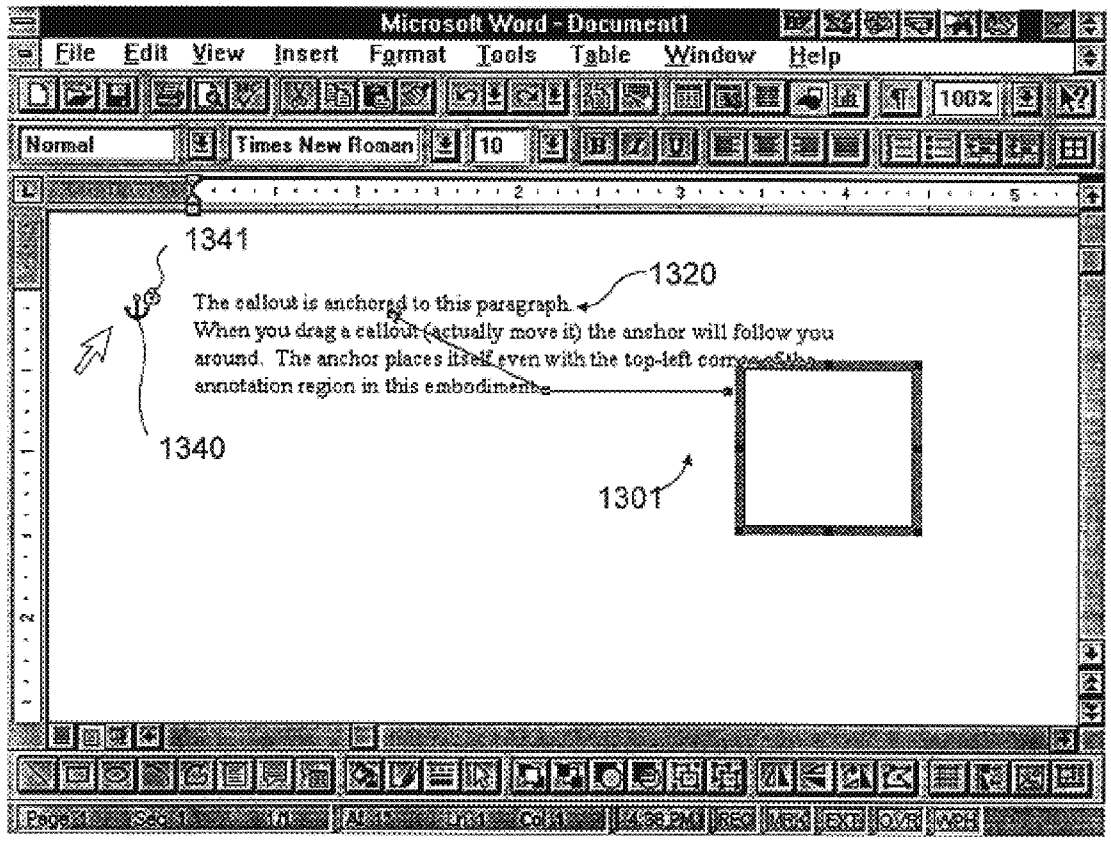
Figure 13H:
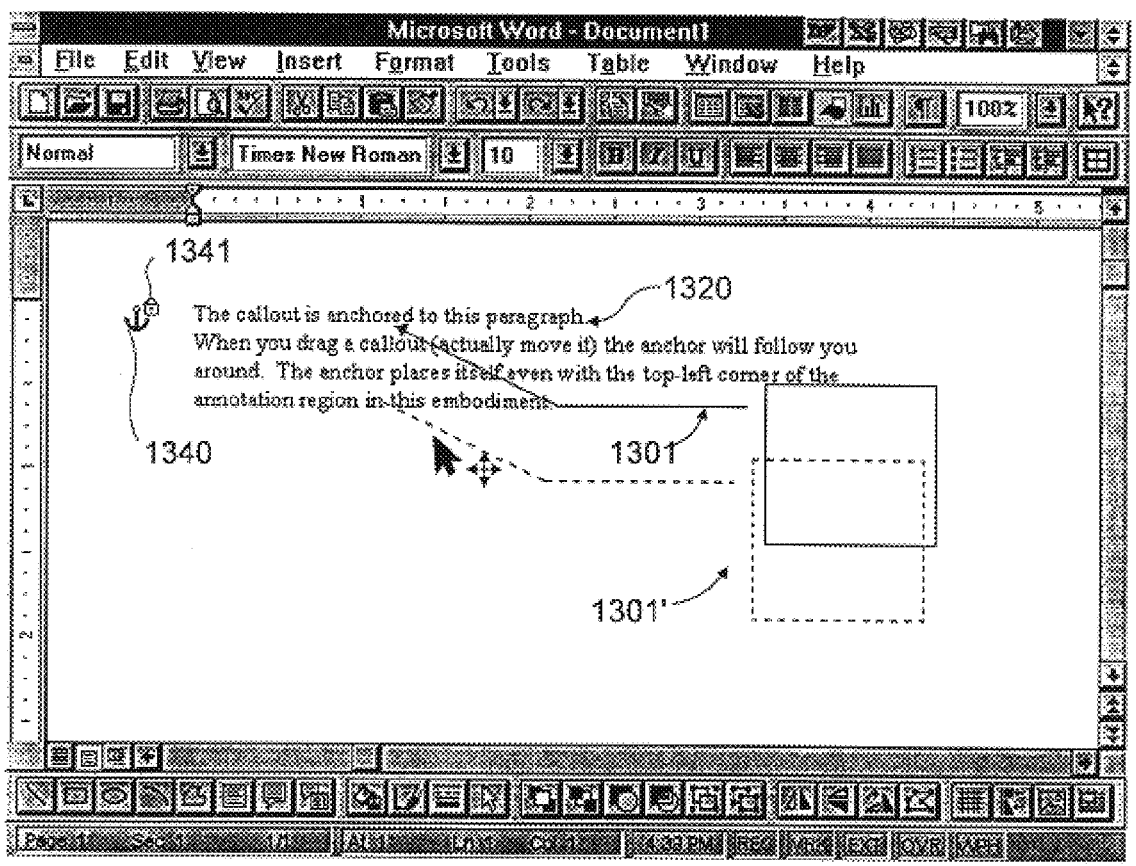
Figure 13I:
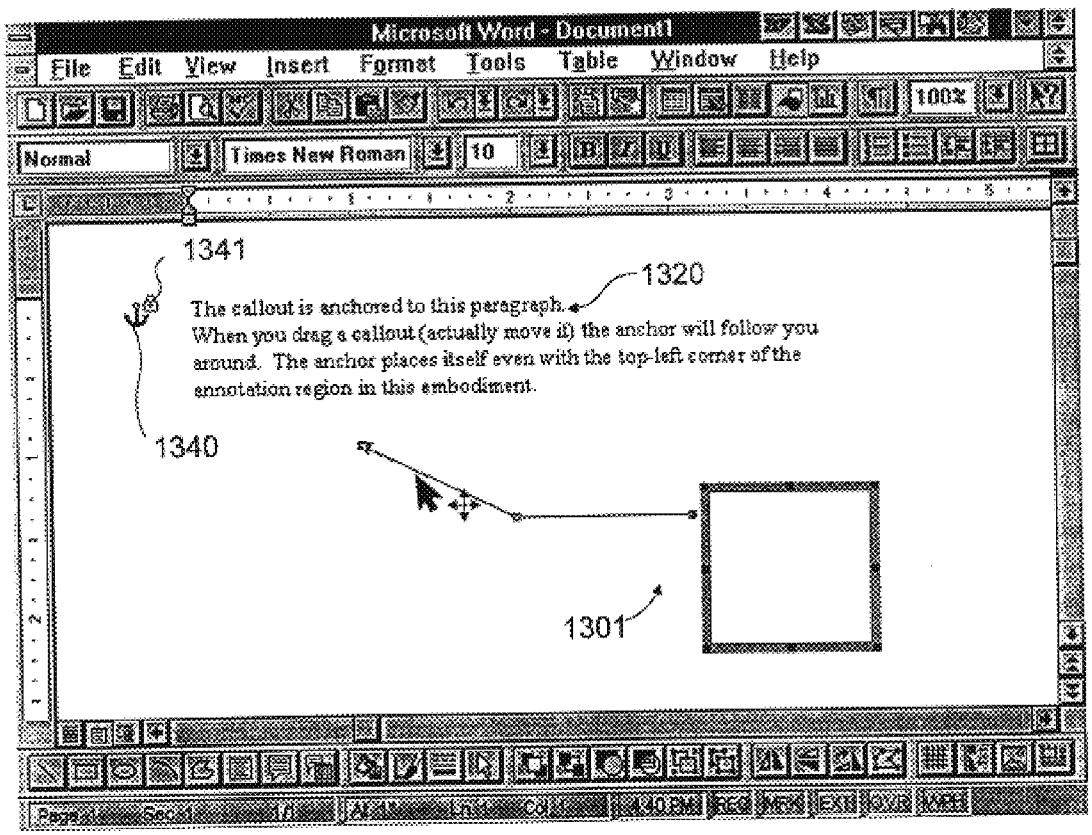

If, after FIG. 13D, the callout is locked to the anchor paragraph and then is moved downwards, a different result is seen. FIG. 13G shows the anchor symbol 1340 with a lock icon 1341, indicating that the callout has been locked to the anchor. The locking option is selected through menus and dialog boxes in the same manner as other word processing program command selections. Moving callout 1301 downward as in FIG. 13H, in which outline view 1301' shows the intermediate position of the callout during the move, produces the result in FIG. 13I. The callout appears farther down in the document, but remains anchored to the same paragraph (paragraph 1320) as before.

In some embodiments, callout anchoring can operate differently than has been described. For example, a callout can be anchored to an individual character, word, or sentence. As another example, the callout's anchor position can be based on the stem origin instead of on the position of a corner of the annotation region. As still another example, a callout need not be anchored at all.

Computational Mechanisms

In the specific embodiment, the word processing program is an object-oriented applications program running in an object-oriented operating system environment. Callouts are represented in the program as Callout objects.

Objects, including Callout objects and the other objects to be described below, are software entities that logically encapsulate related data and functions. Objects can be manipulated or altered, for example under the control of an applications program or the operating system. Certain objects can communicate with one another. For example, one object can send messages to another object or receive messages from another object. A complex object can be formed by combining two or more other objects, and a complex object so formed can itself be combined with yet other objects to form still more complex objects.

Callout objects are composed of other component objects called Polylines and Textboxes, which are objects used elsewhere in the word processing program. A Textbox represents a rectangular box, possibly with a border, that contains text. A Polyline represents a series of points connected by line segments. A Callout is a permanent combination of a Polyline and a Textbox, with some added functionality unique to Callout objects. The Polyline component object represents the stem region of the callout, and the Textbox component object represents the annotation region.

As described earlier, callouts have handles, which are special points (indicated by black dots or black squares when the callout is selected and highlighted) that can be used to perform certain kinds of manipulations of the callout, such as resizing and reshaping. These handles are represented as Handle objects. Textboxes and Polylines have associated Handles, and the Handles associated with a Callout object are those of its constituent Textbox and Polyline. A callout has four handles at the corners of the annotation region, four in the centers of the sides of the annotation region, and one at each vertex of the stem region, that is, at either end and at each inflection point of the stem.

Additionally, the Callout has one other Handle that is displayed not as a single black dot, but as a thickened gray border around the annotation region. This is so-called Move Handle of the Textbox, which is used to move (translate or rotate) the callout. Internally the Move Handle is treated as though it were a point at the upper left corner of the Textbox. However, dragging this handle has a different effect than dragging the SizeTopLeft Handle which is also associated with the upper left corner.

The handle associated with the stem origin is represented by a Handle called the First Handle. The handle associated with the end of the stem closest to the annotation region is represented by a Handle called the Last Handle.

Figure 14A:
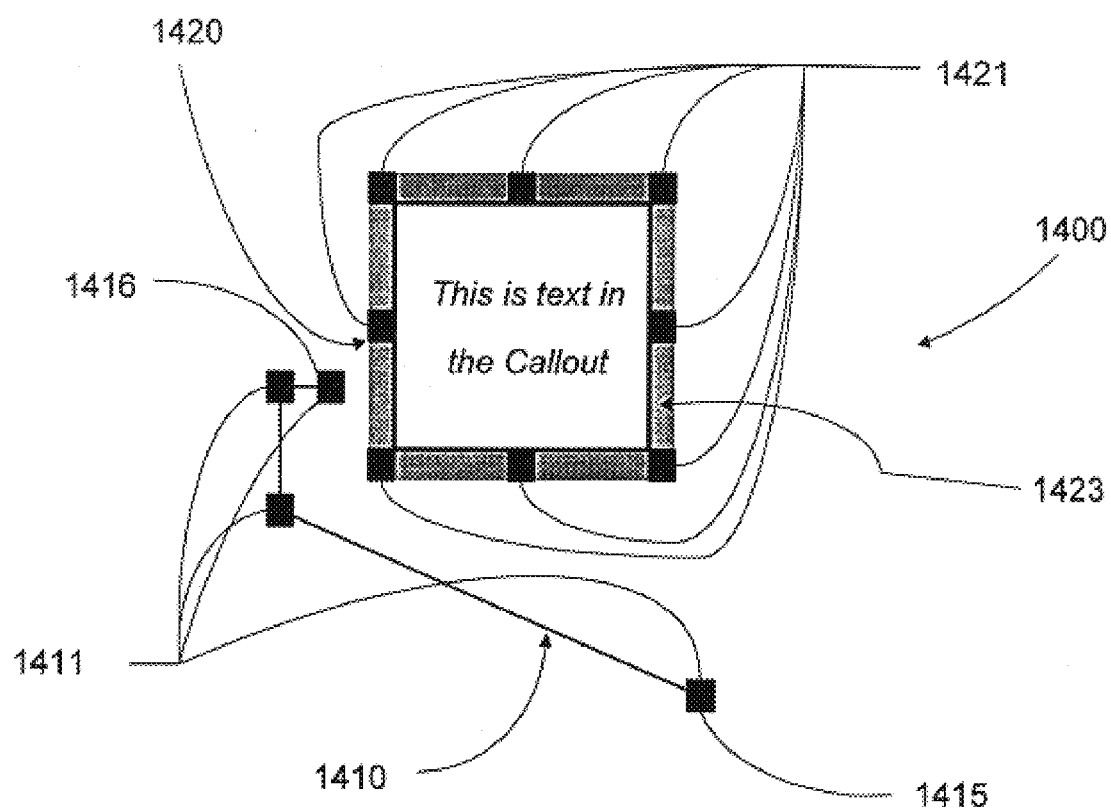
FIGS. 14A–14B illustrate, respectively, certain Handles and distance fields associated with the definition of a Callout object.

FIG. 14A illustrates the nomenclature of certain Handle objects by reference to the handles that they represent. A callout 1400 has a stem region 1410 (which is represented by a Polyline object) and an annotation region 1420 (which is represented by a Textbox object). Stem region 1410 has handles 1411 which can be can have two, three, or four in number according to the type of callout. Each of the handles 1411 is represented by a Handle object. In particular, the First Handle object represents first handle 1415 and the Last Handle object represents last handle 1416. Annotation region 1420 has eight handles 1421 that can be dragged with the mouse to cause annotation region 1420 to be resized, and a special "move handle" 1423 which appears as a thickened border that can be dragged to move the entire annotation region. Each of the handles 1421, 1423 is represented by a Handle object. In particular, the Move Handle object represents the move handle 1423. (Although strictly speaking, a Handle is an object that represents a handle, a Callout is an object that represents a callout, and so forth, where the meaning is clear the distinction between the thing represented and the object doing the representing is sometimes elided, according to the usage of those skilled in the art.)

Callouts have many features that arise by virtue of their being objects, and in particular, drawing objects in the word processing program. For example, they can be created, displayed, selected, cut, copied, pasted, duplicated, deleted, and so forth. The ability to place active spreadsheets or other objects in the annotation of a callout arises where the operating system supports actively linked objects. The anchoring of callouts to paragraphs as described earlier with reference to FIGS. 13A–13I arises from their being drawing objects in the word processing program. These and other properties of callouts will readily be appreciated by those of skill in the art. Accordingly, the remainder of this discussion focuses on unique aspects of Callout objects and their associated methods or routines.

Callout Object Definition

Internally, the structure of a Callout object in one embodiment can be expressed in the well-known programming language C as follows:

```
typedef struct _CALLOUT
{
    TEXTBOX box;
    POLYLINE poly;
    int type; // (type1, type2, type3, or type4)
    int angle; // (angleAny, angle0 angle30, angle45, angle60, or
               // angle 90)
    int fAccent; // Is there an accent bar?
    int fMinusX; // Callout extends to left
    int fMinusY; // Callout extends up
    int fBorder; // Textbox has a border
    Z dzLength; // How long should the horizontal Polyline
               // segment be?
    int fAutoLength; // Ignore dzLength, use whatever works.
    Z dzDescent; // How far from the top of the Textbox should
               // the Last Handle be, vertically? Only used
               // if descent is descentAbs.
    int descent; // (descentTop, descentCenter, descentBottom, or
               // descentAbs)
    int fAutoDescent; // Attach near bottom when textbox on left?
    z dzOffset; // How far should the Last Handle be from the
               // Textbox?
} CALLOUT;
```

Text appearing on a line after a "//" indicates a programmer's comment. It is assumed that Textbox, Polyline, and Handle objects are defined elsewhere. In this embodiment, they are defined elsewhere in the Word 6.0 applications program.

Figure 14B:
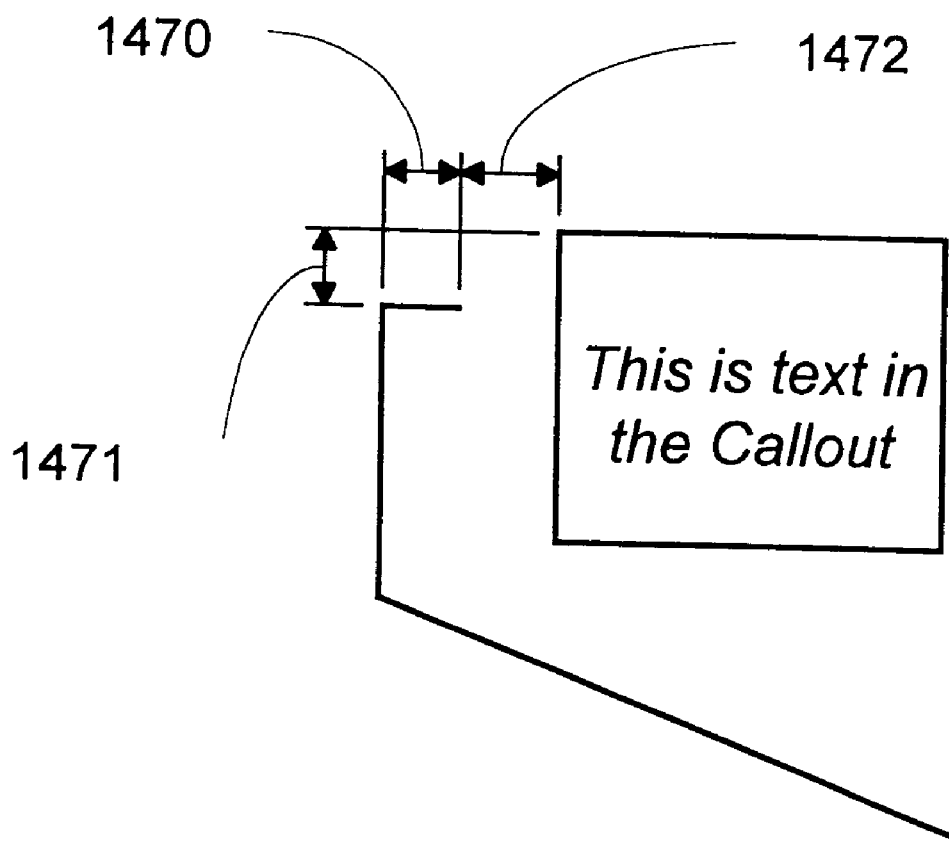

Referring to FIG. 14B, it can be seen that certain fields that appear in the Callout object definition roughly correspond to formatting parameters discussed earlier with reference to FIG. 9. In particular, dzLength 1470 usually corresponds to the length parameter, dzDescent 1471 to the drop parameter, and dzOffset 1472 to the gap parameter. The exact significance of these fields and, more generally, of all the fields and variables in any particular case depends on their use in the layout functions that are described below.

The dzLength field value can be overridden by setting fAutoLength to fTrue, which corresponds to selecting Best Fit for the length parameter. The dzDescent field is only used if descent is descentAbs. The descentTop, descentCenter, and descentBottom cases cause this distance to be based on the height of the annotation region (which is represented as part of the Textbox object). These correspond to the Top, Bottom, and Center values for the drop parameter. The fAutoDescent flag causes the drop to be measured from the bottom of the Textbox instead of the top whenever the Textbox is to the left of the Last Handle and descent is descentAbs. This implements the Auto Attach feature described earlier with reference to FIGS. 12A–12B.

Functions Associated with Displaying Callouts

To determine how a callout associated with a particular Callout object should appear in the display, the processor (that is, processor 305 of FIG. 3) executes certain specialized layout functions in the context of the applications program (applications program 355). The layout functions determine how best to satisfy the implicit and explicit constraints involved in displaying the callout in the display. Preferably, the functions produce aesthetically pleasing results.

In the specific embodiment, the layout functions are:

```
LayoutCallout ( )
RelateBoxToPoly ( )
LayoutPoly ( )
FLayoutAngle ( )
DzDescent ( )
IptEnd ( )
```

These are listed here in their approximate order of importance or calling hierarchy, with the highest-level functions being listed first. That is, the processor calls the top-level function, LayoutCallout( ), which in turn calls lower-level functions, which in turn can call still lower-level functions.

To achieve WYSIWYG performance during certain operations performed on the callout, the processor executes the layout functions repeatedly as the callout is being manipulated. In particular, during creation, rotation, translation, resizing, and other geometrical manipulations performed on the callout by moving one or more of the callout's handles, the processor executes the layout functions every time a handle moves. By redisplaying the callout at each instant of the manipulation, WYSIWYG performance is achieved.

More particularly, the specialized layout functions are used to display and redisplay the callout (in either normal or outline representation, or both) during the WYSIWYG geometric manipulations described previously with reference to FIGS. 5B–5F, FIGS. 6A–6I, and FIGS. 8A–8O. For example, in FIG. 6D the processor computes the display of the outline representation of the rotated callout 503' by calling the appropriate layout functions (in this embodiment, by calling the top-level function, LayoutCallout( )). Also, the processor can make a separate call to the layout functions to compute the normal representation of the unrotated callout 503, if the processor does not already have this information available. In FIG. 6E, the processor calls LayoutCallout( ) again to compute the new display of the rotated callout 503', which has changed from FIG. 6D. In FIG. 6F and again in FIG. 6H, the processor makes still further calls to LayoutCallout( ) to further redisplay rotated callout 503'.

The layout functions can also be used to display the callout during non-WYSIWYG operations. The processor can call LayoutCallout( ) anytime that a callout's geometrical configuration changes because of a change in callout type (as seen more particularly in FIGS. 7D–7G and FIGS. 11A–11C) or a change to formatting criteria such as Length, Angle, Drop, Gap, or Auto Attach parameters. Moreover, the processor can call the layout functions if the paragraph to which a callout is anchored is moved, as in FIG. 13D.

Detailed descriptions of the layout functions are given below. For the top-level function, LayoutCallout( ), a textual summary is provided. For the remaining functions, description is principally by way of flowcharts. The flowcharts make use of C syntax. An x-y Cartesian coordinate system is assumed for the display (x-axis is horizontal in the display, y-axis is vertical). By convention, variables and fields whose names begin with lower-case "f" take on Boolean logical values. Variables and fields whose names begin with "pt," "rc," and "ry" refer, respectively, to points, rectangles, and arrays. fTrue and fFalse are constants whose Boolean logical values are, respectively, true and false. Array indices begin at zero. For example, in the function LayoutPoly, which is described below with reference to FIGS. 16A–16F, the position of the First Handle of a Type 4 Callout is stored in rgpt[0], that is, in location 0 of an array called rgpt, and the position of the Last Handle is stored in rgpt[3], that is, in location 3 of array rgpt.

LayoutCallout( )

Description

This is the main routine for determining the display layout of a Callout. It is principally concerned with enforcing the desired relationships between the annotation region and the stem region, as represented by the Textbox and the Polyline components of the Callout.

Input Parameters:

pCallout Pointer to the Callout object.

Handle The number (0–12) of the Handle that is being moved.

ptDest The destination point to which iHandle is being moved.

Output Parameters:

cpt Number of points in the final Polyline.

rgptPoly An array of points specifying the new location of the Polyline.

rcBox A rectangle specifying the new location of the Textbox.

fMinusX Boolean: Does the Callout go the left (fTrue) or right (fFalse)?

fMinusY Boolean: Does the Callout go up (fTrue) or down (fFalse)?

Locals:

fKeepBoxSize Boolean: Should the textbox be moved or resized to fit against the new Polyline?

Procedure:

Step A. Initialize rcBox with the old location of the Textbox and rgptPoly with the old location of the Polyline, all in the coordinate space of the Callout.

Step B. Initialize fMinusX and fMinusY as appropriate to specify which quadrant the Callout lives in relative to the First Handle. These can be difficult to regenerate from the positions of the various Handles, so it is best to keep them stored with the Callout.

Step C. Initialize fKeepBoxSize to fTrue.

Step D. If iHandle is iHandleMoveTextbox (the user clicked on the gray border "Handle") then set iHandle to iHandleLast (pretend the user clicked on the last point on the Polyline).

Step E. If iHandle is iHandleFirst then do the following: Recalculate fMinusX and fMinusY by comparing ptDest to rgptPoly[iHandleLast]. Call LayoutPoly( ) to actually move the First Handle to the ptDest. Then go to Step H below to position the Textbox alongside the new Polyline.

Step F. If the user is resizing the Textbox (by dragging one of the Handles on its corners or in the centers of its sides) then do the following: Adjust rcBox as appropriate to fit the new point. Call RelateBoxToPoly( ) to figure out where the Last Handle should now go. Check to see if the Last Handle needs to move; if not, then return. Otherwise call LayoutPoly( ) to move the Last Handle to wherever RelateBoxToPoly( ) said it should go. Check to see whether the Last Handle actually went where we (the processor) told it to go. If so, then return immediately. Otherwise set fKeepBoxSize to fFalse (that is, resize instead of moving) and go to Step H below to resize the Textbox again to fit alongside the new Polyline.

Step G. The user must be dragging a Handle on the Polyline that is not the First Handle. Determine a new value for fMinusY by comparing the point being dragged to the First Handle. In all cases except one, figure out a new value for fMinusX by the same process. The exceptional case is when the user is dragging the Last Handle of a Type 4 Callout that has its fAutoLength (Best Fit) property set. Dragging this Handle around cannot change the horizontal quadrant. In all cases both normal and exceptional, call LayoutPoly( ) to adjust the Polyline and go to Step H below to position the Textbox alongside the new Polyline.

Step H. Call RelateBoxToPoly( ) to see where the Textbox now belongs relative to the Polyline. Actually move rcBox to fit next to the Polyline, keeping its size the same if fKeepBoxSize is fTrue.

Step I. Return.

RelateBoxToPoly( )

Description

This function looks at a Callout and decides which corner of the Textbox is directly related to the Last Handle on the Polyline and how far away it is.

Input Parameters:

pCallout Pointer to the Callout.

fMinusX Boolean: Does the Callout go to the left?

fMinusY Boolean: Does the Callout go up?

fHorz Boolean: Is the Callout horizontal? Type 1 Callouts come in eight symmetric forms instead of just four, so in addition to a quadrant the processor needs to know if the Callout is horizontal or vertical.

rcBox Same as described above for LayoutCallout( ). Although RelateBoxToPoly( ) does not really need to know the position of the Textbox, it does need to know its size.

Output Parameters:

fLeft Boolean: Is the Last Handle dx to the left of the left side of the Textbox (fTrue) or dx to the right of the right side (fFalse)?

fTop Boolean: Is the Last Handle dy below the top of the Textbox (fTrue) or dy above the bottom of the Textbox (fFalse)? Note that fLeft and fTop are not quite symmetrical.

dx Horizontal distance from Textbox to Last Handle.

dy Vertical distance from Textbox to Last Handle.

Procedure

Figure 15:
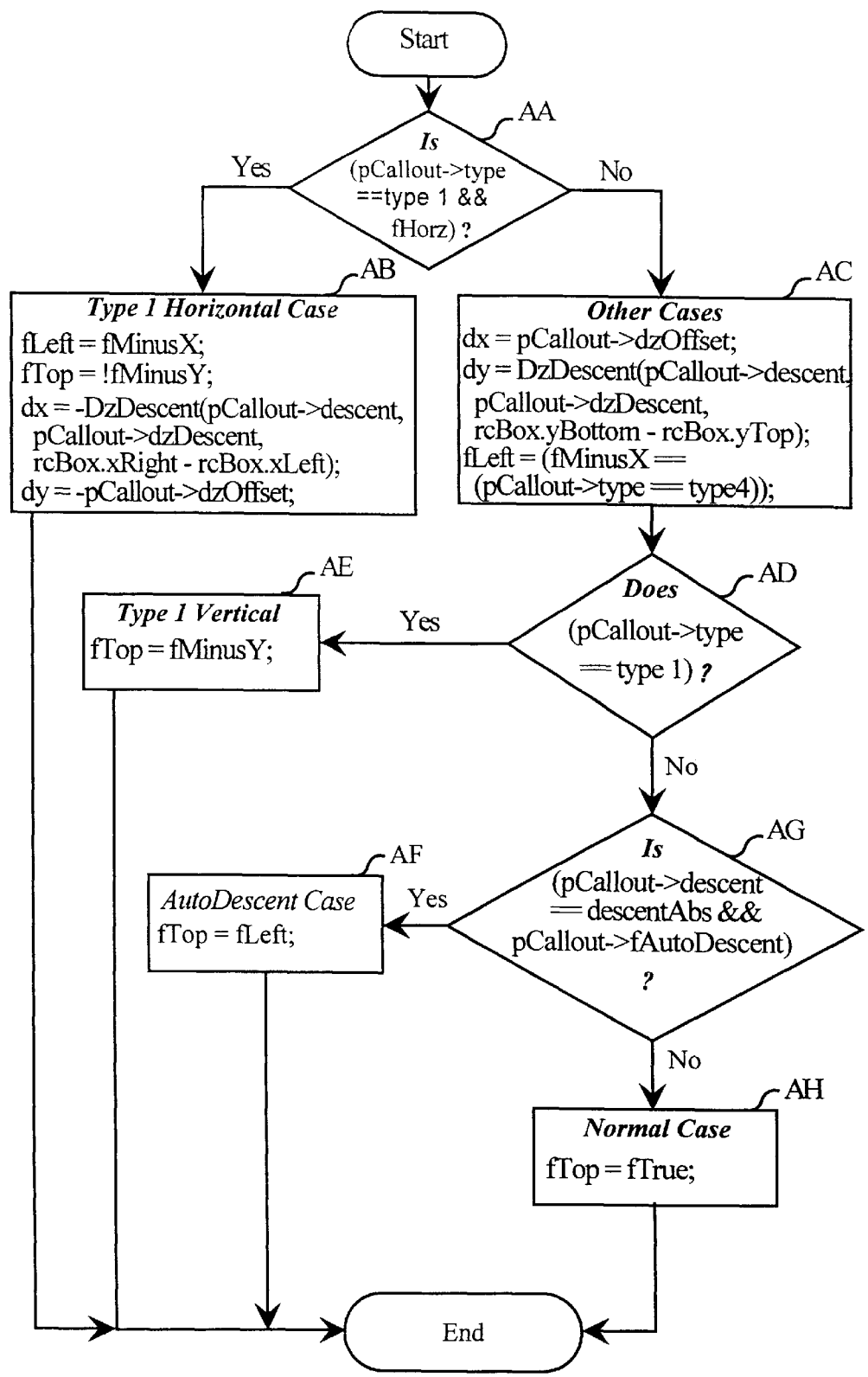
FIG. 15 is a flowchart for the function RelateBoxToPoly( )

The procedure is set out in the flowchart of FIG. 15. If the callout is of Type 1 and its stem is horizontal (Step AA), then the left-right and top-bottom relative orientations and distances are treated specially (Step AB), because the stem region will connect to the top or bottom of the annotation region, rather than to the left or right side of the annotation region as in other cases. fLeft is set to the logical value of fMinusX. fTop is set to the logical negation of ffdeter. dx is determined by negating a value returned upon calling DzDescent with the arguments shown, that is, with the descent and dzDescent fields of the Callout object and the horizontal size of the Textbox as determined by the difference between the positions of its right and left sides. dy is determined by negating the dzOffset field of the Callout.

If the callout is of Type 1 and not horizontal or is of any other type, then the stem region will connect to the left or the right side of the annotation region. In these cases (Step AC), dx is set equal to the dzOffset field of the Callout, and dy is set to the value returned upon calling DzDescent with the arguments shown, that is, with the descent and dzDescent fields of the Callout object and the vertical size of the Textbox as determined by the difference between the positions of its top and bottom edges. fLeft is set to fTrue if the logical value of fMinusX is true and the callout is of type 4 or if the logical value of fMinusX is false and the callout is not of type 4; otherwise, fLeft is set to fFalse. fTop is set in one of three ways. If the callout is of type 1 (Step AD), then fTop is set to fMinusY (Step AE). If the autodescent flag is set (that is, Auto Attach is active) and the descent field of the Callout is set to descentabs (that is, if the drop parameter is set to a numerical value rather than to Top, Bottom, or Center), then fTop is set to fLeft. Otherwise, fTop is set to fTrue.

LayoutPoly( )

Description

This function processes requests to move one of the Handles on the Polyline of a Callout to a new location.

Input Parameters:

pCallout Pointer to the Callout, used to retrieve properties but not point locations, as the latter are probably out-of-date.

cpt How many points are there; that is, how many Handles are on the Polyline of this Callout? This will be 2, 3, or 4, depending on callout type.

rgpt An array of points representing the old locations of the Polyline's Handles.

ipt Point or handle being moved.

ptDest Destination to which rgpt[ipt] is being moved.

fMinusX Boolean: Should the Polyline go to the left or to the right?

fMinusY Boolean: Should the Polyline go up or down?

Output Parameters:

rgpt Will be updated to contain the new locations of the Polyline's Handles.

Locals:

fInvertX Boolean: set to fTrue if fMinusX differs from that stored in the Callout.

fInvertY Boolean: set to fTrue if fMinusY differs from that stored in the Callout.

angle Pulled out of *pCallout.

dzLength Pulled out of *pCallout.

fAutoLength Pulled out of *pCallout.

dxNum Intermediate used for Type 3 Callouts.

dxDenom Intermediate used for Type 3 Callouts.

dyNum Intermediate used for Type 4 Callouts.

dyDenom Intermediate used for Type 4 Callouts.

x2Denom Intermediate used for Type 4 Callouts.

dx23Denom Intermediate used for Type 4 Callouts.

Procedure

Figure 16A:
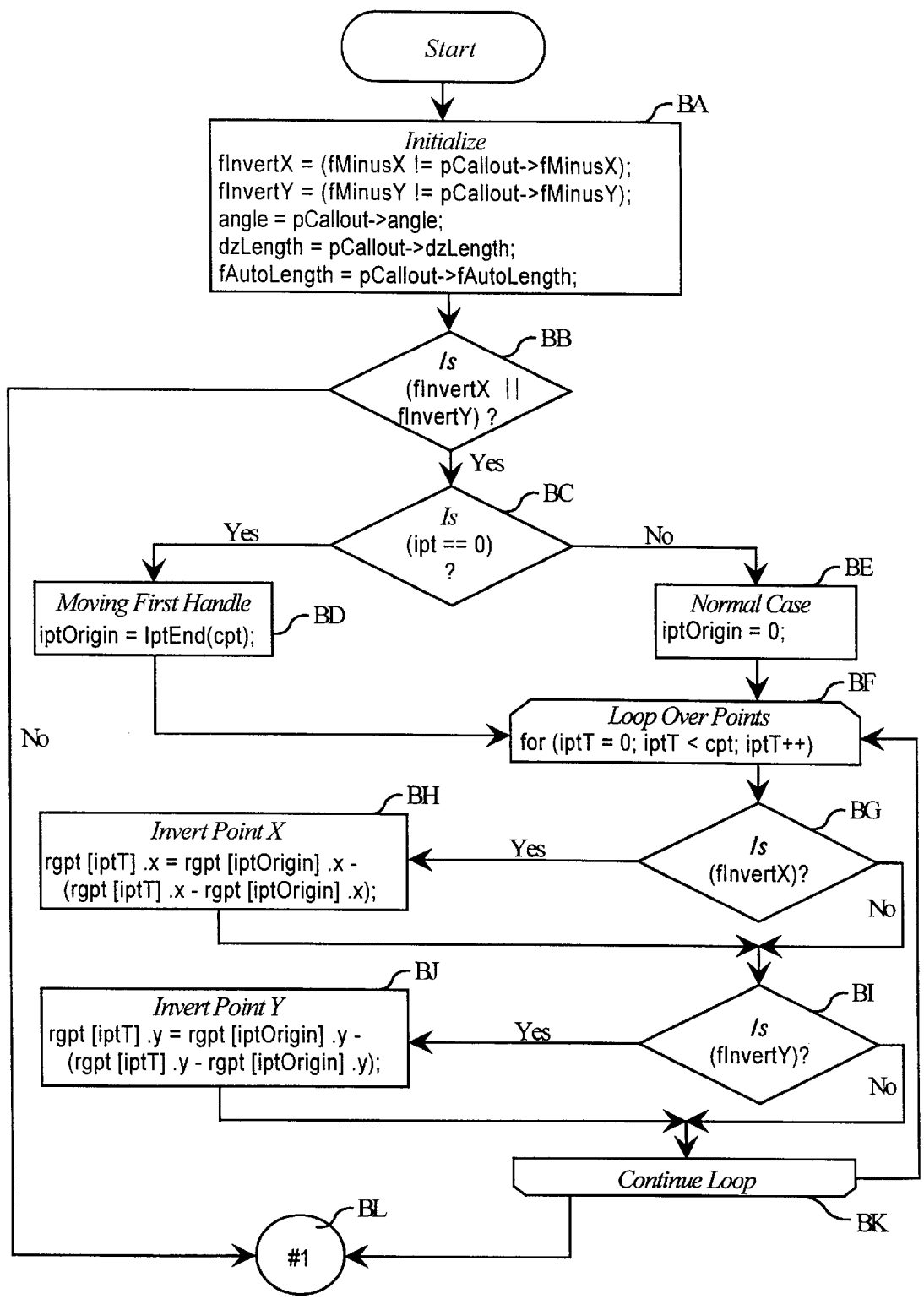

The procedure is described with reference to the series of flowcharts in FIGS. 16A–16F. Referring to FIG. 16A, processing begins (Step BA) by initializing the local variables fInvertX, fInvertY, angle, dzLength, and fAutoLength according to values stored in fields of the Callout object.

fInvertX is set to the negation of the fMinusX field, and fInvertY is set to the negation of the fMinusY field. angle, dzLength, and fAutoLength are set to the values of their respectively named fields.

If either fMinusX or fInvertY is true (Step BB), then a loop is performed to cause inversion of Polyline point coordinates with respect to the origin. ipt is tested to see if it equals zero (Step BC). If so, the First Handle is being moved, and iptorigin is set equal to a value returned by calling IptEnd with an argument of cpt (Step BD). Otherwise, iptOrigin is set to zero (Step BE). Thereafter a loop over the points of the Polyline is performed using the index variable iptT, which is set to values from zero up to cpt minus one over successive iterations (Step BF). At each iteration of the loop, if fInvertX is true (Step BG), then the x-coordinate of the point is inverted with respect to the origin (Step BH), and if fInvertY is true (Step BI), then the y-coordinate of the point is inverted with respect to the origin (Step BJ). The loop continues (Step BK) until all points in the Polyline have been processed. If neither fMinusX nor fMinusY is true, the inversion loop is skipped.

Figure 16B:
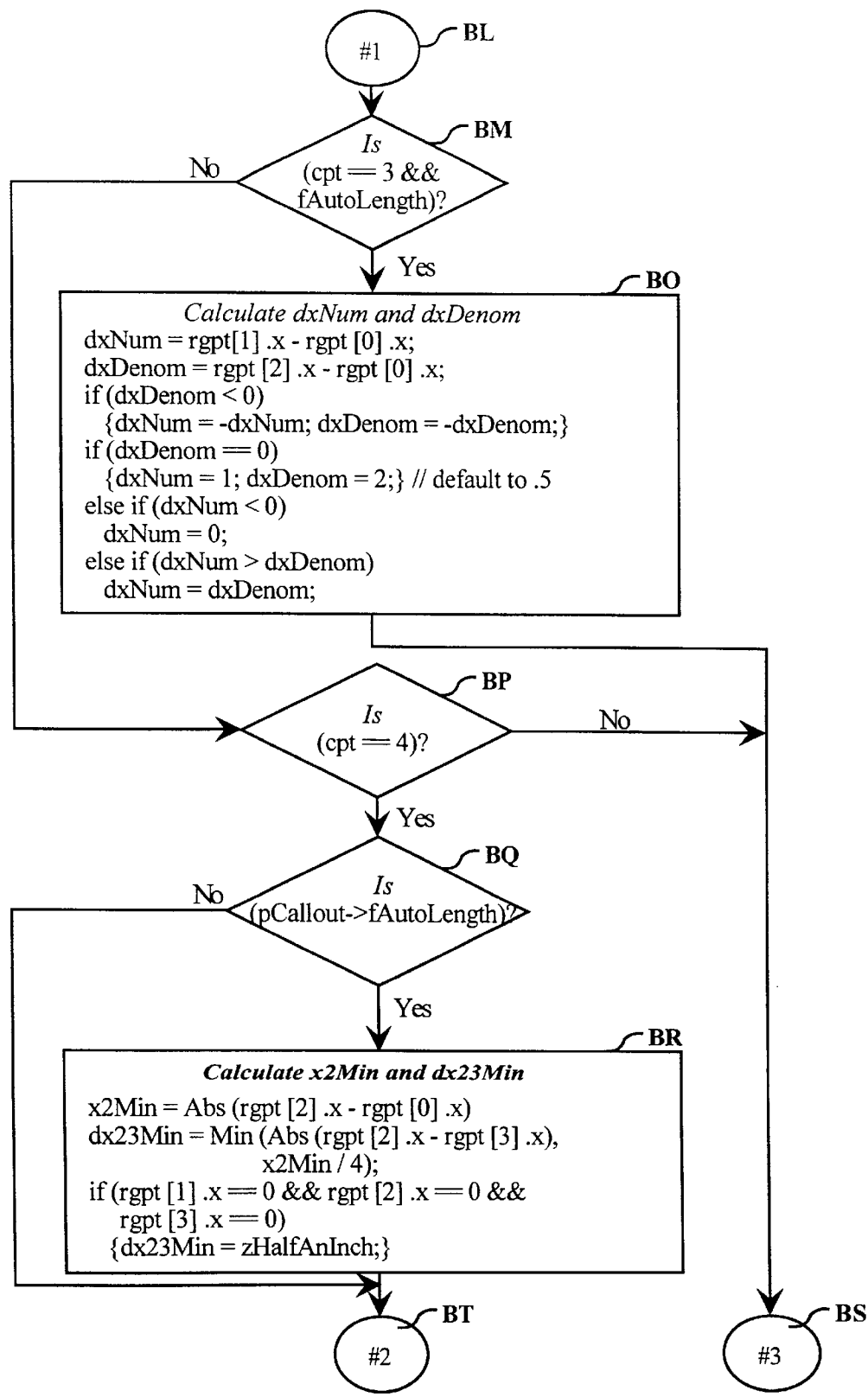

Referring now to FIG. 16B, after the inversion loop has been executed or skipped (Step BL), certain intermediate variables are calculated for Type 3 and Type 4 callouts. These variables help LayoutPoly to produce aesthetically pleasing results when Best Fit has been selected for the length parameter, by taking into account ratios between the lengths of the component segments of the stem region and further by taking into account previous locations of the Handles, which tend to indicate the user's previous choices and thus the user's preferences.

If cpt equals 3 (indicating a Type 3 callout) and fAutoLength is true, then the variables dxNum and dxDenom are calculated (Step BO). dxNum is set to the difference between the x-coordinates of the former locations of the first two Handles, and dxDenom is set to the difference between the x-coordinates of the former locations of the first and third Handles. If dxDenom is negative, then both dxNum and dxDenom are negated. Then, if dxDenom is zero, dxNum is reset to one and dxDenom to two, so that their ratio defaults to one-half; or else if dxNum is negative, dxNum is reset to zero; or else if dxNum exceeds dxDenom, dxNum is set equal to dxDenom, giving a ratio of one. If cpt is not 3 or fAutolength is false, the calculation of dxNum and dxDenom is skipped.

If cpt equals 4 (indicating a Type 4 callout) (Step BP), then if fAutoLength is true (Step BQ), the variables x2Min and dx23Min are calculated (Step BR). x2Min is set to the absolute value of the difference between the x-coordinates of the former locations of the first and third Handles, and dx23Min is set to the minimum of x2Min and the absolute value of the difference between the x-coordinates of the former locations of the third and fourth Handles. This calculation of dx23Min overridden if all three of the first three Handles have former locations of zero, which indicates that the callout has been newly created. In that case, dx23Min is set to a default value such as a value indicating a dimension of one-half inch. If cpt is not 4 (Step BS) or fAutolength is false (Step BT), the calculation of x2Min and dx23Min is skipped.

Figure 16C:
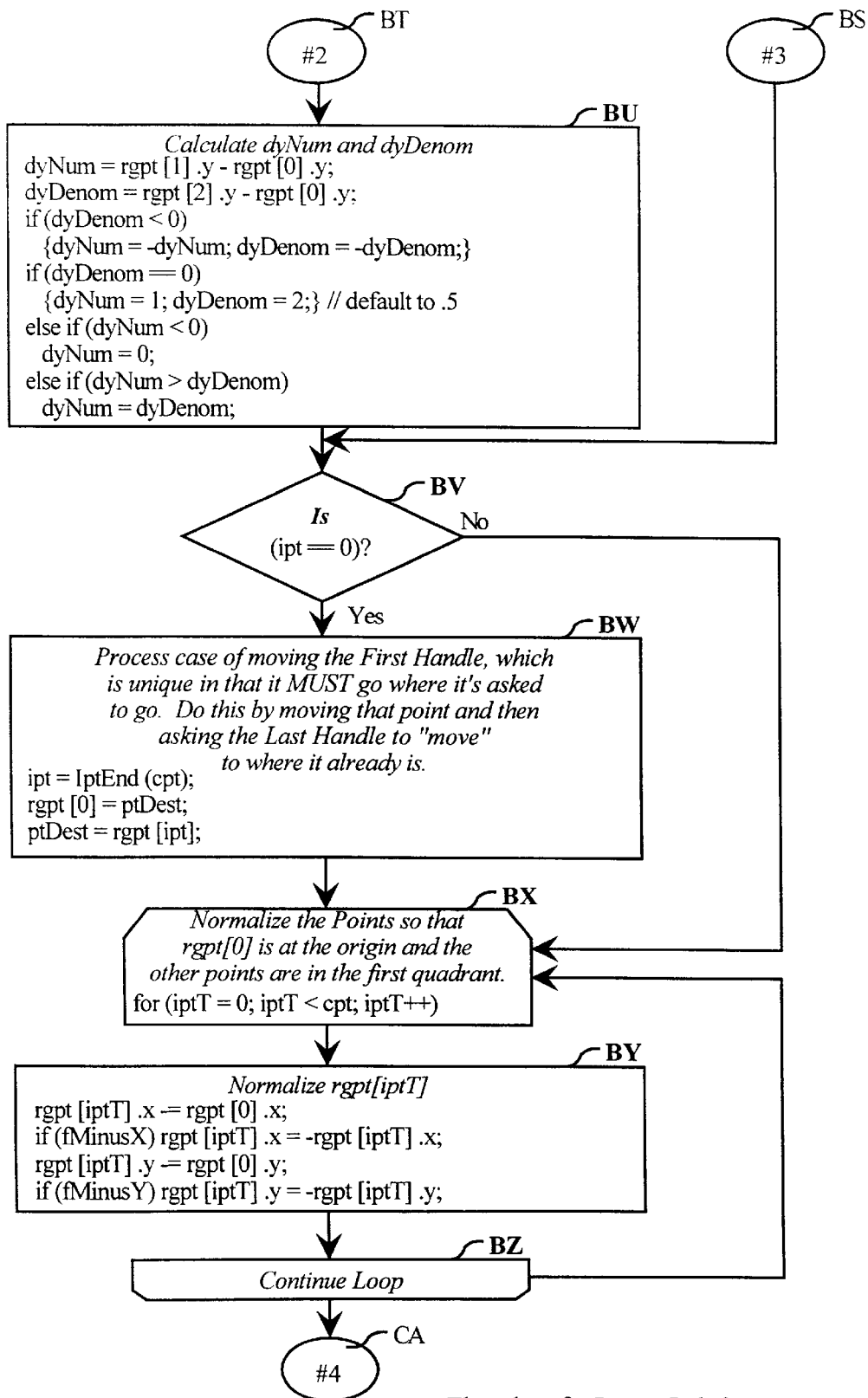

Referring now to FIG. 16C, if cpt equals 4, regardless of the value of fAutoLength, the variables dyNum and dyDenom are calculated (Step BU). dyNum is set to the difference between the y-coordinates of the former locations of the first two Handles, and dyDenom is set to the difference between the y-coordinates of the former locations of the first and third Handles. If dyDenom is negative, then both dyNum and dyDenom are negated. Then, if dyDenom is zero, dyNum is reset to one and dyDenom to two, so that their ratio defaults to one-half; or else if dyNum is negative, dyNum is reset to zero; or else if dyNum exceeds dyDenom, dyNum is set equal to dyDenom, giving a ratio of one.

If ipt is zero (Step BV), the First Handle is being moved, and processing unique to the First Handle is performed (Step BW). Unlike the other handles on the stem, the First Handle always moves where it is directed to move. Accordingly, ipt is reset to the value returned by calling IptEnd with an argument of cpt, the First Handle's location is set to ptDest, and the destination point is set to the Last Handle. This sequence of operations has the effect of moving the First Handle to the destination specified by ptdest and fictitiously "moving" the Last Handle to the location where it already is.

Next, the points of the Polyline are normalized so that the First Handle is treated as the origin and the other Handles are treated as being in the first quadrant of the coordinate plane. A loop over the points of the Polyline is performed using the index variable iptT, which is set to values from zero up to cpt minus one over successive iterations (Step BX). Each point in turn is normalized (Step BY). TQ accomplish normalization, the x-coordinate of the First Handle is subtracted from the x-coordinate of the point being normalized, and if fMinusX is true, the result of the subtraction is negated. Similarly, the y-coordinate of the First Handle is subtracted from the y-coordinate of the point being normalized, and if fMinusY is true, the result of the subtraction result is negated. Looping continues (Step BZ) until all the points have been normalized.

Figure 16D:
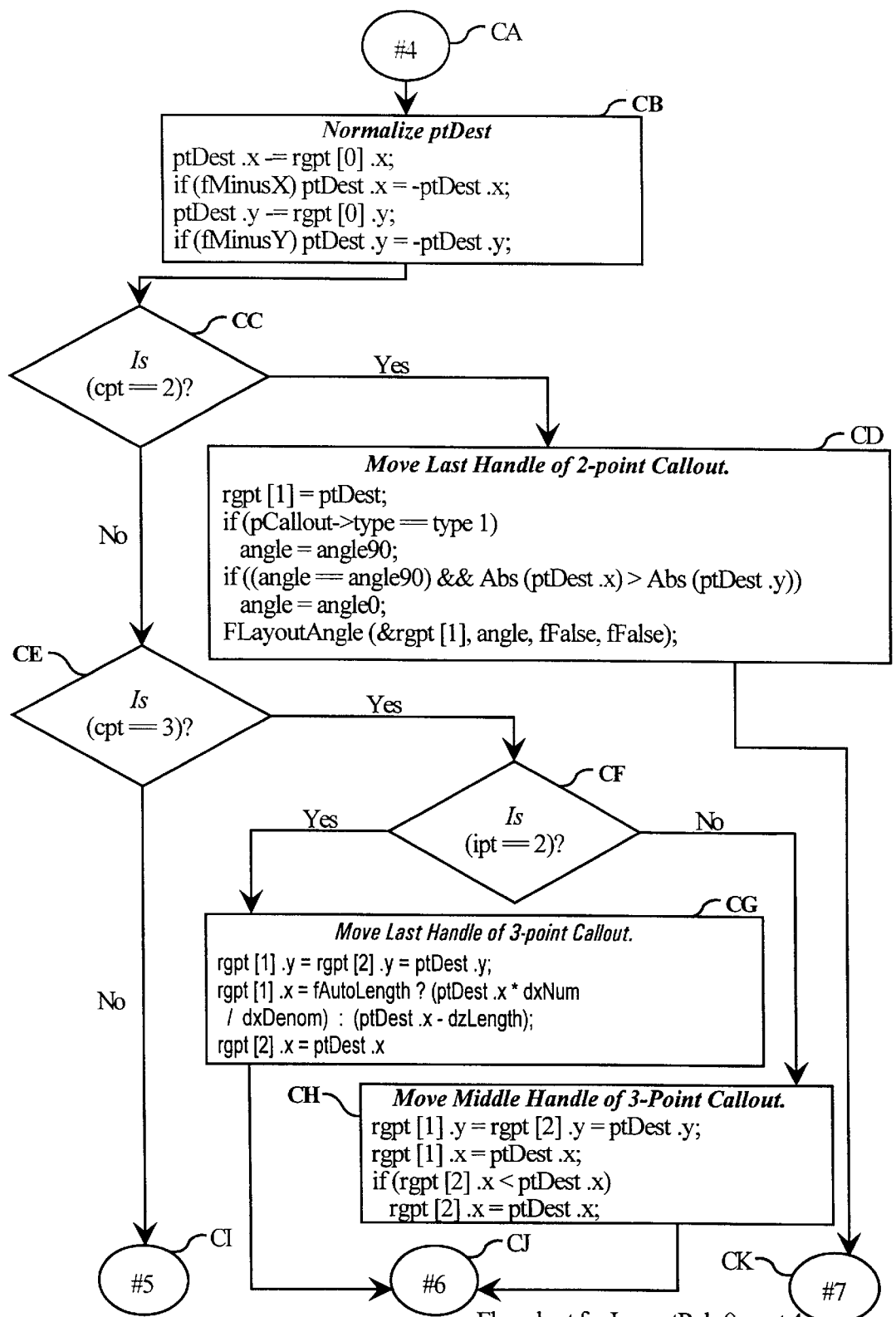

Referring now to FIG. 16D, upon termination of the loop (Step CA), the destination point is normalized (Step CB). The x-coordinate of the First Handle is subtracted from that of ptDest, and if fMinusX is true, the result of the subtraction is negated. Similarly, the y-coordinate of the First Handle is subtracted from the y-coordinate of ptDest, and if fMinusY is true, the result of the subtraction is negated.

With the Polyline and destination points normalized and other preliminaries completed, the central task of moving Polyline points (other than the First Handle) to their new locations begins. This task is accomplished in the normalized coordinate space. A series of special cases is considered, according to the callout type and which point is being moved.

If cpt equals 2, which indicates a callout of Type 1 or Type 2 (Step CC), then the point being moved is the Last Handle (Step CD). The point's coordinates are initially set equal to those of ptDest. Then, if the callout is of Type 1, angle is set to a value indicating a ninety-degree angle. If angle now has a value indicating a ninety-degree angle and the absolute value of x-coordinate of ptDest exceeds the absolute value of the y-coordinate of ptDest, angle is reset to a value indicating zero degrees. FLayoutAngle is then called to move the point to satisfy any angular constraint indicated by the value of angle. Because the value of angle is reset to zero or ninety degrees for a Type 1 callout, the stem will snap to either a vertical or a horizontal orientation. This completes the processing of the point being moved, and execution skips ahead (Steps CK and CS) to the reconversion of the Polyline points back to their original coordinate system as described below.

If cpt equals 3, which indicates a callout of Type 3 (Step CE), processing depends on which Handle is being moved. If ipt equals 2 (Step CF), the Last Handle is being moved; otherwise, the middle Handle (the inflection point at the middle of the stem region) is being moved. Moving either one of these points can affect the position of the other as well.

If the Last Handle of a Type 3 Callout is being moved (Step CG), the y-coordinates of both the middle and last Handles are set equal to the y-coordinate of ptDest. Setting both values the same ensures that the segment of the stem region closest to the annotation region will be horizontal. The x-coordinate of the middle Handle is set equal to the product of the x-coordinate of ptDest with the ratio of dxNum to dxDenom if fAutoLength is true, and otherwise is set to the difference of the x-coordinate of ptDest minus dzLength. The x-coordinate of the last Handle is set equal to the x-coordinate of ptDest.

If the Middle Handle of a Type 3 Callout is being moved (Step CH), the y-coordinates of both the middle and last Handles are set equal to the y-coordinate of ptDest. The x-coordinate of the middle Handle is set equal to the x-coordinate of ptDest. If the x-coordinate of the Last Handle is less than the x-coordinate of ptDest, the x-coordinate of the Last Handle is reset so as to be equal to the x-coordinate of ptDest.

Referring now to FIG. 16E, for either the middle Handle or the Last Handle of a Type 3 Callout, some additional calculations are performed (Step CM). FLayoutAngle is called for the middle Handle, with an argument indicating that its y-coordinate is not to be changed. This function call constrains the angle of the component segment of the stem region that runs between the First Handle and the middle handle according to the value of angle. If, as a result of the call to FLayoutAngle, the middle Handle has been moved, the coordinates of the Last Handle are readjusted as follows: The y-coordinate of the Last Handle is set equal to the y-coordinate of the middle handle. If fAutoLength is false, the x-coordinate of the Last Handle is set to the sum of the x-coordinate of the middle Handle plus dzLength. Otherwise (if fAutoLength is true), then if the x-coordinate of the Last Handle is less than the x-coordinate of the middle Handle, it is set equal to the x-coordinate of the middle Handle. This completes the processing of the point being moved. Execution skips ahead (Step CS) to the reconversion of the Polyline points back to their original coordinate system as described below.

If the callout is Type 4, processing once again depends on which Handle is being moved. If ipt equals 3 (Step CL), the Last Handle is being moved. If ipt equals 2 (Step CO) the third Handle (of the two intermediate Handles, the one nearest the Last Handle) is being moved, and otherwise the second handle (the intermediate Handle nearest the First Handle) is being moved. Moving any one of these points can affect the positions of the others as well.

If the Last Handle of a Type 4 Callout is being moved (Step CN), the x-coordinate of the Last Handle is set equal to the x-coordinate of ptDest. The y-coordinates of both the third and the Last Handles are set equal to the y-coordinate of ptDest. The equality of these y-coordinates ensures that the stem segment closest to the annotation region will be horizontal. If fAutoLength is true, then if the x-coordinate of the third handle is less than the sum of the x-coordinate of ptDest plus dx23Min, the x-coordinate of the third handle is set equal to that sum, and if the x-coordinate of the third handle is less than x2Min, it is set equal to x2Min. Otherwise (if fAutoLength is false) the x-coordinate of the third handle is set to the sum of the x-coordinate of ptDest plus dzLength. Either way, regardless of the value of fAutoLength, the second Handle's x-coordinate is then set equal to the resulting x-coordinate of the third Handle. The equality of these x-coordinates ensures that the middle stem segment will be vertical. The second Handle's y-coordinate is set equal to the product of the y-coordinate of ptDest with the ratio between dyNum and dyDenom.

If the third Handle of a Type 4 Callout is being moved (Step CP), the x-coordinates of the second and the third Handles are set equal to the x-coordinate of ptDest, and the y-coordinates of the third and the Last Handles are set equal to the y-coordinate of ptDest. These settings ensure, respectively, that the middle stem segment will be vertical and that the stem segment closest to the annotation region will be horizontal. If the Last Handle's x-coordinate exceeds the x-coordinate of ptDest, the Last Handle's x-coordinate is set equal to the x-coordinate of ptDest. The second Handle's y-coordinate is set equal to the product of the y-coordinate of ptDest with the ratio between dyNum and dyDenom.

If the second Handle of a Type 4 Callout is being moved (Step CQ), the x-coordinates of the second and the third Handles are set equal to the x-coordinate of ptDest. The y-coordinate of the second Handle is set equal to the y-coordinate of ptDest. If the third Handle's y-coordinate is less than the y-coordinate of ptDest, the third Handle and the Last Handle's y-coordinates are set equal to the y-coordinate of ptDest. If the Last Handle's x-coordinate exceeds the x-coordinate of ptDest, the Last Handle's x-coordinate is set equal to the x-coordinate of ptDest.

Figure 16F:
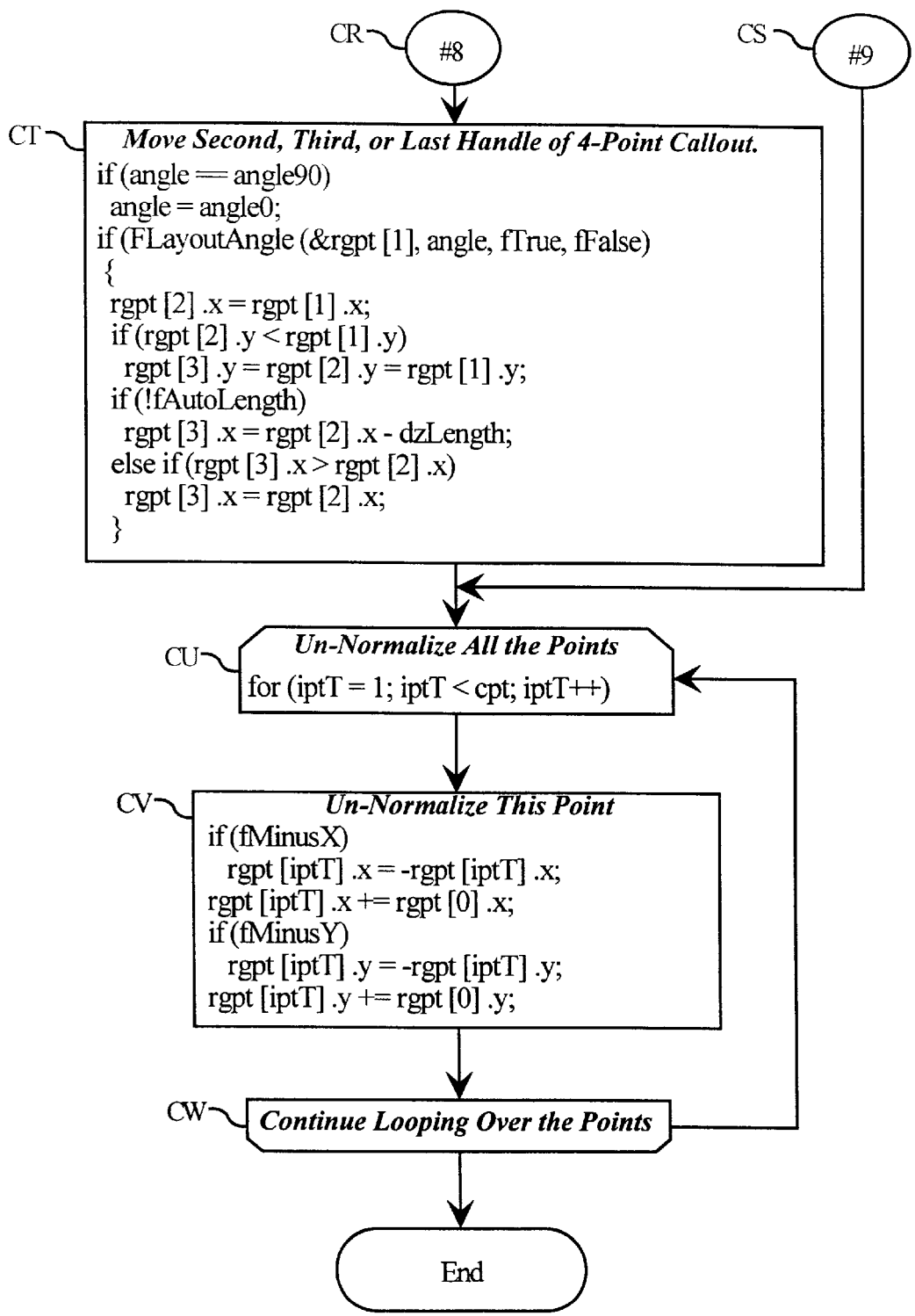

Referring now to FIG. 16F, for any of the second, third, or Last Handles of a Type 4 Callout (Step CR), some additional calculations are performed (Step CT). If angle has a value indicating an angular constraint of ninety degrees, it is reset to a value indicating an angular constraint of zero degrees. FLayoutAngle is then called for the second Handle, with an argument indicating that its x-coordinate is not to be changed. This function call constrains the angle of the component segment of the stem region that runs between the First Handle and the second handle according to the value of angle. If, as a result of the call to FLayoutAngle, the second Handle has been moved, certain Handle coordinates are readjusted as follows: The third Handle's x-coordinate is set equal to the second Handle's x-coordinate. If fAutoLength is false, the Last Handle's x-coordinate is set to the difference of the x-coordinate of the third Handle minus dzLength; otherwise (if fAutoLength is true), then if the x-coordinate of the Last Handle exceeds the x-coordinate of the third Handle, the x-coordinate of the Last Handle is set equal to the x-coordinate of the third Handle. This completes the processing of the point being moved. Execution proceeds with the reconversion of the Polyline points back to their original coordinate system as will now be described.

The Polyline points are converted from the normalized, first-quadrant coordinate system back to their original coordinate system, by a process that reverses the normalization performed previously. A loop over the points of the Polyline is performed using the index variable iptT, which is set to values from zero up to cpt minus one over successive iterations (Step CU). Each point in turn is reconverted to the original coordinate system (Step CV). To reconvert a point, the x-coordinate of the First Handle is added to the normalized x-coordinate of the point to be converted, or to the negation of the normalized x-coordinate if fMinusX is true. Similarly, the y-coordinate of the First Handle is added to the normalized y-coordinate of the point to be converted, or to the negation of the normalized y-coordinate if fMinusY is true. Looping continues (Step CW) until all the points have been reconverted.

FLayoutAngle( )

Description

This function moves a point (minimally) so that the angle from (0, 0) to the point is that specified by angle. It serves to implement angular constraints determined by the callout type and by the angle formatting parameter described above with reference to FIG. 10.

Figure 17:
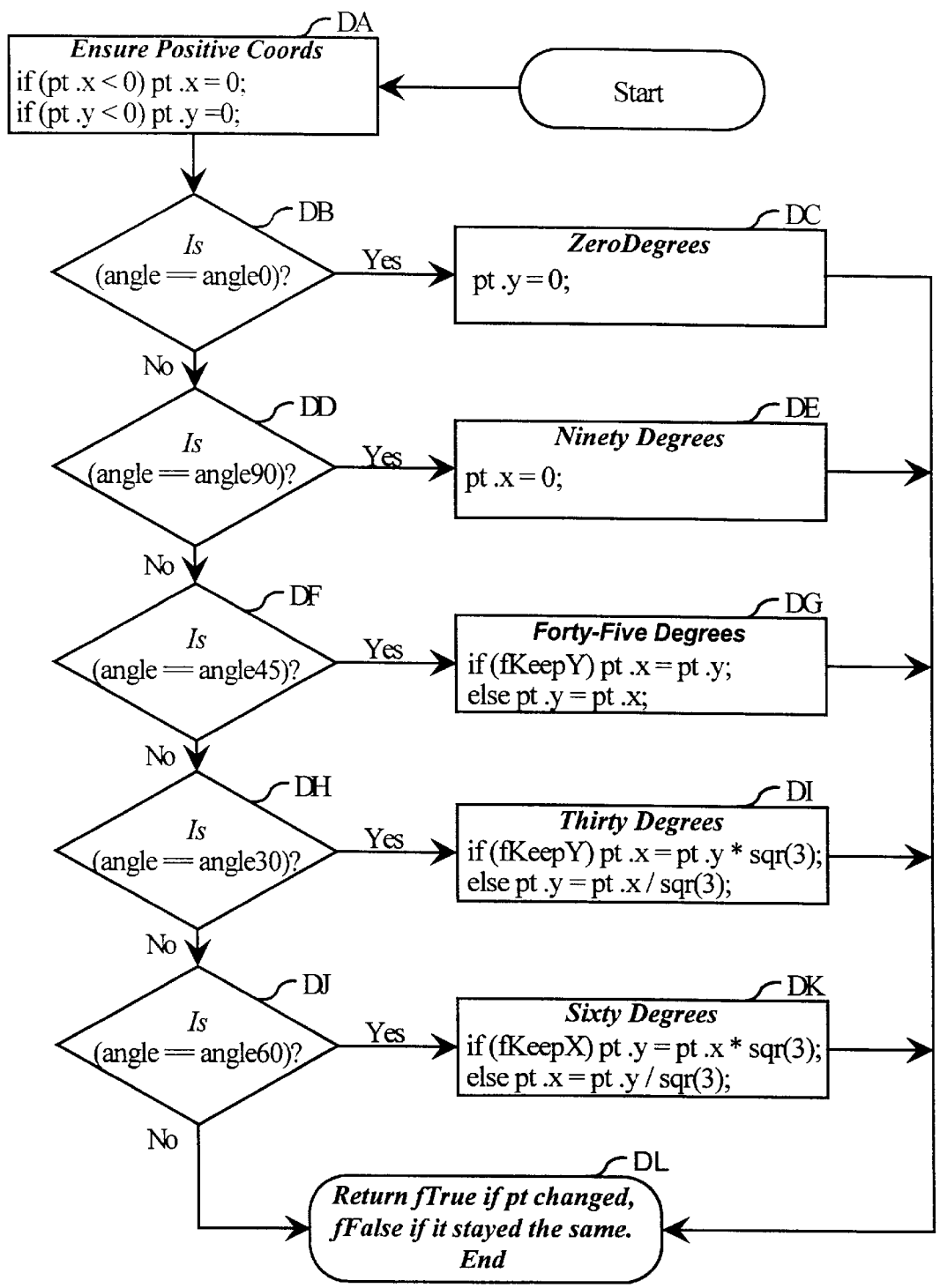
FIG. 17 is a flowchart for the function FLayoutAngle( )

Input Parameters:
 pt The point in question. The point has an x-coordinate (pt.x) and a y-coordinate (pt.y).
 angle The desired angle.
 fKeepX Boolean: If set to fTrue, get the angle without changing pt.x.
 fKeepY Boolean: If set to fTrue, get the angle without changing pt.y.
Output Parameters:
 pt Updated value is returned.
Procedure The procedure is set out in the flowchart of FIG. 17. Initially, the x and y coordinates of the point in question are tested to ensure that they are not negative numbers; if they are, they are reset to zero (Step DA).

Then the updated point value is determined. If angle is set to a value that indicates a desired angle of zero degrees (Step DB), then the y-coordinate is set to zero (Step DC). If angle is set to a value that indicates a desired angle of ninety degrees (Step DD), then the x-coordinate is set to zero (Step DE). If angle is set to a value that indicates a desired angle of forty-five degrees (Step DF), then if fKeepY is true the x-coordinate is set equal to the y-coordinate and if fKeepY is false the y-coordinate is set equal to the x-coordinate (Step DG). If angle is set to a value that indicates a desired angle of thirty degrees (Step DH), then if fKeepY is true, the x-coordinate is set to the y-coordinate multiplied by the square root of 3, and if fKeepY is false, then the y-coordinate is set to the x-coordinate divided by the square root of 3. (Step DI). If angle is set to a value that indicates a desired angle of sixty degrees (Step DJ), then if fKeepX is true the y-coordinate is set equal to the x-coordinate multiplied by the square root of 3, and if fKeepX is false the x-coordinate is set equal to the y-coordinate divided by the square root of 3 (Step DK). Otherwise the value of angle indicates that no angular constraint has been specified, and accordingly nothing further is done to the x- or y-coordinates.

In all cases, the function FLayoutAngle returns a value of fTrue if either pt.x or pt.y has changed, and fFalse otherwise (Step DL).

DzDescent( )
Description

This function figures out the actual distance to use for dzDescent when positioning the Textbox relative to the Polyline.

Figure 18:
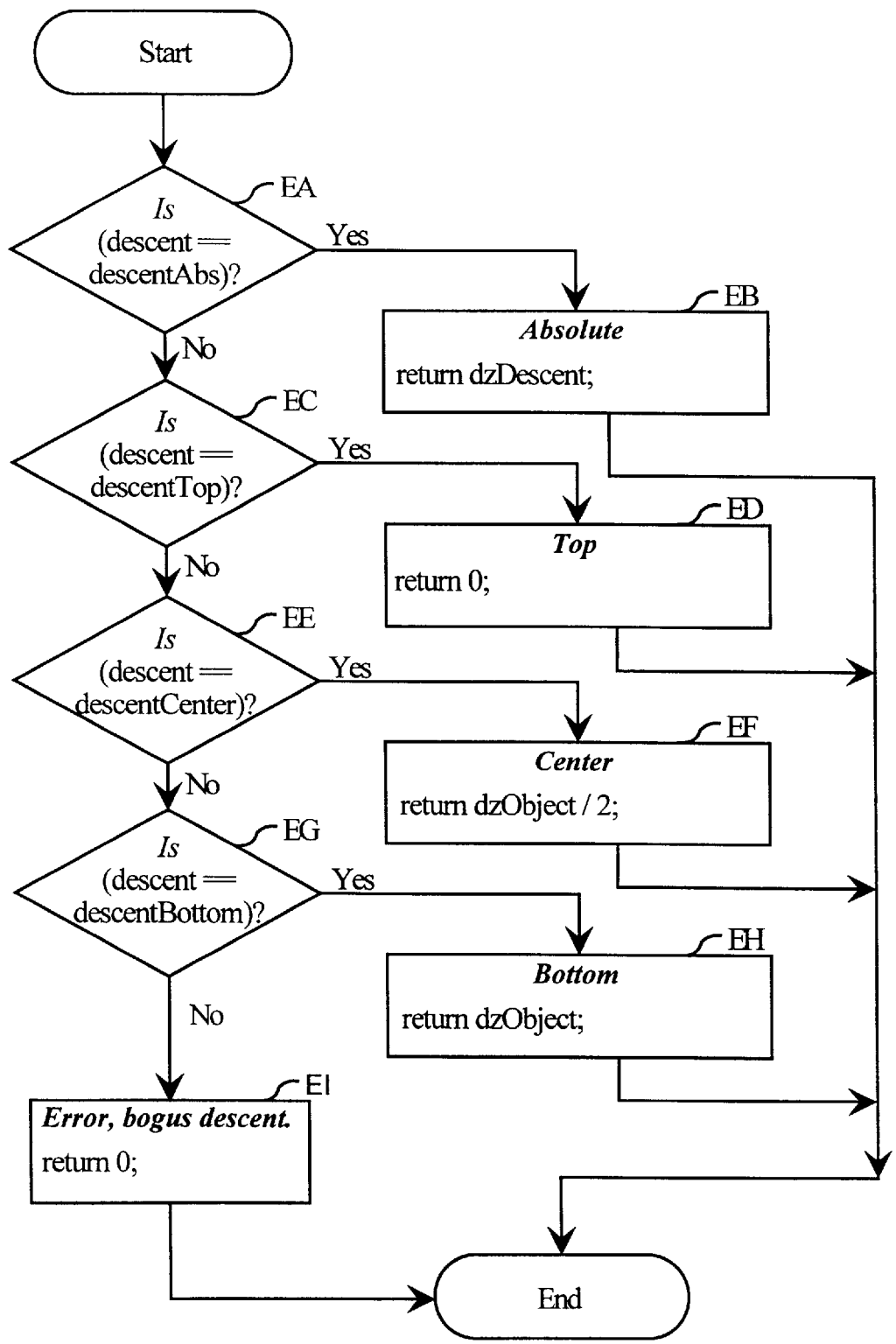
FIG. 18 is a flowchart for the function DzDescent( )

Input Parameters:
 descent The descent field of the Callout.
 dzDescent The dzDescent field of the Callout.
 dzObject The relevant dimension of the Textbox along which descent is measured.
Output Parameters:
 [return] The actual dzDescent to use.
Procedure The descent distance to be used for positioning the annotation region relative to the stem region is determined according to the flowchart of FIG. 18. If the descent field of the Callout is descentAbs (Step EA), then the descent distance is the numerical value stored in the dzDescent field of the Callout (Step EB). Otherwise (if Top, Center, or Bottom has been selected for the drop parameter), the descent distance is determined relative to the dimension supplied to the function in the variable dzObject. More particularly, if the descent field of the Callout is descentTop (Step EC),), then the descent distance is set to zero (Step ED). If the descent field of the Callout is descentCenter (Step EE), then the descent distance is set to one-half of dzObject (Step EF). If the descent field of the Callout is descentBottom (Step EG), then the descent distance is dzObject (Step EH). If none of the above cases applies, the descent is undefined and the descent distance is set to zero (Step EI).

IptEnd( )
Description

This function determines which point on the Polyline is the "End", that is, geometrically farthest from the First Handle.

Figure 19:
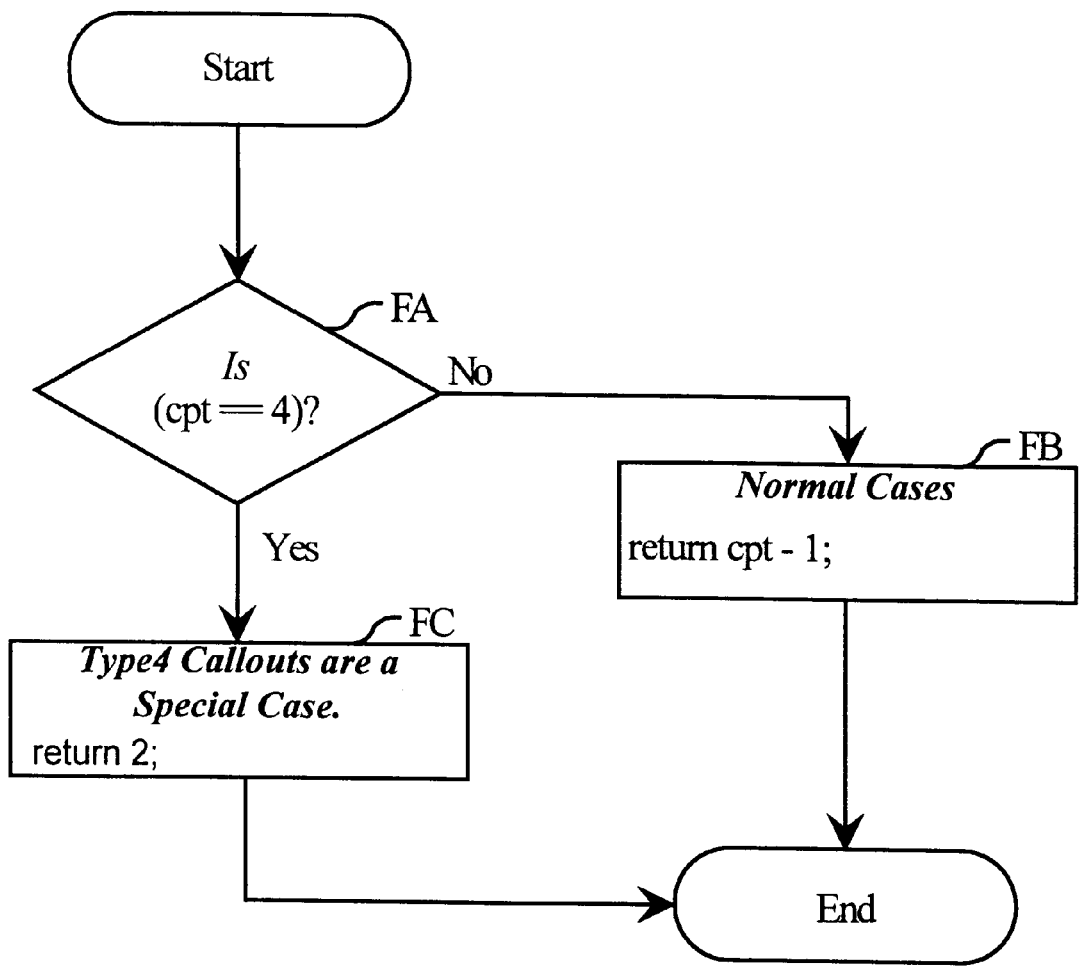
FIG. 19 is a flowchart for the function IptEnd( ).

Input Parameter:
 cpt The number of points in this Callout's Polyline.
Output Parameters:
 [return] The point that is the farthest from the First Handle.
Procedure Referring to FIG. 19, the number of points in the Callout's Polyline is compared to 4, to see whether this is a Type 4 callout (Step FA). If not, the function returns a value of cpt minus 1 (Step FB). Otherwise, the function returns a value of 2 (Step FC)

CONCLUSION

A callout provides a helpful and nondestructive way to annotate, explain or otherwise call attention to a portion or item of a display or printed page through the visual depiction of a stem, typically of one or more contiguous line segments, connected to an annotation region that contains an explanation or other annotation. The invention automates, in WYSIWYG fashion, the process of annotating using callouts. To create a callout in the specific embodiment that has been described, the mouse is placed at the position of the item to be annotated, the mouse button is clicked and held, the mouse is dragged to the place where the callout's annotation is to appear, and the mouse button is released. As the mouse is being dragged, the callout is displayed continuously, so that at all times a user can see exactly how the callout will appear when the mouse button is released. The orientation and relative proportions of the callout's stem and annotation regions are continuously and automatically recomputed, in a manner that takes into account constraints provided by the user and that makes intelligent and aesthetically pleasing choices where the components' interrelationships are underconstrained. Also, the user can change the type of callout (specifically, the number and relative orientations of the line segments of the callout's stem) and the display will be recomputed automatically to show a callout of the newly selected type. Still further, the callout can be anchored to the item (e.g., paragraph) it annotates, so that if the annotated item or portion is moved within the document or between documents, the callout moves with it and is properly redisplayed. In particular, the callout deals appropriately with movement across page boundaries. Callouts can be added, modified, and deleted at will by the user without destroying or otherwise adversely affecting the underlying item or document.

Although the embodiment that has been described places the automated callouts of the invention in the context of a word processing applications program, the method and system of the invention can be applied to automate the annotation by callouts of many sorts of items in many contexts. A pixel in a painting or photographic layout program, an icon in a windowed operating system, a cell of a spreadsheet, and a host of other images and subimages that are or can be associated with well-defined display locations can be annotated using automated callouts according to the invention. Many embodiments, variations, and extensions of the system and method of the invention will be apparent to those of skill in the art. Accordingly, the scope of the invention is not limited to the foregoing specification, but instead is given by the appended claims and their full range of equivalents.

What is claimed is:

1. In a system comprising a processor, a visual display operatively coupled to the processor, and an activatable pointing device, an automated method of providing a callout in a display field of the visual display, the method comprising the steps of:
   receiving an indication that the pointing device was activated while the pointing device was pointing to a first display location in the display field;
   receiving an indication that the pointing device was moved while activated to point to a second display location in the display field, then deactivated;
   providing a vehicle for selecting formatting criteria for the callout;
   in response to a selection of formatting criteria through the vehicle, automatically creating with the system a callout that conforms with the selected formatting criteria, the callout comprising a stem region and an annotation region, the stem region having a first vertex displayed proximally to the designated first display location and a second vertex displayed proximally to the annotation region, the annotation region being displayed proximally to the designated second display location;
   anchoring the callout to an item in the visual display; and
   in response to movement of the item to a new location in the visual display, moving the callout anchored to that item to the new location.

2. The method of claim 1, further comprising the step of anchoring the callout to a new item in response to movement of the callout to a new location in the visual display.

3. A computer-implemented method for creating a callout, the callout having an annotation region that can contain information and the callout also having a stem that can indicate a relationship between the annotation region and an item, the method comprising the steps of:
   receiving an indication that a pointing device was activated while the pointing device was pointing to a first display location in a visual display;
   receiving an indication that the pointing device was deactivated while the pointing device was pointing to a second display location in the visual display; and
   creating the callout, wherein
      the stem of said callout has an origin vertex near the first display location and a terminal vertex near the second display location,
      the origin vertex and the terminal vertex are on opposite ends of the stem, and
      the annotation region of said callout is also located near the second display location.

4. The method of claim 3, further comprising the step of creating an annotation in the annotation region that pertains to the item indicated by the stem.

5. The method of claim 3, further comprising the steps of:
   receiving from a user through a graphical user interface a format for the callout, the format comprising a shape for the annotation region and a shape for the stem; and
   displaying the callout conforming to the format.

6. The method of claim 5, further comprising the step of displaying, at each moment while the pointing device is activated, an outline of a callout that would be created were the pointing device deactivated at that moment.

7. The method of claim 3, wherein the callout is created in a document in a word processing application.

8. The method of claim 7, further comprising the step of anchoring the callout to a paragraph of text in the document.

9. The method of claim 8, further comprising the following step:
   in response to movement of the paragraph to a new location in the document, moving the callout anchored to that paragraph to the new location.

10. A computer-implemented method for creating a callout in a document in a word processing application, the callout having an annotation region and a stem, the method comprising the steps of:
    receiving an indication that a pointing device was activated while the pointing device was pointing to a first location in the document;
    receiving an indication that the pointing device was deactivated while the pointing device was pointing to a second location in the document;
    creating the callout, wherein
       the stem of said callout has an origin vertex near the first location and a terminal vertex near the second location,
       the origin vertex and the terminal vertex are on opposite ends of the stem, and
       the annotation region of said callout is also located near the second location;
    anchoring the callout to a paragraph of text in the document; and
    in response to movement of the paragraph to a new location in the document, moving the callout anchored to that paragraph to the new location.

11. The method of claim 10, further comprising the step of anchoring the callout to a new paragraph in response to movement of the callout to a new location.

12. A computer-implemented method for modifying a callout having an annotation region and a stem, in a specified format, the stem having a far vertex and a near vertex on its opposite ends, the far vertex located in an original position further away from the annotation region than the near vertex, the method comprising the steps of:
    receiving an indication that the annotation region has been selected through the activation of a pointing device;
    receiving an indication that the pointing device has been deactivated while pointing to a new location;
    changing the callout by
       locating the annotation region proximate to the new location, and
       modifying the stem, without changing the stem's adherence to the specified format, by locating the near vertex near the new location of the annotation region and leaving the far vertex in the original position; and
    displaying, at each moment while the pointing device is activated, an outline of a modified callout that would be created were the pointing device deactivated at that moment.

13. A computer-implemented method for manipulating, in a word processing environment, a callout having an annotation region and a stem, the method comprising the steps of:
    anchoring the callout to a paragraph of text; and
    in response to movement of the paragraph to a new location within a document, moving the callout anchored to that paragraph to the new location.

14. The method of claim 13, wherein the stem has a far vertex and a near vertex on opposite ends of the stem, the far vertex located further away from the annotation region than the near vertex, and wherein the callout is anchored to the paragraph containing the far vertex.

15. The method of claim 13, further comprising the step of anchoring the callout to a new paragraph in response to movement of the callout to a new location.

16. The method of claim 15, wherein movement of the callout to a new location does not cause the callout to be anchored to a new paragraph if the callout was locked when anchored to the paragraph.

17. The method of claim 13, further comprising the step of deleting the callout in response to deletion of the paragraph to which the callout is anchored.

18. The method of claim 13, further comprising the step of providing a display that indicates the paragraph to which the callout is anchored.

19. A computer-readable medium for use with a system comprising a processor, a visual display operatively coupled to the processor, and an activatable pointing device, said computer readable medium having computer-executable instructions for performing an automated method of providing a callout in a display field of the visual display, the method comprising the steps of:
   a) receiving an indication that the pointing device was activated while the pointing device was pointing to a first display location in the display field;
   b) receiving an indication that the pointing device was moved while activated to point to a second display location in the display field, then deactivated;
   c) providing a vehicle for selecting formatting criteria for the callout;
   d) in response to a selection of formatting criteria through the vehicle, automatically creating with the system a callout that conforms with the selected formatting criteria, the callout comprising a stem region and an annotation region, the stem region having a first vertex displayed proximally to the designated first display location and a second vertex displayed proximally to the annotation region, the annotation region being displayed proximally to the designated second display location;
   e) anchoring the callout to an item in the visual display; and
   f) in response to movement of the item to a new location in the visual display, moving the callout anchored to that item to the new location.

20. A computer-readable medium having computer-executable instructions for performing a computer-implemented method for creating a callout, the callout having an annotation region that can contain information and the callout also having a stem that can indicate a relationship between the annotation region and an item, the method comprising the steps of:
   a) receiving an indication that a pointing device was activated while the pointing device was pointing to a first display location in a visual display;
   b) receiving an indication that the pointing device was deactivated while the pointing device was pointing to a second display location in the visual display; and
   c) creating the callout, wherein
      the stem of said callout has an origin vertex near the first display location and a terminal vertex near the second display location,
      the origin vertex and the terminal vertex are an opposite ends of the stem, and
      the annotation region of said callout is also located near the second display location.

21. A computer-readable medium having computer-executable instructions for performing a computer-implemented method for creating a callout created in a document in a word processing application, the callout having an annotation region that can contain information and the callout also having a stem that can indicate a relationship between the annotation region and an item, the method comprising the steps of:
   a) receiving an indication that a pointing device was activated while the pointing device was pointing to a first display location in a visual display;
   b) receiving an indication that the pointing device was deactivated while the pointing device was pointing to a second display location in the visual display;
   c) creating the callout, wherein
      the stem of said callout has an origin vertex near the first display location and a terminal vertex near the second display location,
      the origin vertex and the terminal vertex are on opposite ends of the stem, and
      the annotation region of said callout is also located near the second display location;
   d) anchoring the callout to a paragraph of text in the document; and
   e) in response to movement of the paragraph to a new location in the document, moving the callout anchored to that paragraph to the new location.

22. A computer-readable medium having computer-executable instructions for performing a computer-implemented method for modifying a callout having an annotation region and a stem, in a specified format, the stem having a far vertex and a near vertex on its opposite ends, the far vertex located in an original position further away from the annotation region than the near vertex, the method comprising the steps of:
   a) receiving an indication that the annotation region has been selected through the activation of a pointing device;
   b) receiving an indication that the pointing device has been deactivated while pointing to a new location;
   c) changing the callout by
      locating the annotation region proximate to the new location, and
      modifying the stem, without changing the stem's adherence to the specified format, by locating the near vertex near the new location of the annotation region and leaving the far vertex in the original position; and
   d) displaying, at each moment while the pointing device is activated, an outline of a modified callout that would be created were the pointing device deactivated at that moment.

23. A computer-readable medium having computer-executable instructions for performing a computer-implemented method for manipulating, in a word processing environment, a callout having an annotation region and a stem, the method comprising the steps of;
   anchoring the callout to a paragraph of text; and
   in response to movement of the paragraph to a new location within a document, moving the callout anchored to that paragraph to the new location.

* * * * *